Dec. 19, 1933.    T. L. GREEN    1,939,810
BISCUIT MACHINE
Filed Jan. 29, 1925    30 Sheets-Sheet 1

Inventor:
Thomas L. Green

Dec. 19, 1933.  T. L. GREEN  1,939,810
BISCUIT MACHINE
Filed Jan. 29, 1925  30 Sheets-Sheet 3

Inventor:
Thomas L. Green.

Fig. 4.

Dec. 19, 1933.  T. L. GREEN  1,939,810
BISCUIT MACHINE
Filed Jan. 29, 1925   30 Sheets-Sheet 5

Inventor:
Thomas L. Green.
Emery, Booth, Janney & Varney.  Attys.

Dec. 19, 1933.    T. L. GREEN    1,939,810
BISCUIT MACHINE
Filed Jan. 29, 1925    30 Sheets-Sheet 7
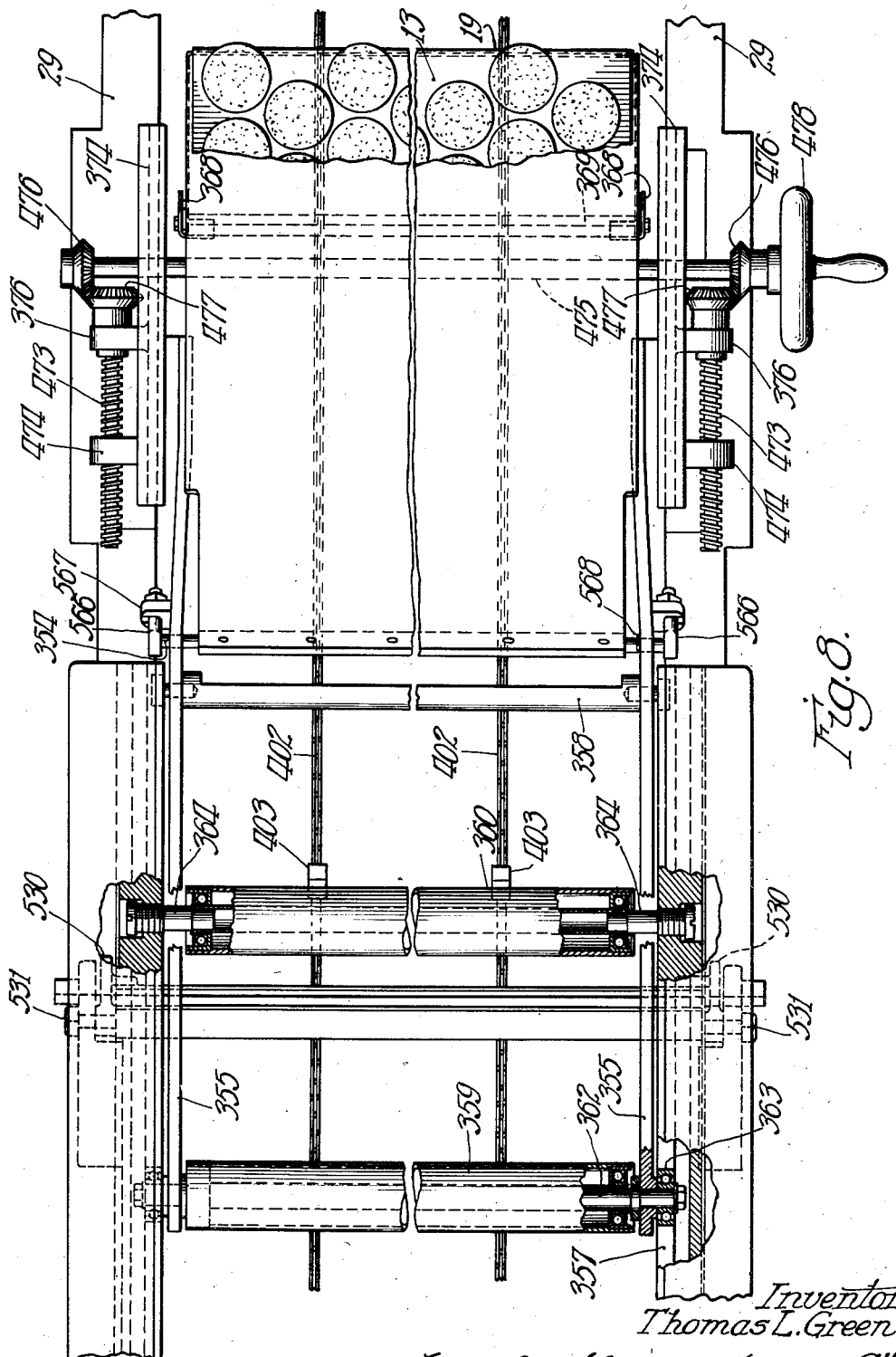
Fig. 8.
Inventor:
Thomas L. Green.

Dec. 19, 1933.  T. L. GREEN  1,939,810
BISCUIT MACHINE
Filed Jan. 29, 1925   30 Sheets-Sheet 9

Inventor
Thomas L. Green.

Dec. 19, 1933.  T. L. GREEN  1,939,810
BISCUIT MACHINE
Filed Jan. 29, 1925  30 Sheets-Sheet 11

Inventor:
Thomas L. Green.
Emery, Booth, Janney & Varney. Attys.

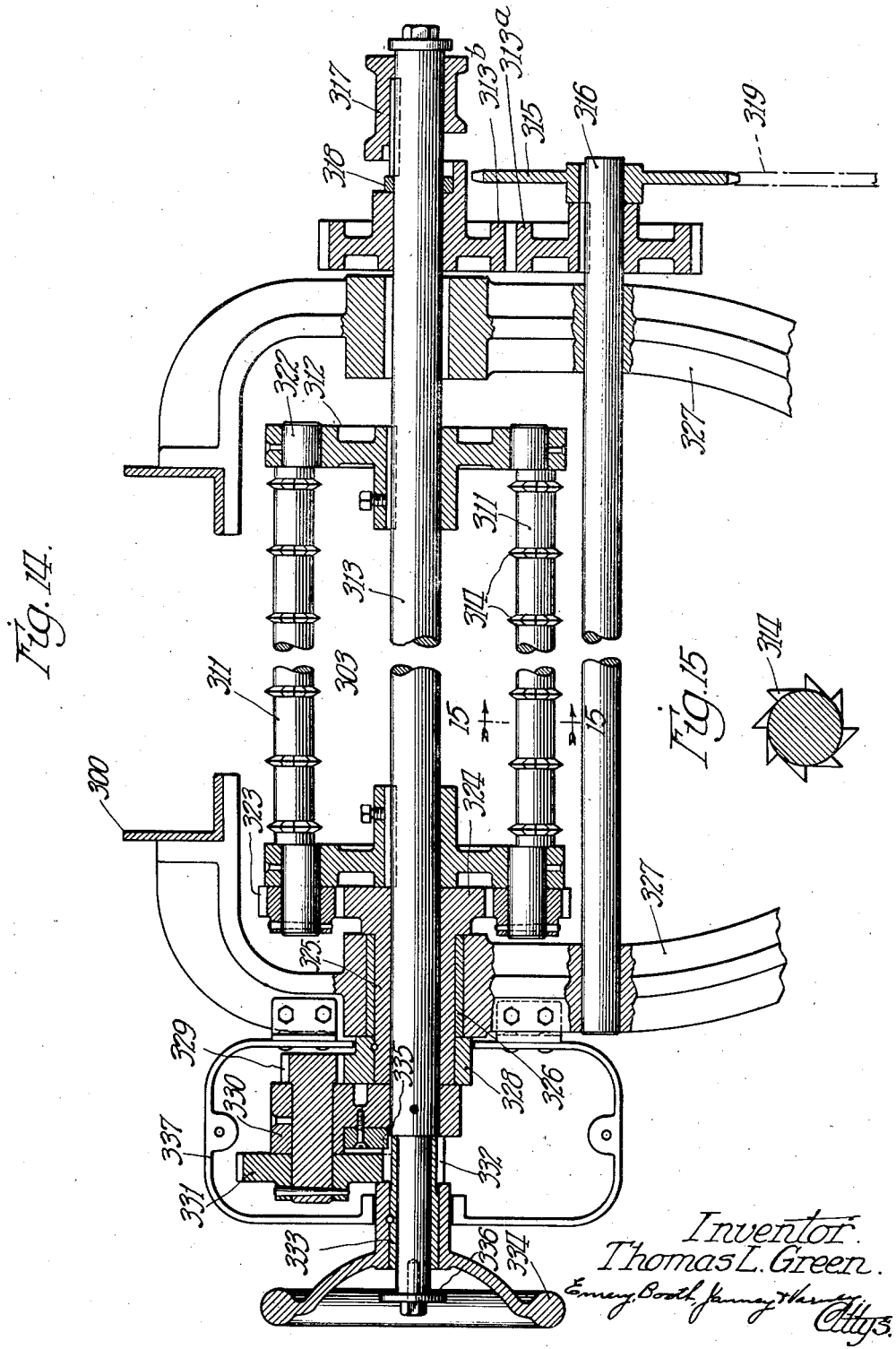

Dec. 19, 1933.   T. L. GREEN   1,939,810
BISCUIT MACHINE
Filed Jan. 29, 1925   30 Sheets-Sheet 13
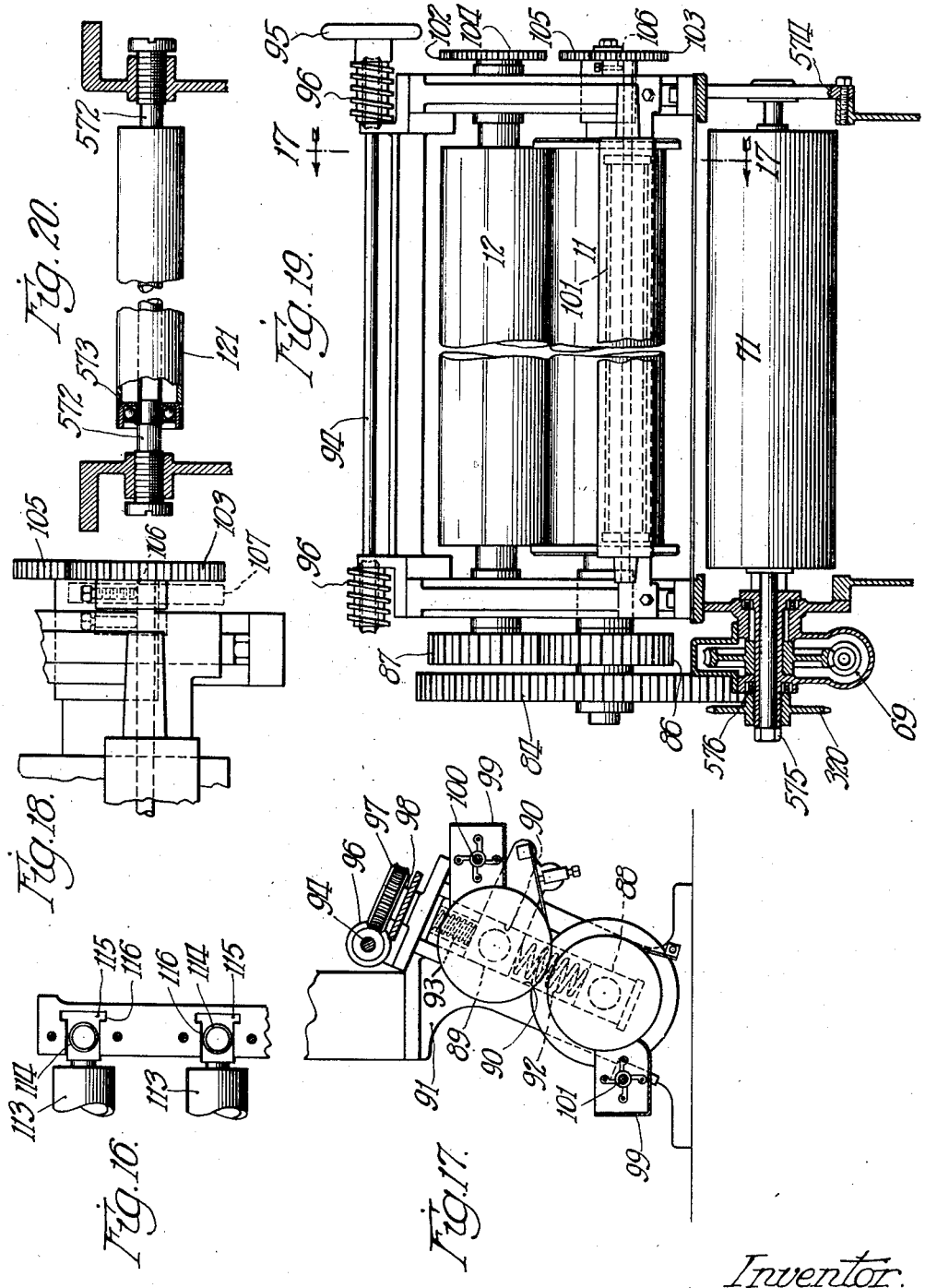
Inventor.
Thomas L. Green.

Inventor.
Thomas L. Green.

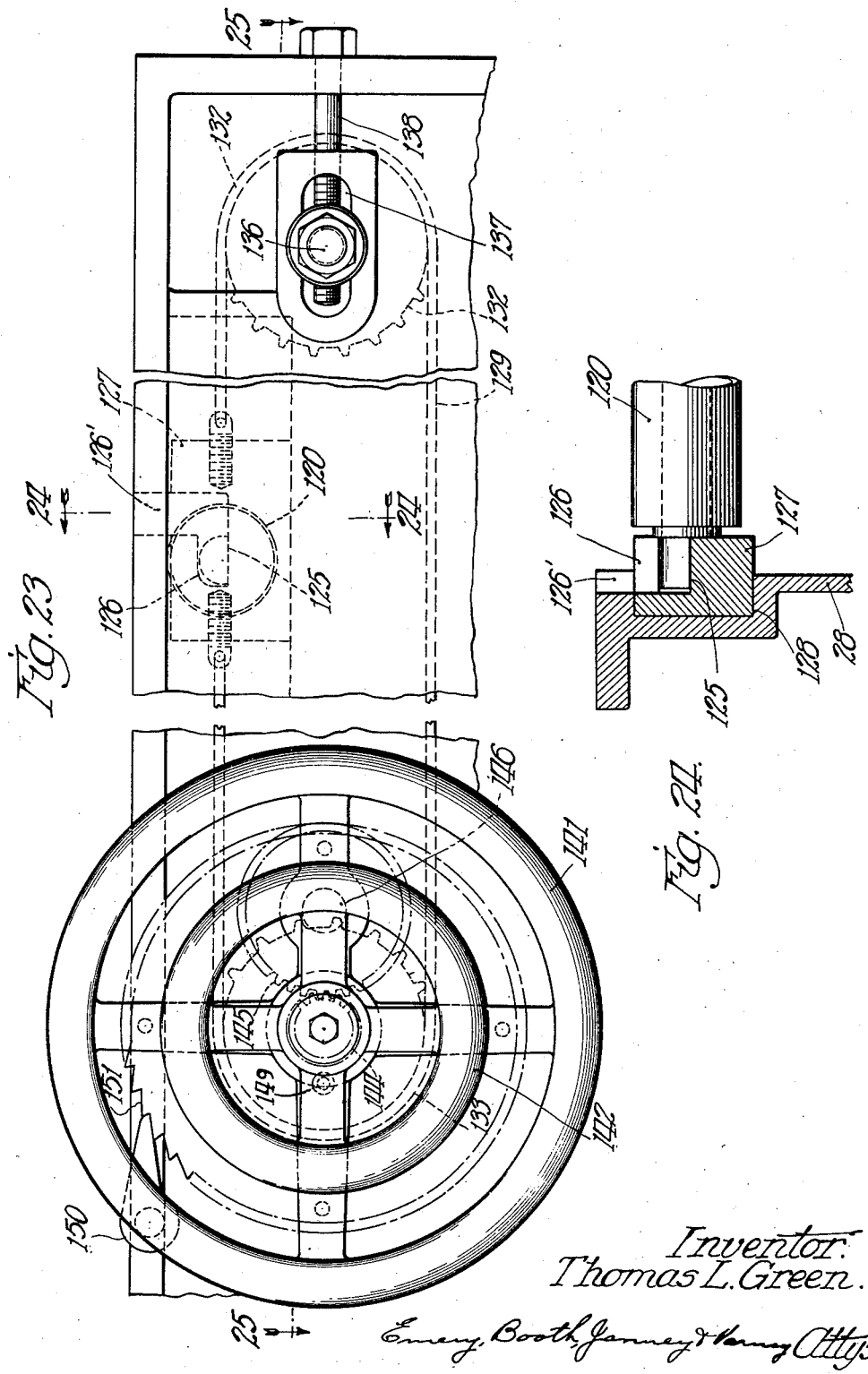

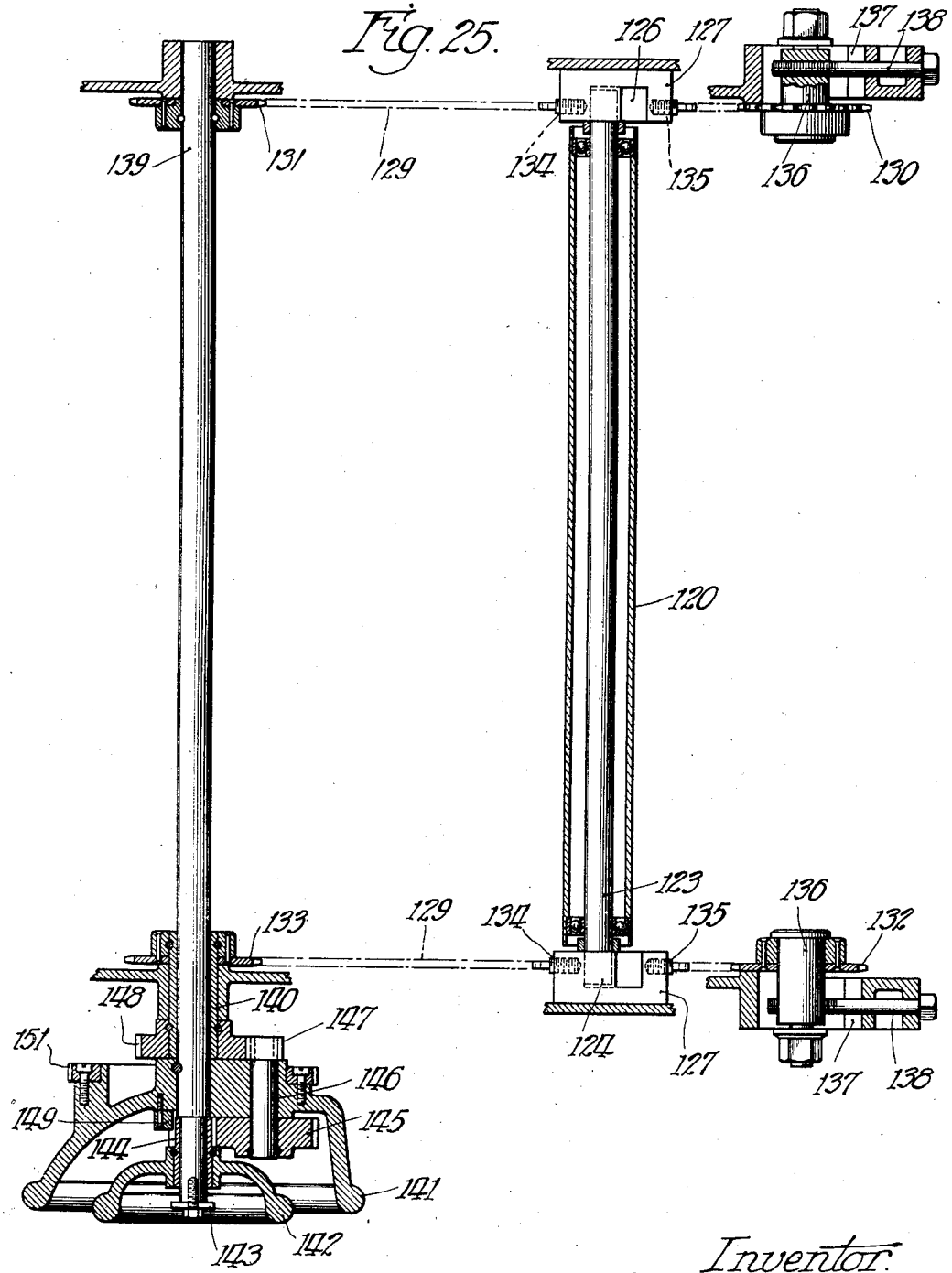

Dec. 19, 1933.  T. L. GREEN  1,939,810
BISCUIT MACHINE
Filed Jan. 29, 1925  30 Sheets-Sheet 17
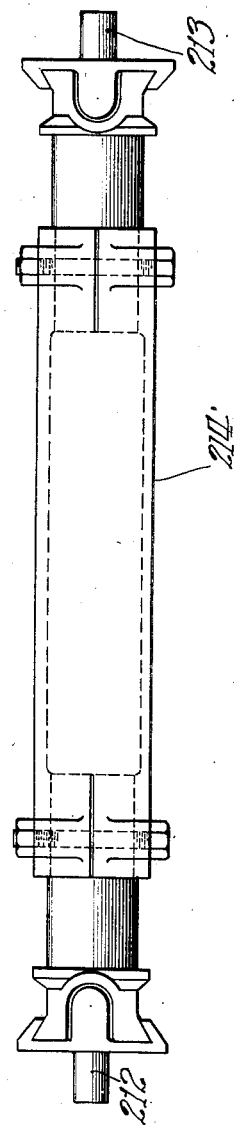
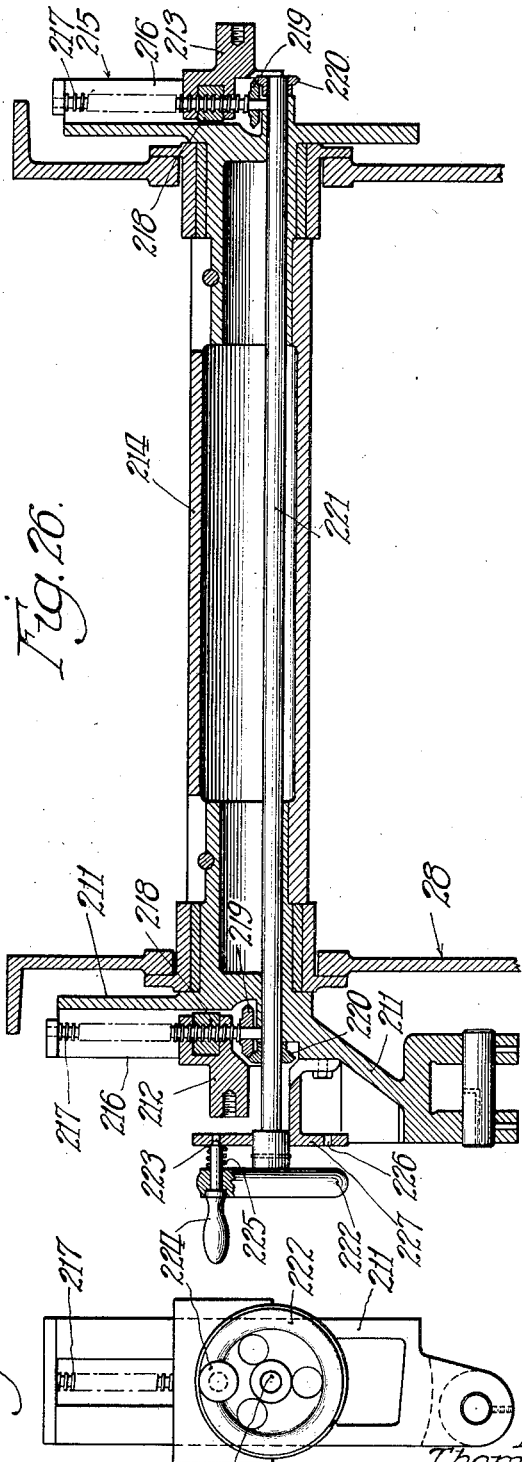

Dec. 19, 1933.  T. L. GREEN  1,939,810
BISCUIT MACHINE
Filed Jan. 29, 1925   30 Sheets-Sheet 18
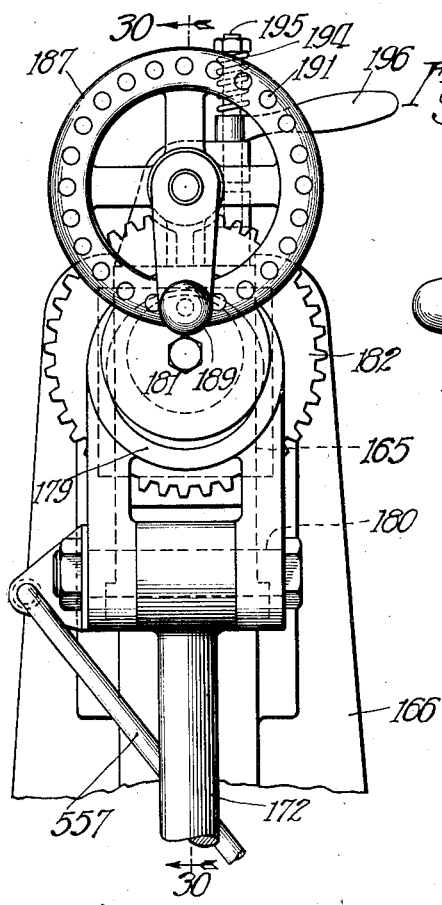
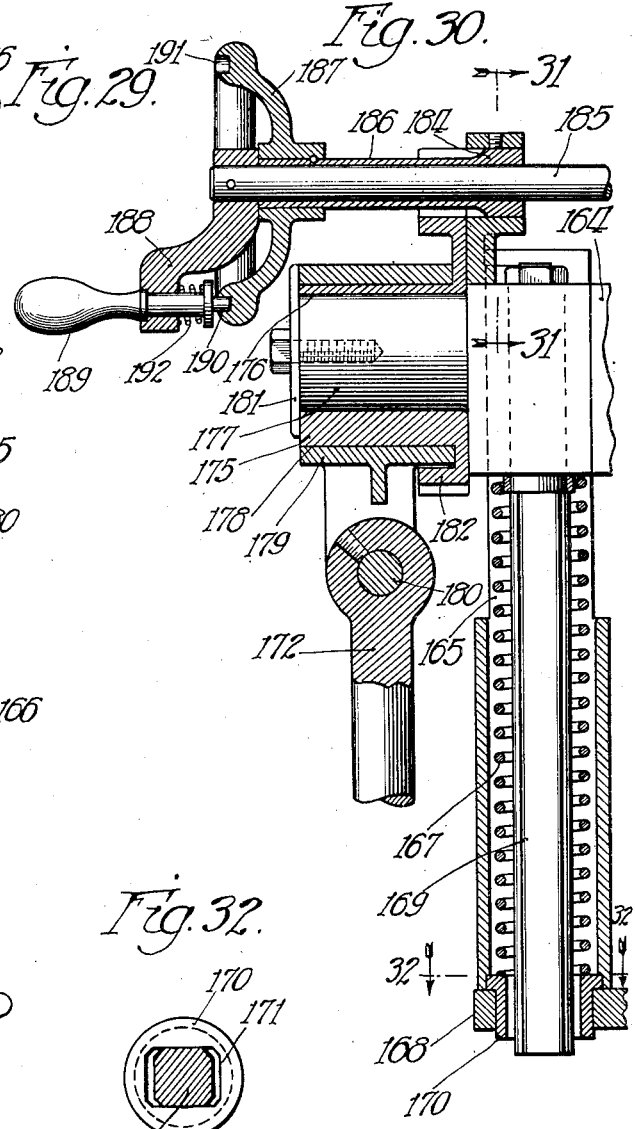
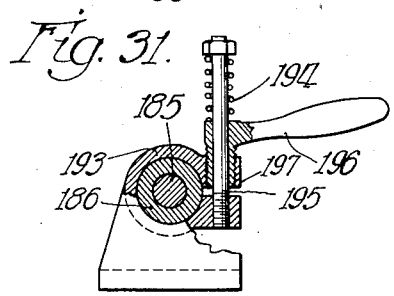
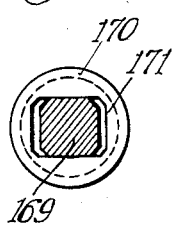
Inventor:
Thomas L. Green.

Dec. 19, 1933.  T. L. GREEN  1,939,810
BISCUIT MACHINE
Filed Jan. 29, 1925  30 Sheets-Sheet 19
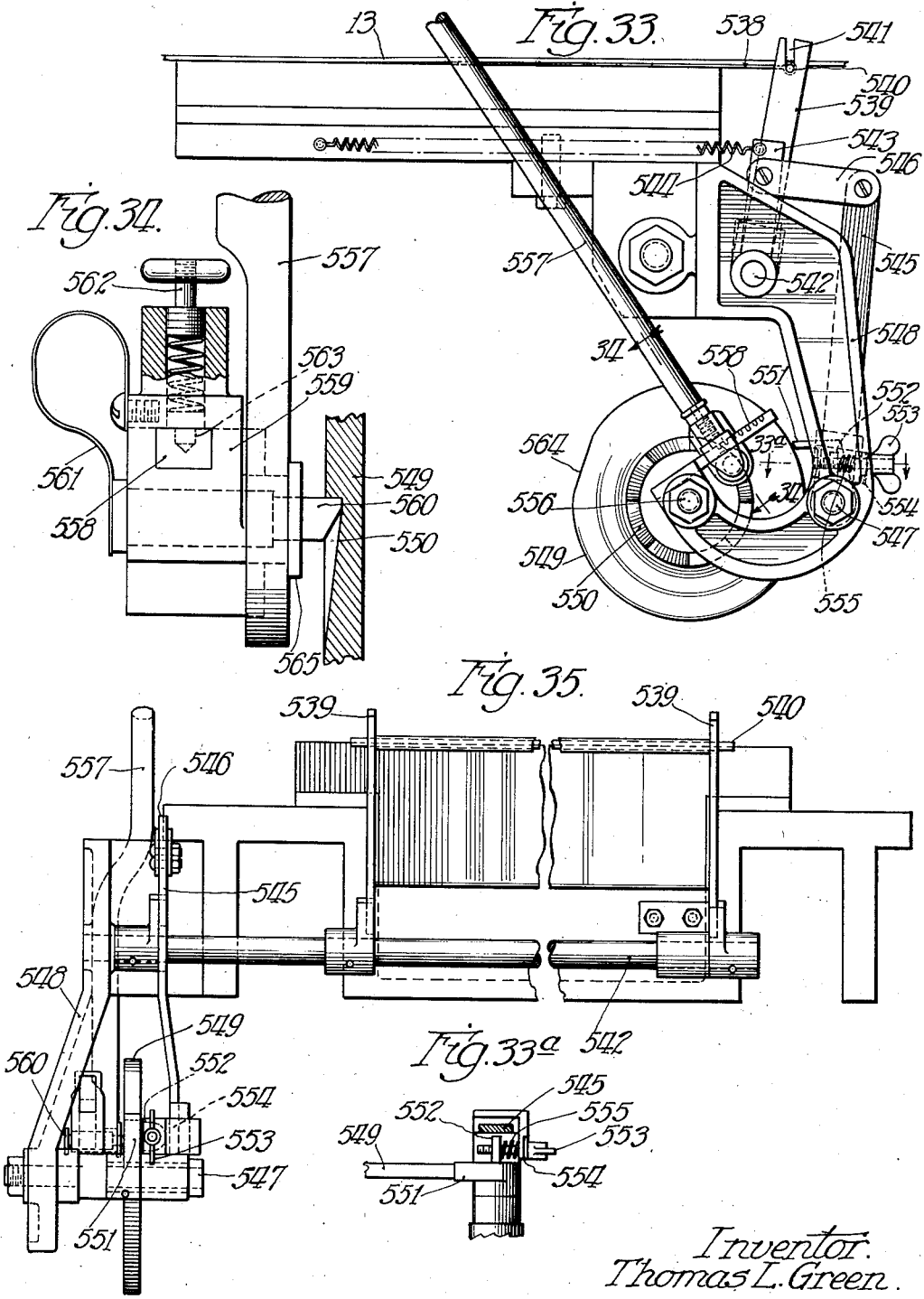
Inventor.
Thomas L. Green.
Emery, Booth, Janney & Varney. Attys.

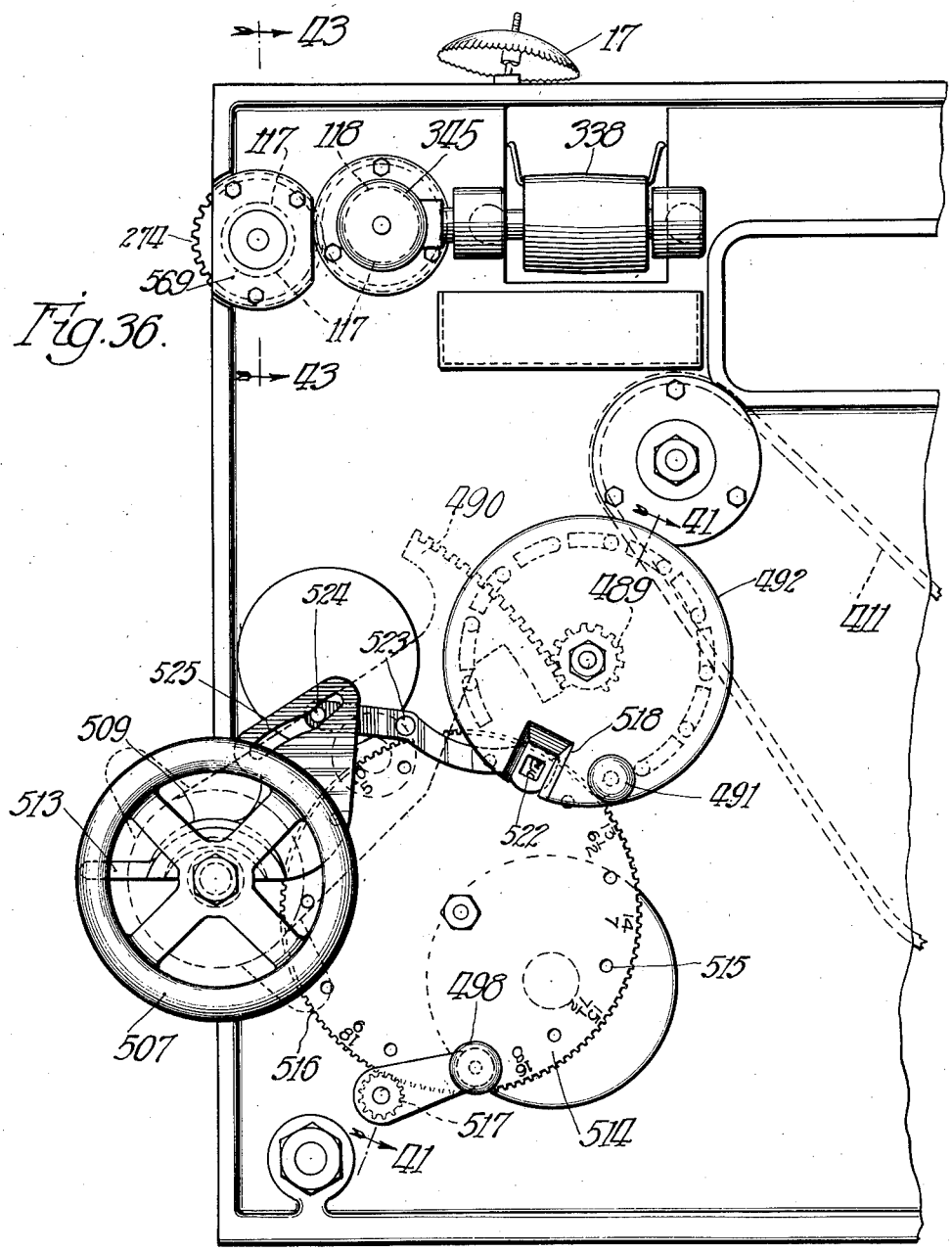

Dec. 19, 1933.  T. L. GREEN  1,939,810
BISCUIT MACHINE
Filed Jan. 29, 1925    30 Sheets-Sheet 21

Inventor
Thomas L. Green.
Emery, Booth, Janney & Varney Attys.

Dec. 19, 1933.  T. L. GREEN  1,939,810

BISCUIT MACHINE

Filed Jan. 29, 1925   30 Sheets-Sheet 22

Inventor:
Thomas L. Green
Attys.

Dec. 19, 1933.  T. L. GREEN  1,939,810
BISCUIT MACHINE
Filed Jan. 29, 1925  30 Sheets-Sheet 23
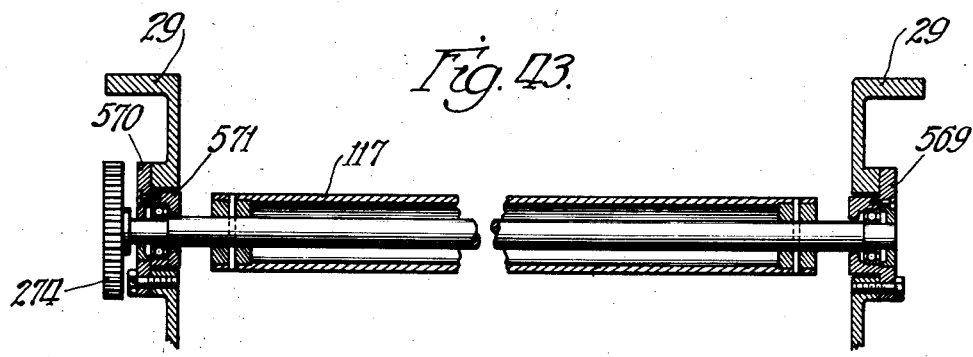
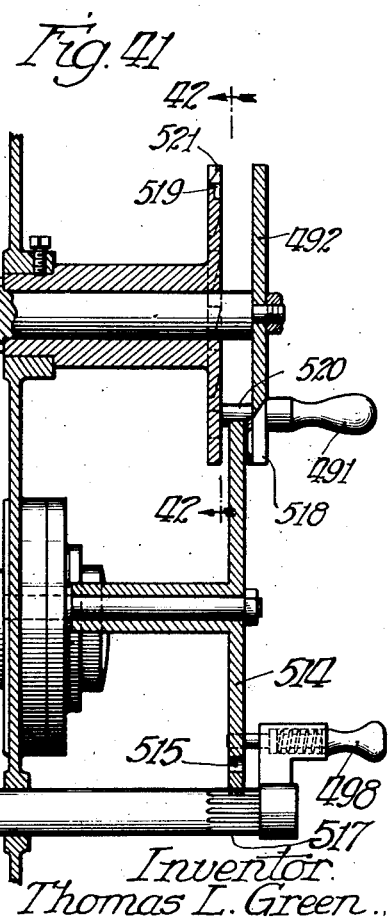
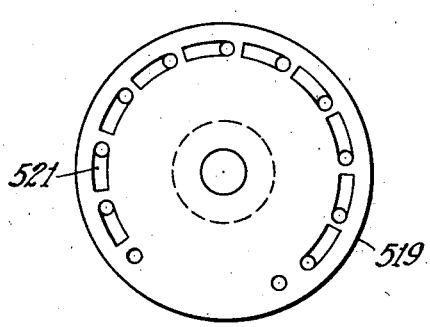
Inventor.
Thomas L. Green

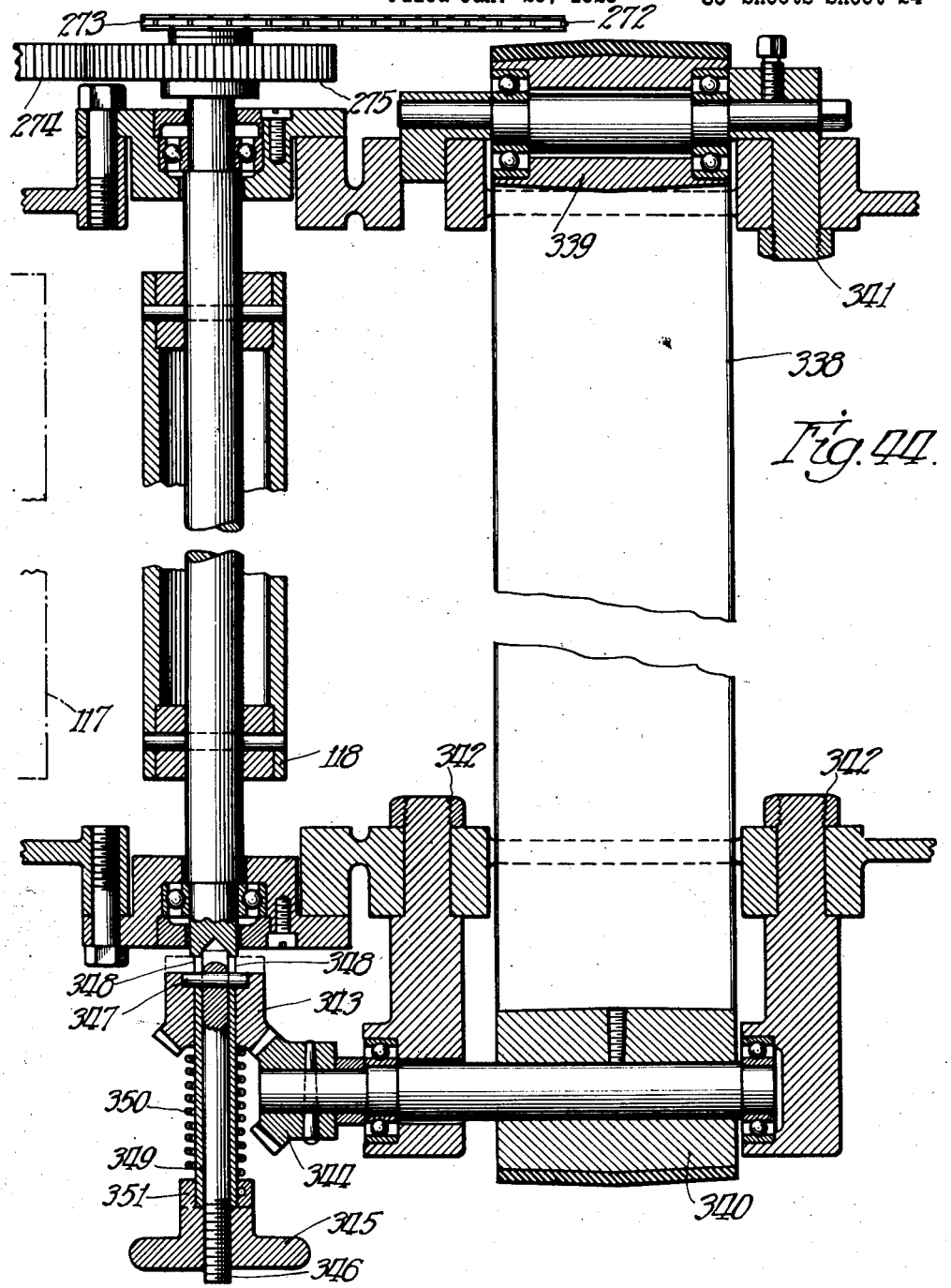

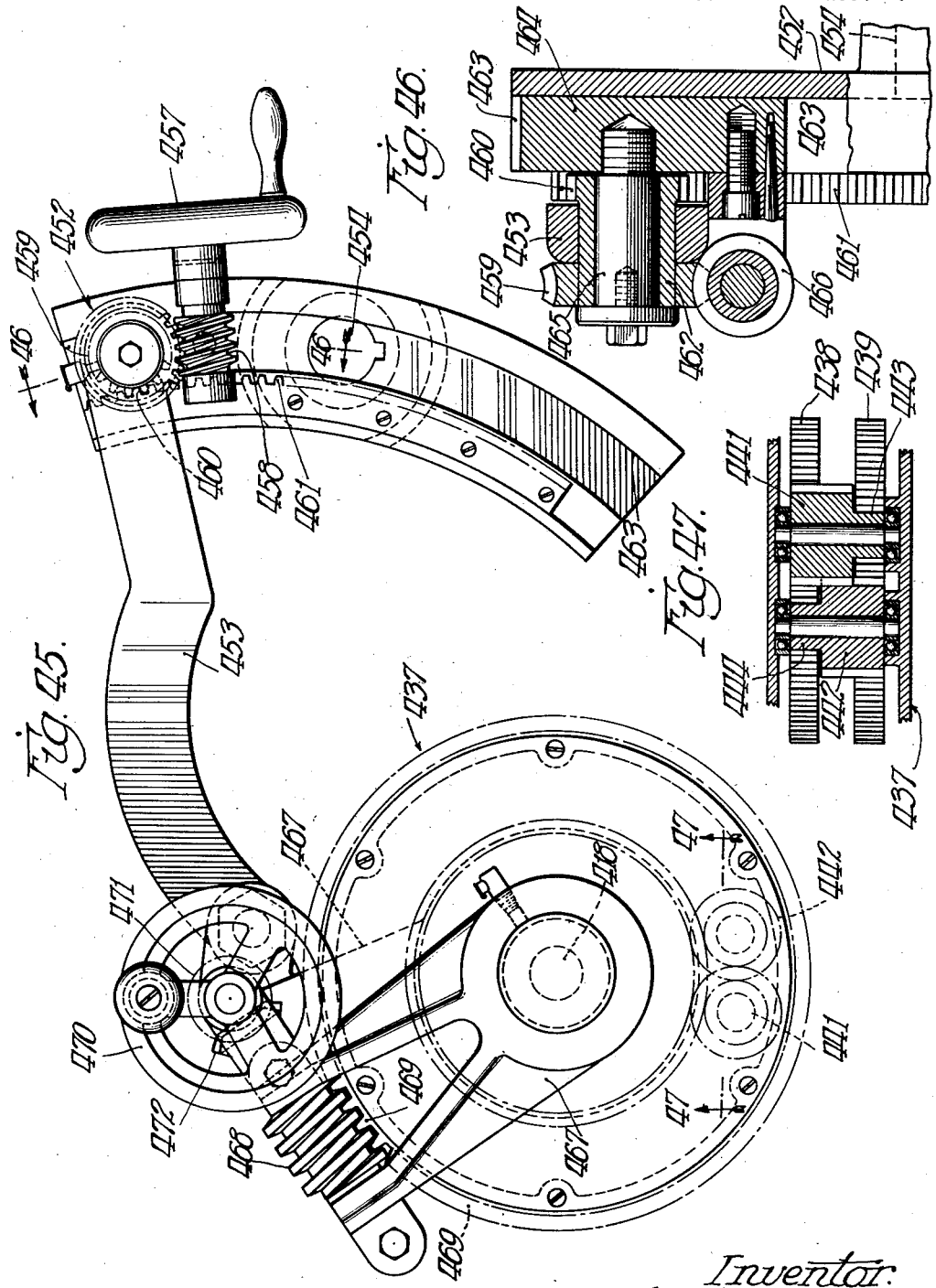

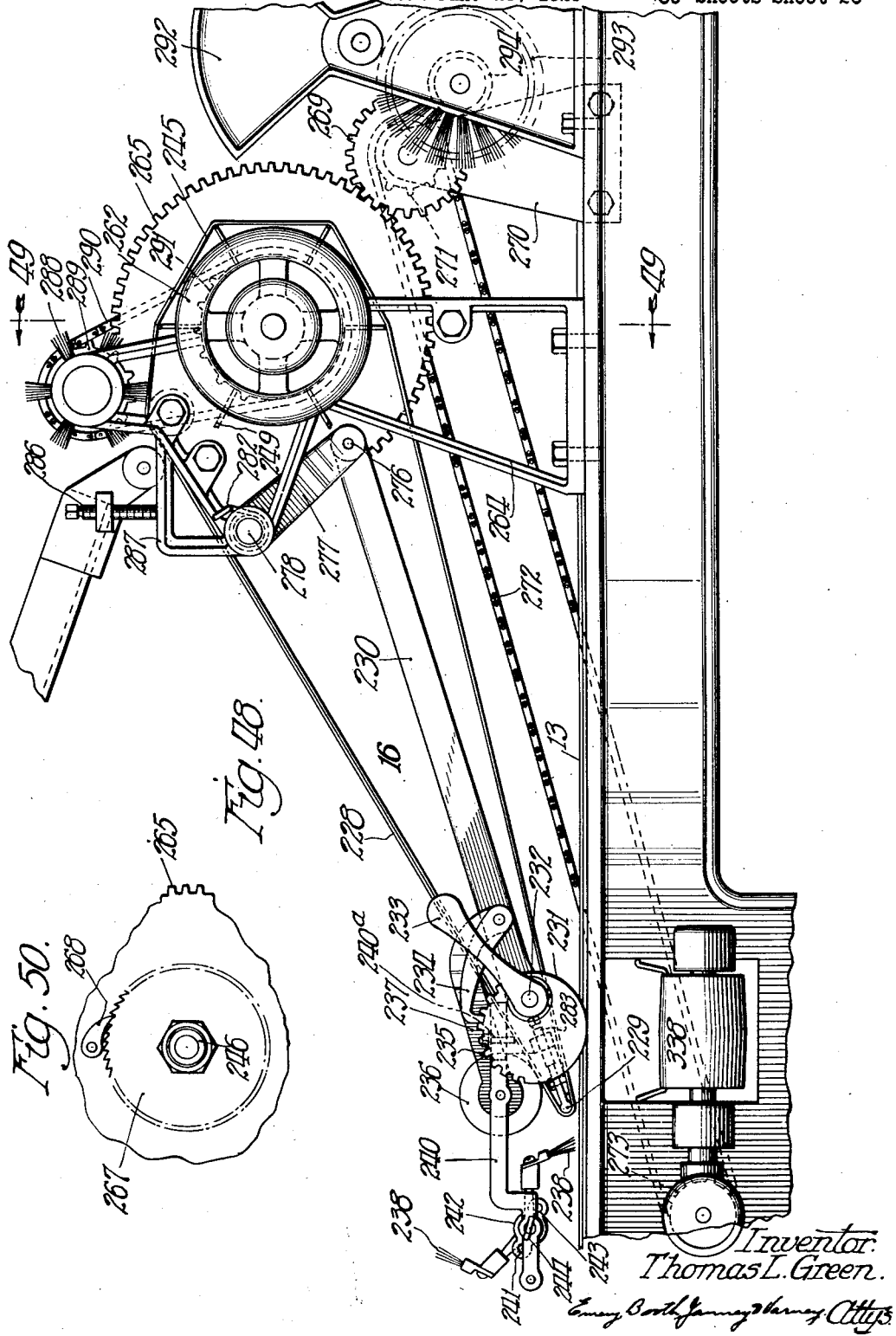

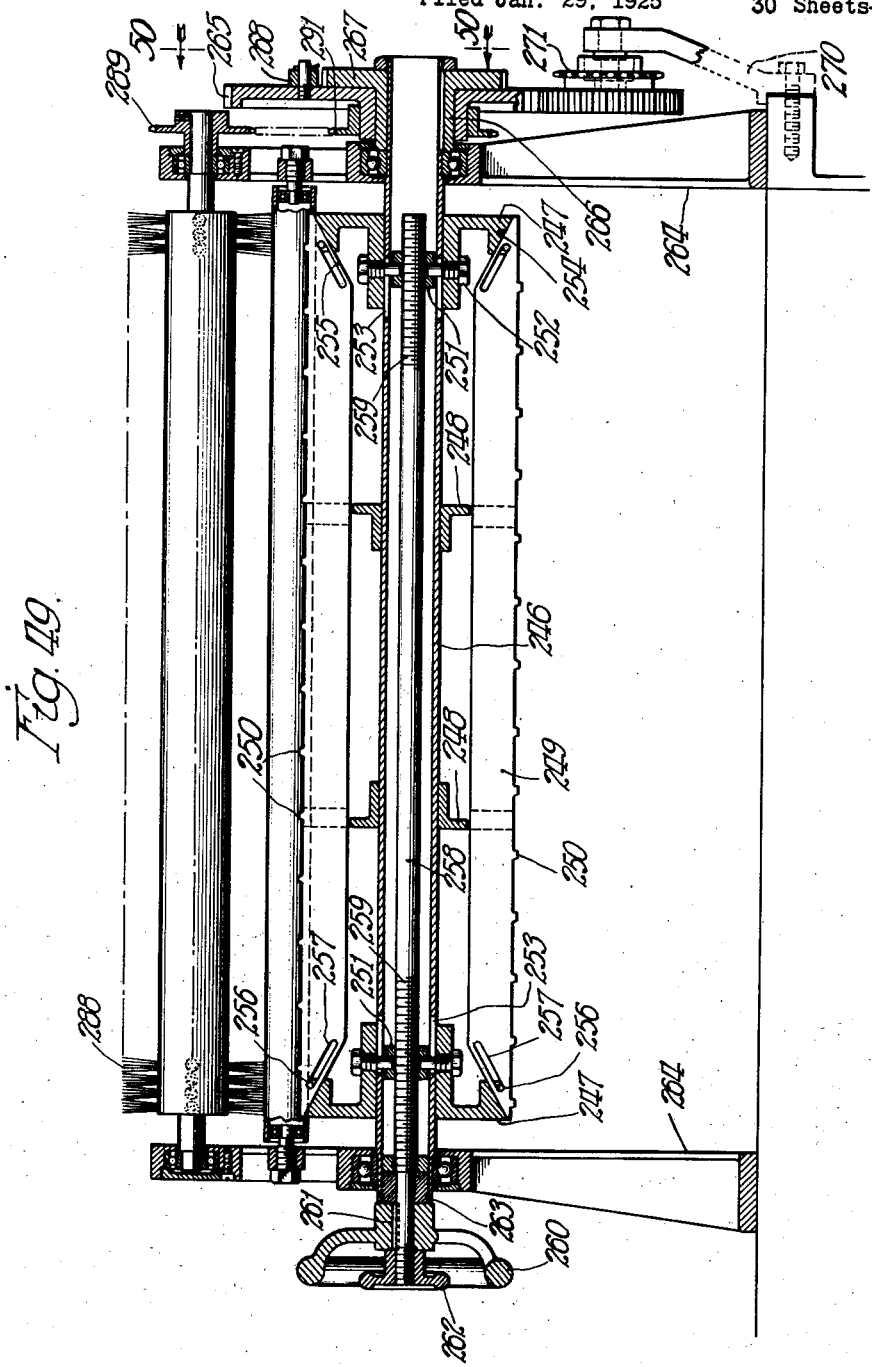

Dec. 19, 1933.  T. L. GREEN  1,939,810
BISCUIT MACHINE
Filed Jan. 29, 1925   30 Sheets-Sheet 28
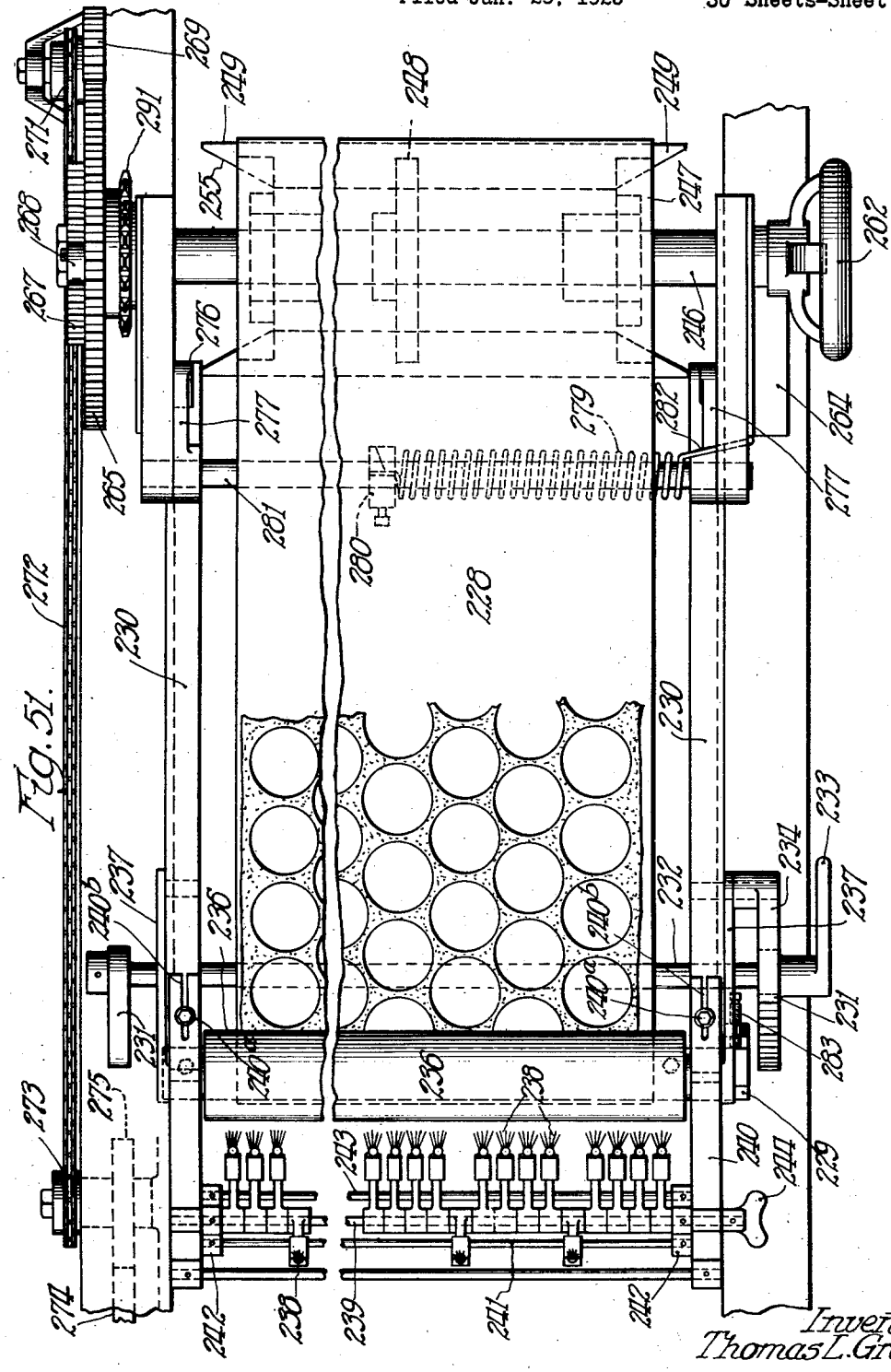
Inventor
Thomas L. Green

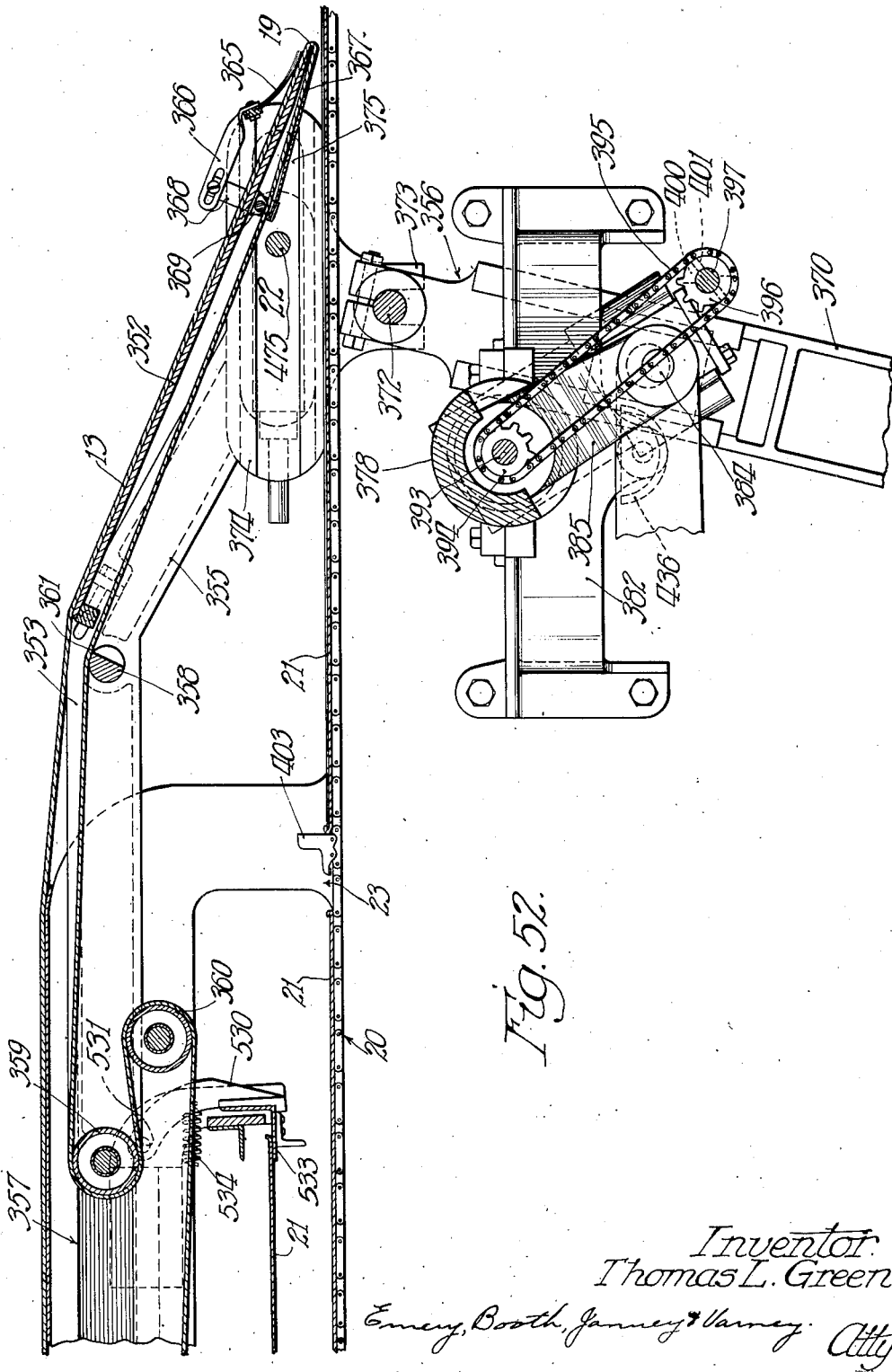

Dec. 19, 1933.  T. L. GREEN  1,939,810
BISCUIT MACHINE
Filed Jan. 29, 1925   30 Sheets-Sheet 30
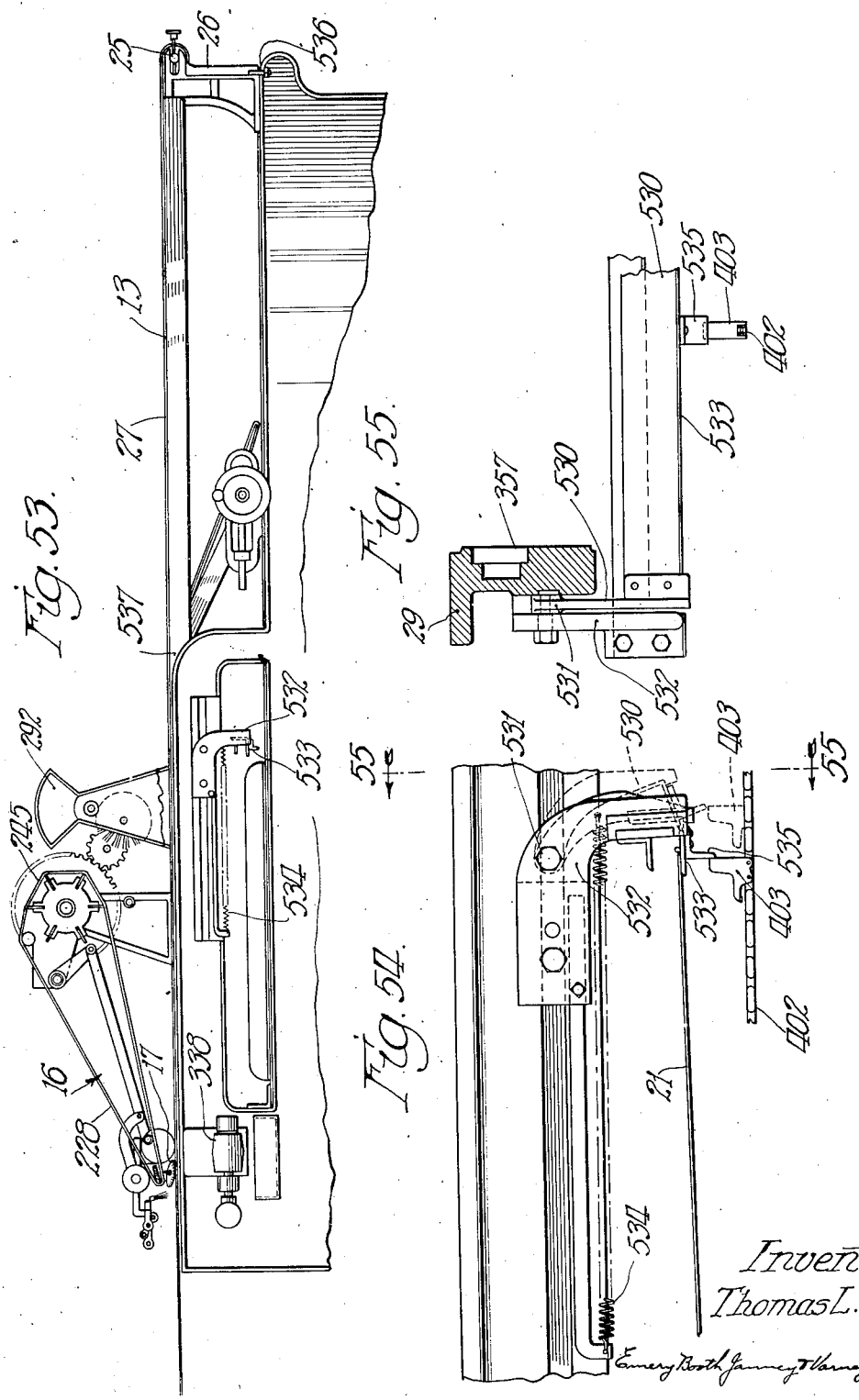

Patented Dec. 19, 1933

1,939,810

UNITED STATES PATENT OFFICE 1,939,810

BISCUIT MACHINE

Thomas L. Green, Indianapolis, Ind.

Application January 29, 1925. Serial No. 5,497

160 Claims. (Cl. 107—6)

This invention relates to biscuit machines and the like, and aims to provide an improved and efficient machine capable of high speed production and sustained, low cost operation.

The invention may be readily understood by reference to an illustrative machine embodying the invention and shown in the accompanying drawings.

In said drawings:

Fig. 4 is a vertical, longitudinal section of the delivery end of the machine viewed from the front side of the machine, this figure being a continuation of the section of Fig. 3, the two figures together illustrating a complete longitudinal, vertical section of the machine.

Fig. 8 is a plan view, certain parts being shown in the section, of the panner blade and its frame.

Figure 2:
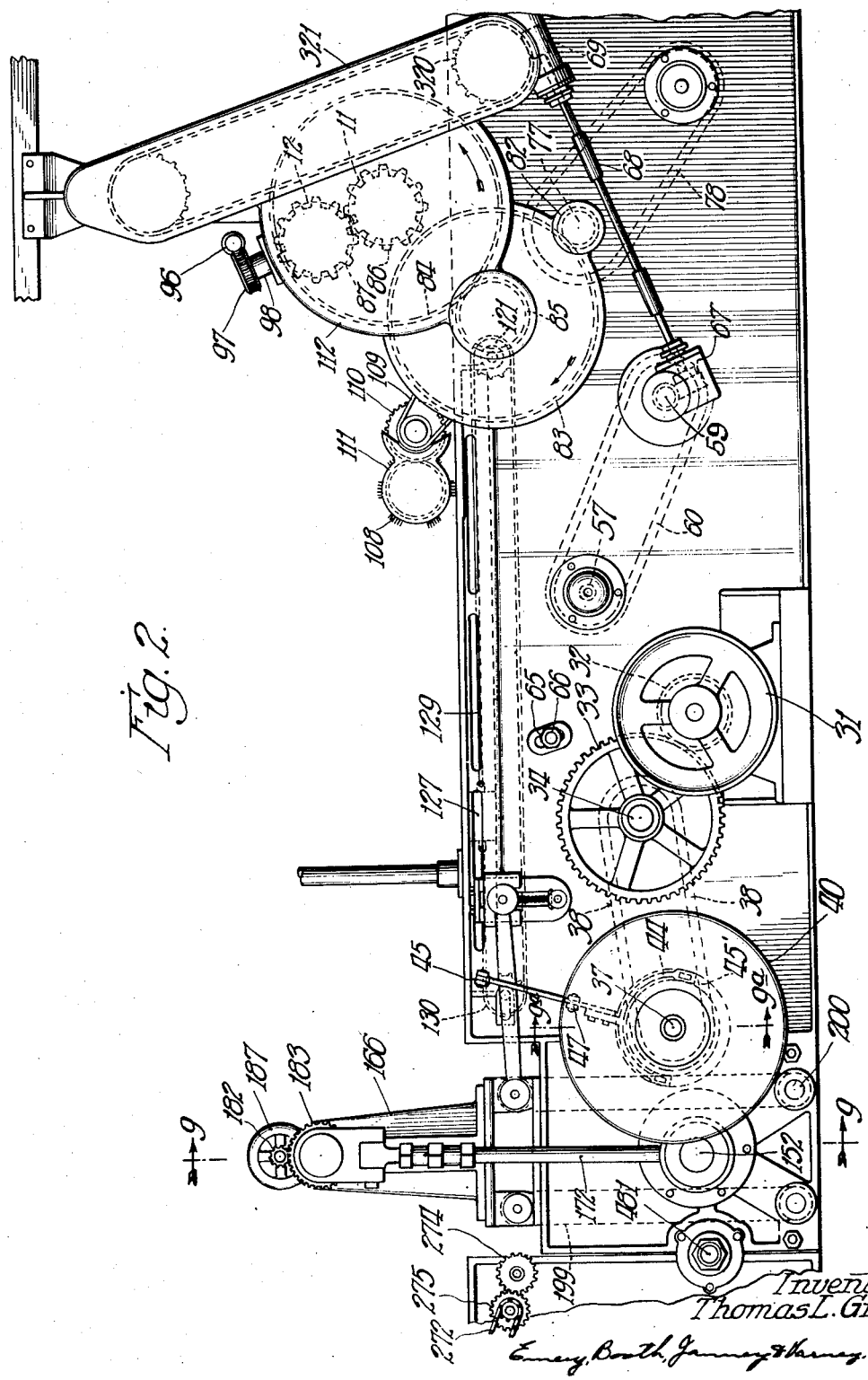
Fig. 2 is a side elevation of the receiving or rear end of the machine viewed from the back side, or the side opposite that shown in Fig. 1.
Figure 9:
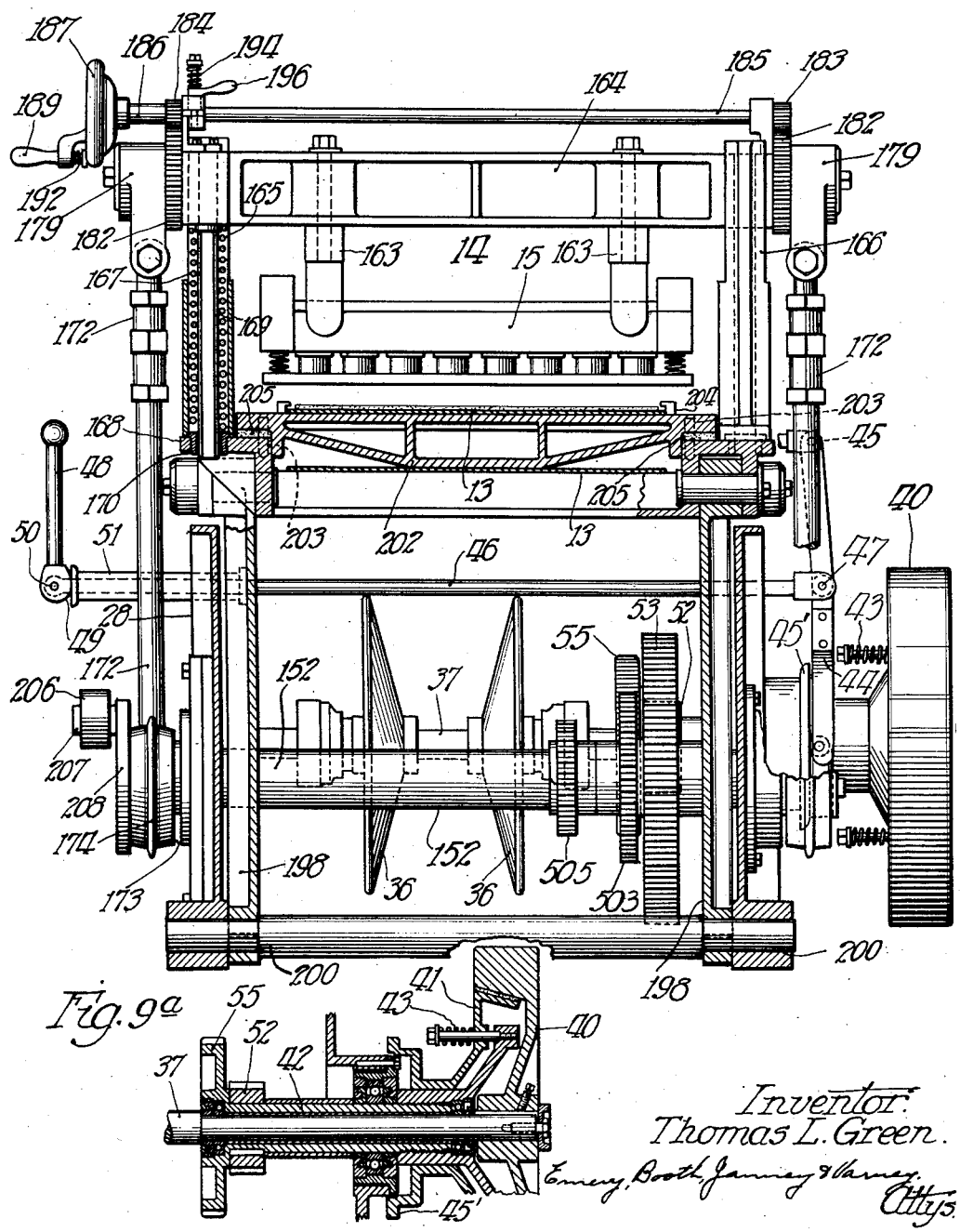
Fig. 9 is a vertical transverse section, taken along the line 9—9 in Figs. 1, 2 and 3, showing the cutter frame and operating mechanism.

Fig. 9ª is a detail section of the clutch taken on line 9ª—9ª of Fig. 2.

Figure 1:
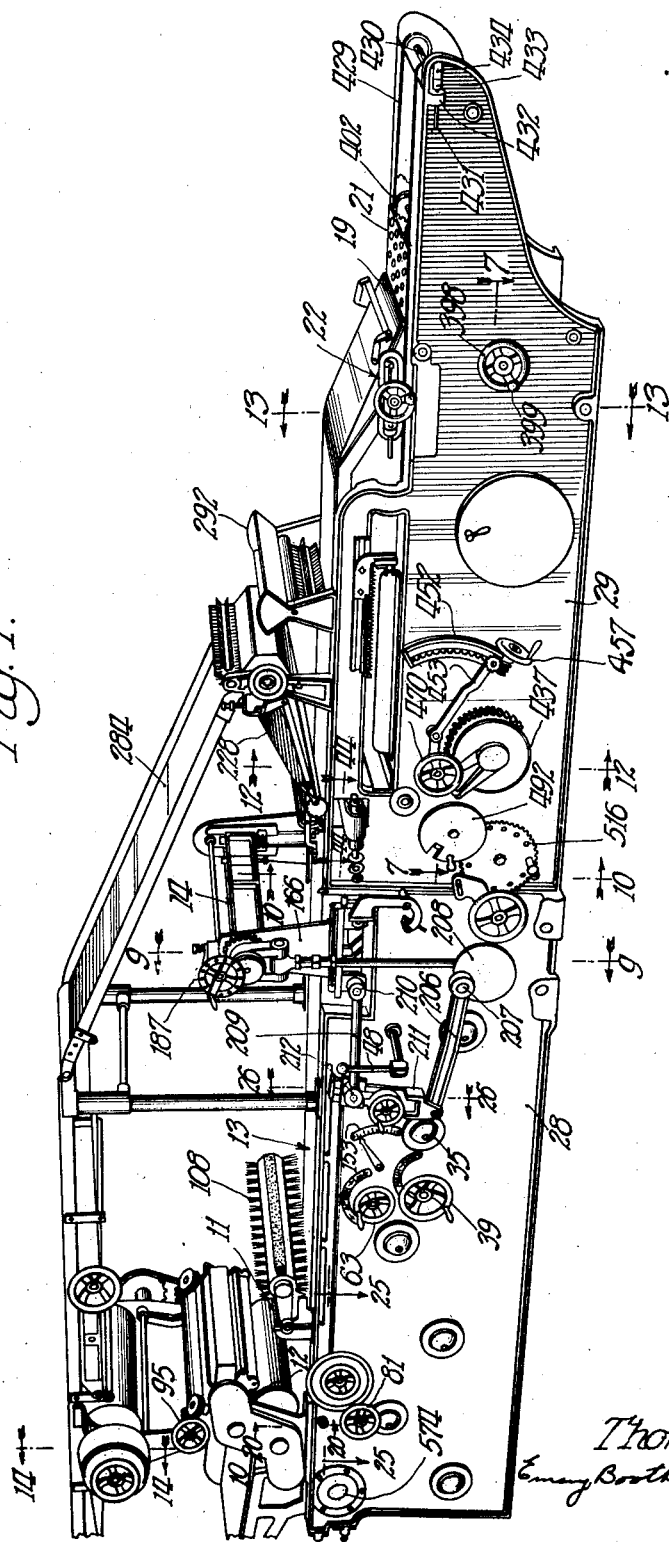
Fig. 1 is a perspective view of the machine viewed from the front or operating side, the left hand end of the machine being the receiving or rear end and the right hand end the delivery end.
Figure 10:
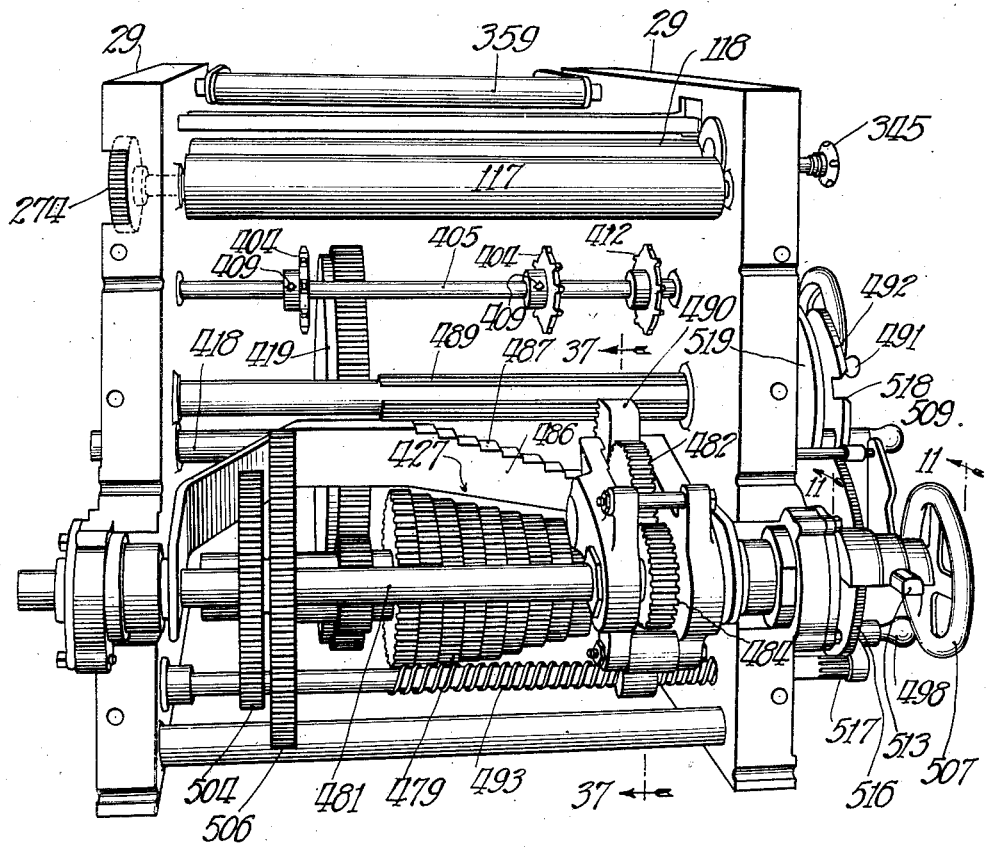

Fig. 10 is a perspective view of the interior of the forward section of the machine viewed from the rear end of the forward section at the plane 10—10 of Fig. 1.

Figure 7:
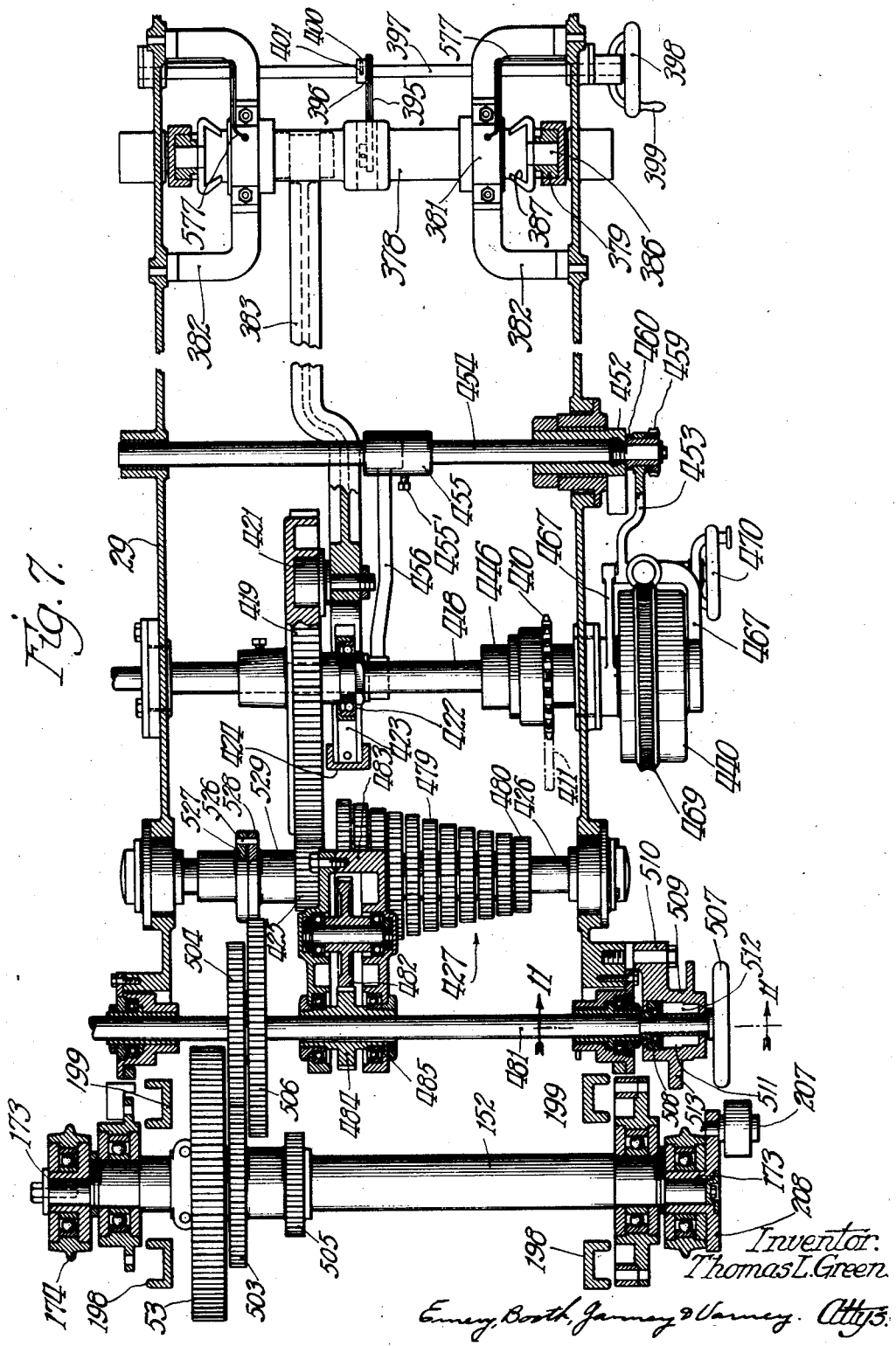
Fig. 7 is a plan view, taken along the line 7—7 in Figs. 1 and 4, showing the mechanism for operating the pan carrier and panner blade.
Figure 11:
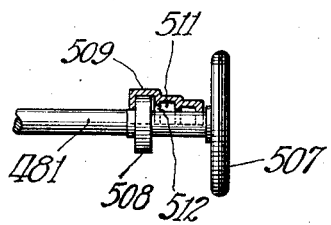

Fig. 11 is a section, taken along the line 11—11 of Figs. 7 and 10.

Figure 12:
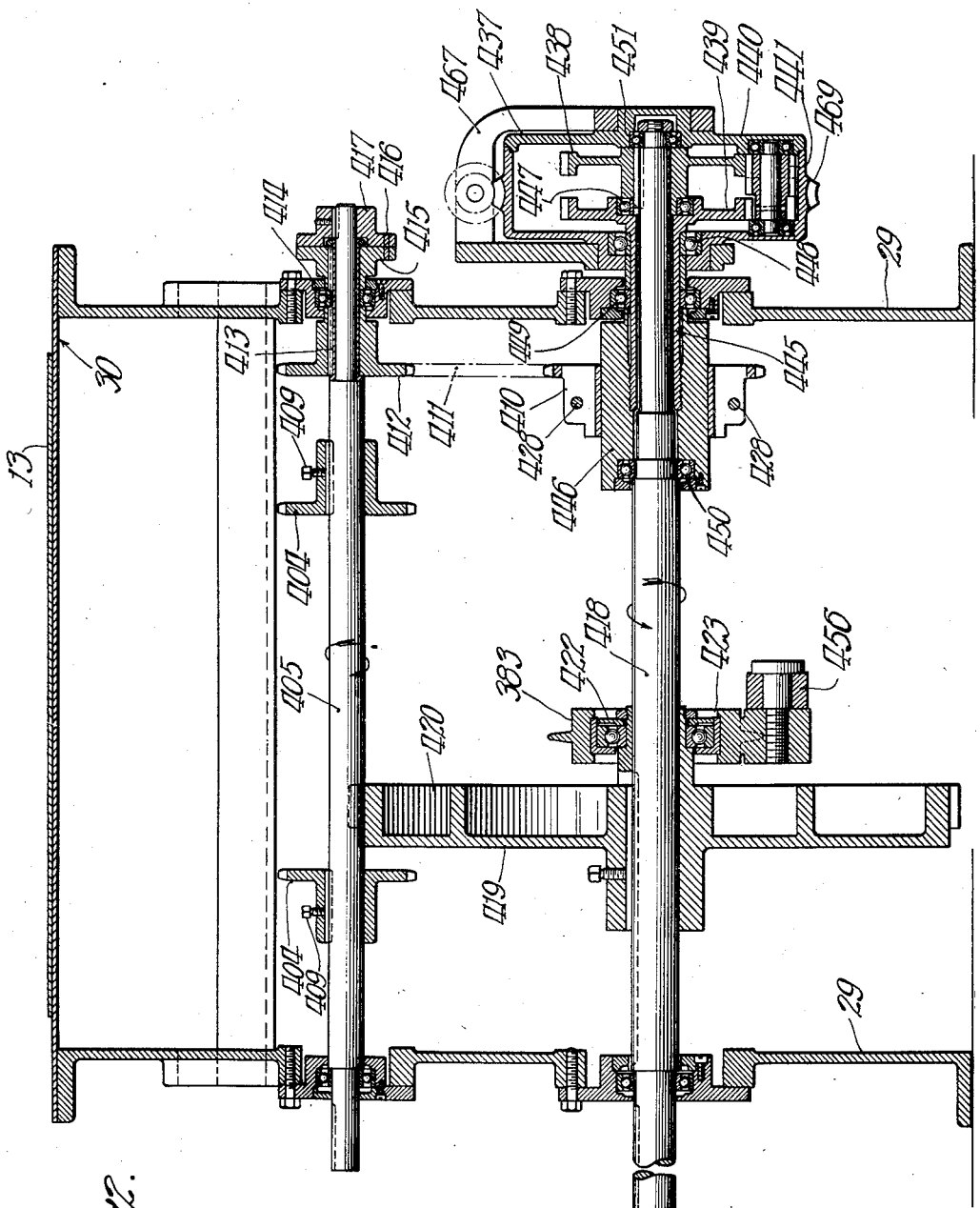

Fig. 12 is a vertical transverse section looking toward the forward or delivery end of the machine, and taken on the line 12—12 of Fig. 1.

Figure 13:
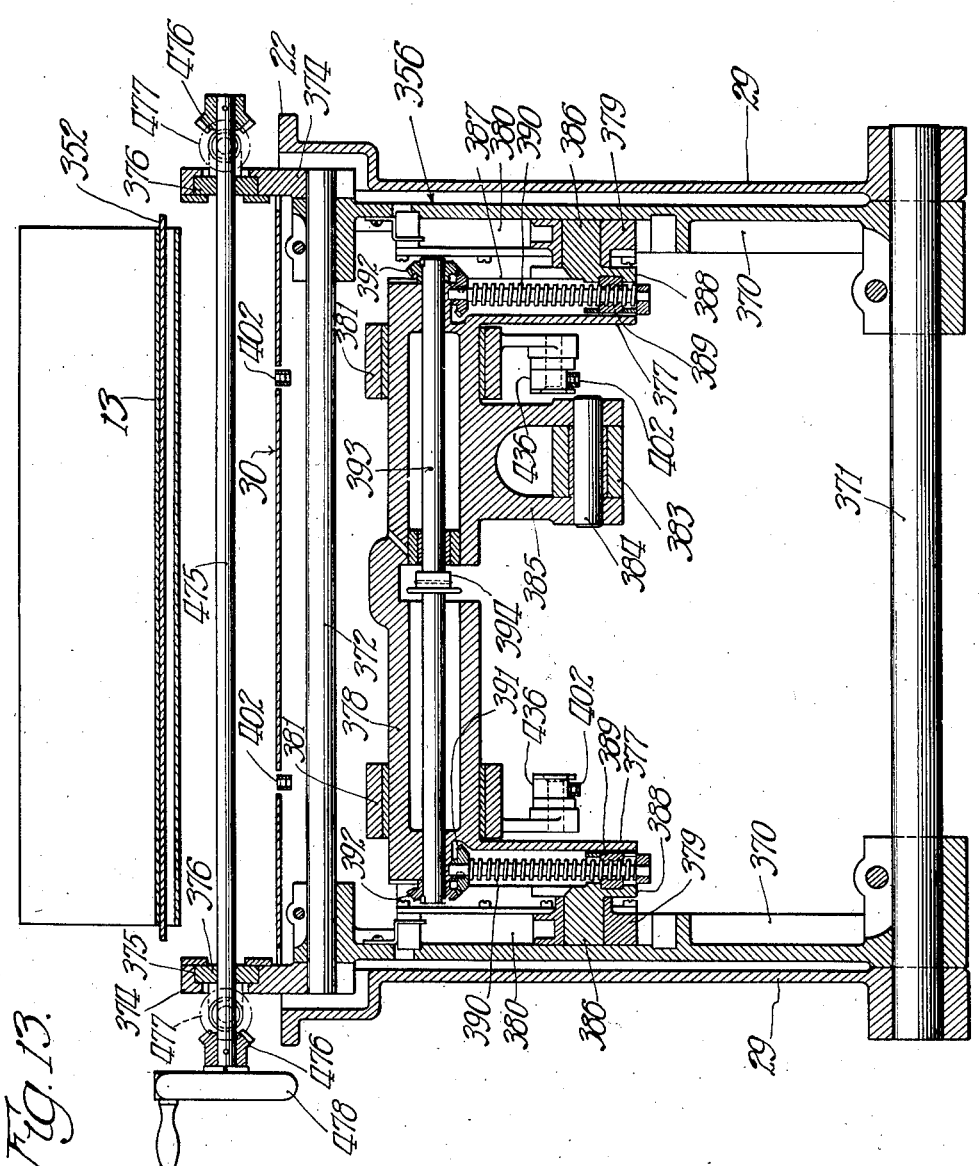

Fig. 13 is a vertical transverse section (looking toward the rear end of the machine), taken along the line 13—13 of Fig. 1, and showing particularly the panner blade operating and adjusting mechanism.

It will be observed that Figs. 9, 10, 12 and 13 are vertical transverse sections of the machine taken on successive planes from the rear to the forward end of the machine. The following figures illustrate various details of the illustrative machine.

Fig. 14 is a vertical section, taken along the line 14—14 of Fig. 1, showing the adjustable scrap carrier driving drum.

Fig. 15 is a cross section, taken on the line 15—15 of Fig. 14, illustrating the contour of one of the apron engaging rods.

Figure 3:
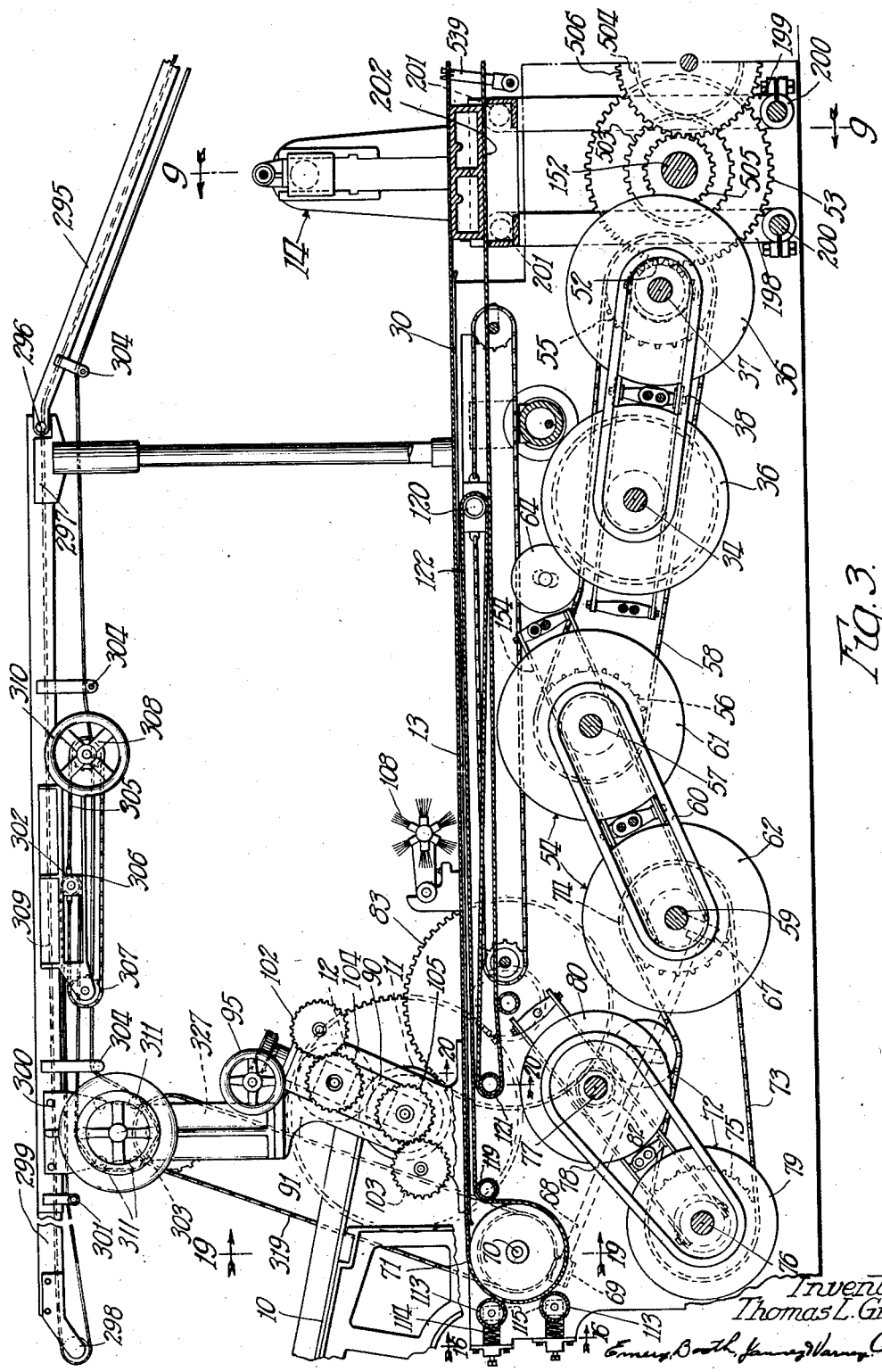
Fig. 3 is a vertical, longitudinal section of the receiving end of the machine viewed from the front side.

Fig. 16 is a vertical section, taken on the line 16—16 of Fig. 3, showing the spring pressed rolls associated with the main apron driving drum.

Fig. 17 is a vertical section, taken on the line 17—17 of Fig. 19, showing the dough gauge rolls and dust boxes.

Fig. 18 is an elevation of a detail illustrating the manner of operatively disconnecting the dust box agitators.

Fig. 19 is a transverse section, taken on the line 19—19 of Fig. 3, of the dough gauge rolls and their driving mechanism.

Fig. 20 is a vertical section, taken along the line 20—20 of Figs. 1 and 3, to illustrate the means for permitting the removal of one of the apron take-up rolls.

Figure 21:
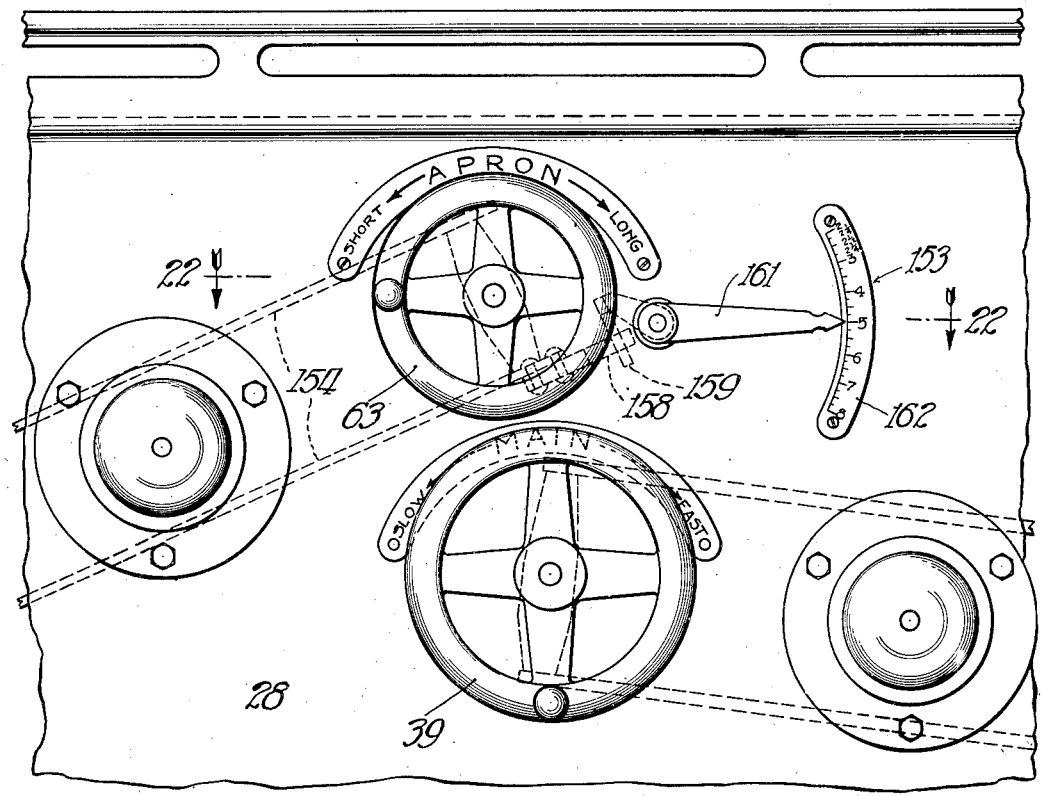

Fig. 21 is a side elevation of a portion of the front side of the machine showing a device for indicating the travel of the main dough apron.

Figure 22:
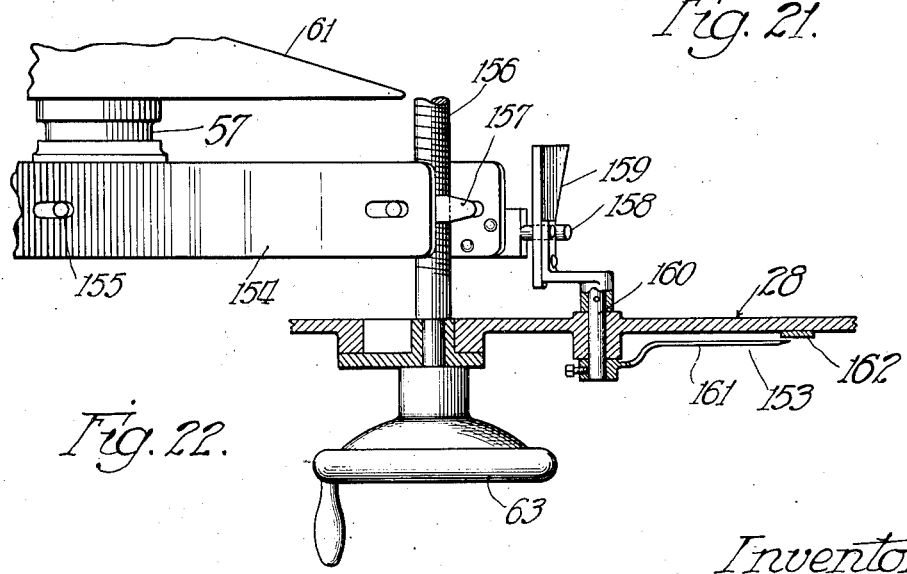

Fig. 22 is a plan section, taken along the line 22—22 of Fig. 21, to illustrate details of the mechanism of the indicating device.

Fig. 23 is a side elevation of the apron take-up device.

Fig. 24 is a section, taken along the line 24—24 of Fig. 23, illustrating the means for permitting the temporary removal of another of the apron take-up rolls.

Fig. 25 is a plan section, taken along the line 25—25 of Figs. 1 and 23, of the apron take-up device.

Fig. 26 is a section, taken along the line 26—26 of Fig. 1, showing the cutter head oscillating shaft and mechanism for adjusting the throw of the oscillating mechanism.

Fig. 27 is a plan view of the cutter oscillating shaft.

Fig. 28 is an elevation of the adjusting mechanism, viewed from the left hand end of Fig. 26.

Fig. 29 is an elevation, on an enlarged scale, of the upper portion of the cutter head operating and adjusting mechanism, illustrated in assembly in Fig. 9.

Fig. 30 is a vertical section, taken on the line 30—30 of Fig. 29.

Fig. 31 is a vertical section, taken on the line 31—31 of Fig. 30, of the device for locking the cutter adjusting shaft.

Fig. 32 is a plan view, taken along the line 32—32 of Fig. 30, showing a bushing for the cutter bar guide rod.

Fig. 33 is a side elevation of the mechanism for operating the automatic cut-off device.

Fig. 33ª is a detail section, taken on the line 33ª—33ª of Fig. 33.

Fig. 34 is a section of a detail, taken along the line 34—34 of Fig. 33.

Fig. 35 is a plan view of the automatic cut-off and operating mechanism.

Fig. 36 is a side elevation of the mechanism for adjusting the number of rows of cakes per pan.

Figure 37:
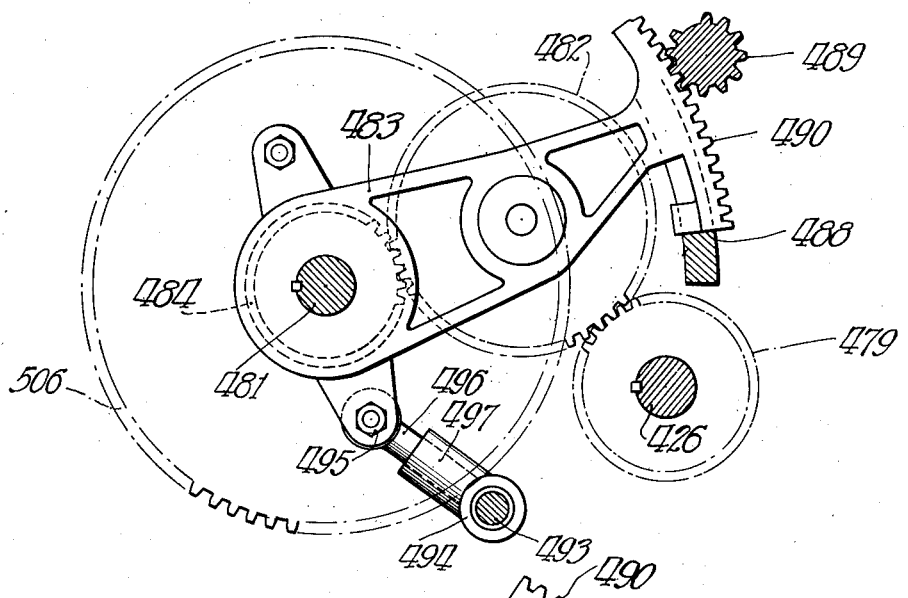

Fig. 37 is a vertical section, taken along the line 37—37 of Fig. 10, illustrating the pan-row adjusting gears in one adjusting position.

Figure 38:
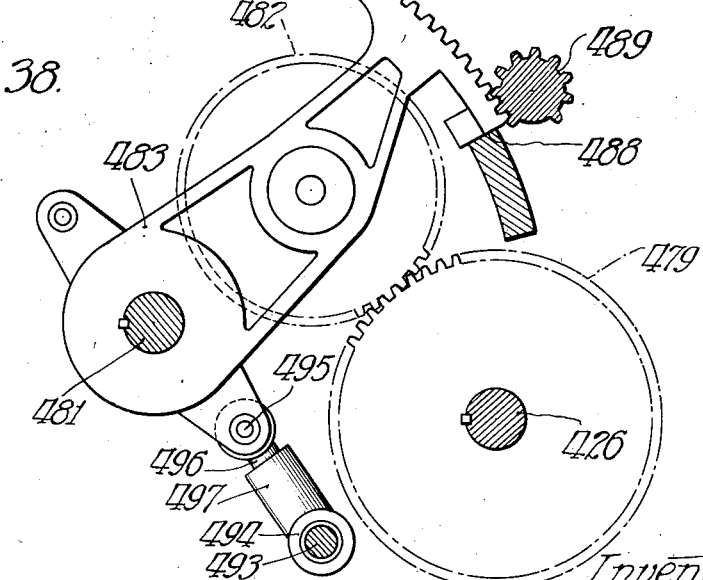

Fig. 38 is a similar section showing the pan-row gears in another position adjusted for panning.

Figure 39:
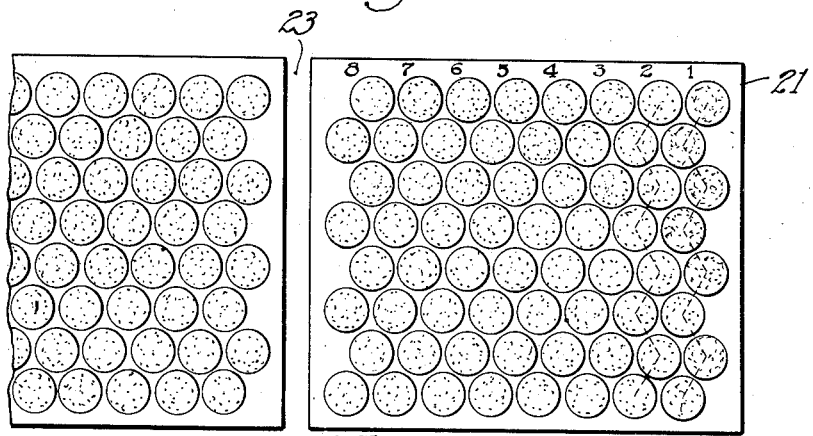

Fig. 39 is a diagrammatic view illustrating a pan carrying a number of complete rows of cakes.

Figure 40:
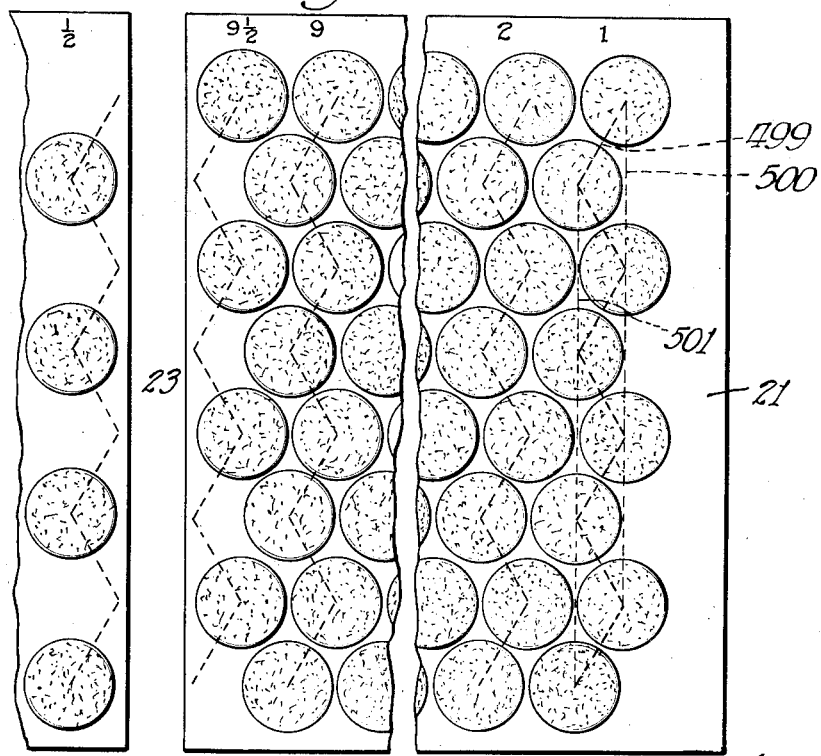

Fig. 40 is a diagrammatic view illustrating the result of an adjustment of the pan-row mechanism to pan half of a row of cakes on one pan and the balance of that on the succeeding pan.

Fig. 41 is a detail section of the pan-row adjusting mechanism, taken along the line 41—41 of Fig. 36.

Fig. 42 is an elevation of the ratchet plate, taken along the line 42—42 of Fig. 41.

Figure 4:
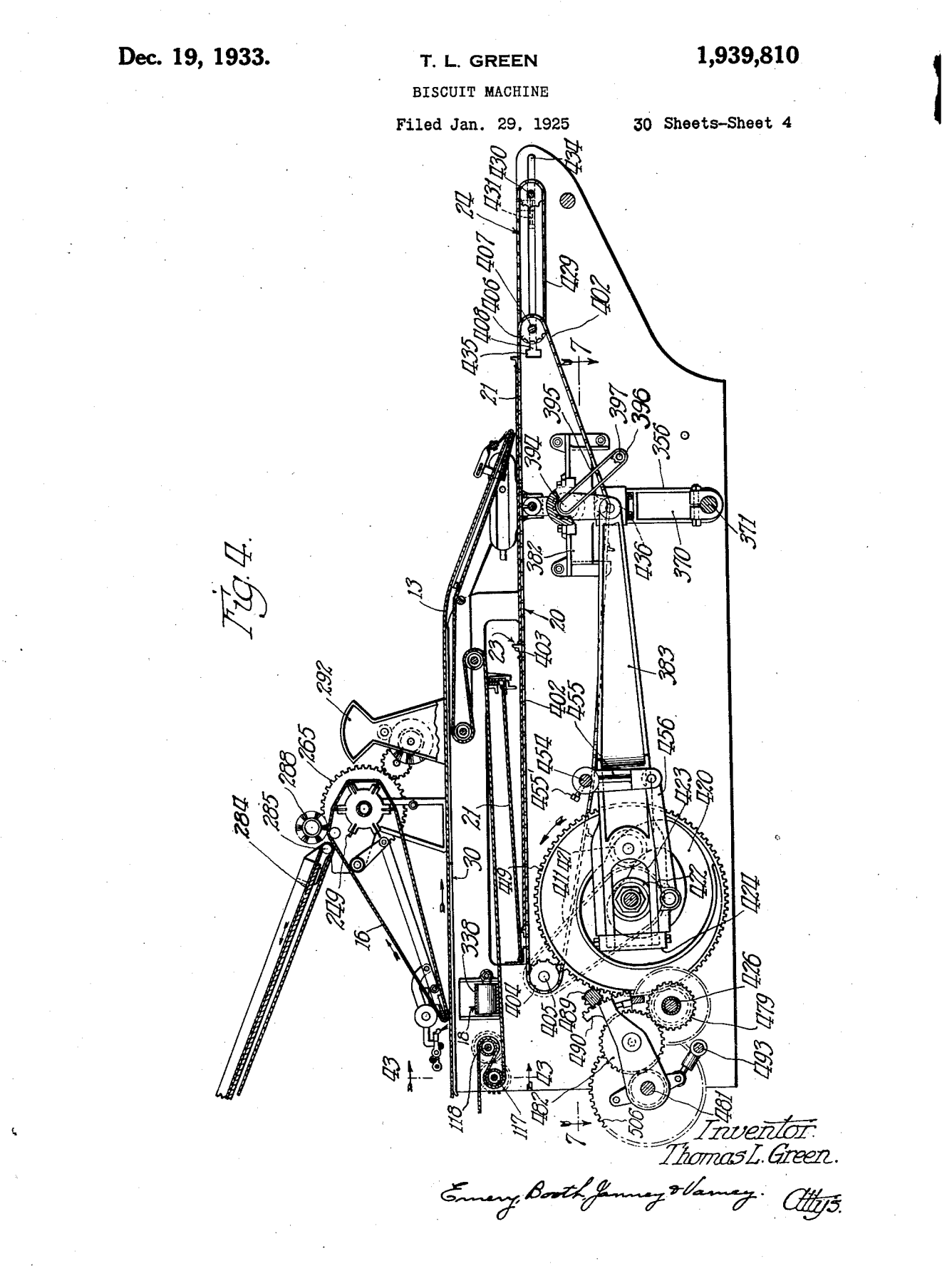

Fig. 43 is a vertical section, taken along the line 43—43 of Figs. 4 and 36, of an apron roll illustrating the means for permitting the removal of this roll to insert an endless apron.

Fig. 44 is a plan section, taken on the line 44—44 of Fig. 1, showing the cross scrap apron and operating mechanism.

Fig. 45 is an elevation of the pan speed adjusting differential and operating mechanism, (illustrated in section in Fig. 12).

Fig. 46 is a detail section, taken along the line 46—46 of Fig. 45.

Fig. 47 is a bottom plan section, taken along the line 47—47 of Fig. 45, illustrating certain of the differential gears.

Fig. 48 is a side elevation of the receiving portion of the scrap carrier.

Fig. 49 is a vertical section of the scrap carrier, taken along the line 49—49 of Fig. 48.

Fig. 50 is a detail elevation of the scrap apron driving pawl and ratchet, taken on the line 50—50 of Fig. 49.

Fig. 51 is a plan view of the receiving end of the scrap carrier.

Fig. 52 is a vertical longitudinal section of the panner blade and mechanism for oscillating the panner blade.

Fig. 53 is an elevation of the forward end of the machine when converted for peeling.

Fig. 54 is a detail side elevation of the pan dropping mechanism.

Fig. 55 is a vertical section, taken on the line 55—55 of Fig. 54, illustrating the manner of tripping the pan dropping device.

The illustrative machine is organized and constructed to be capable of sustained operation at high speed production, and, among a variety of uses, can be advantageously employed for low cost and quantity production of cakes, crackers, and the like.

This machine is generally characterized by the formation of biscuits or other articles from a continuously moving dough sheet or the like and their periodic deposit, in properly spaced relation, on receiving means.

Figure 5:
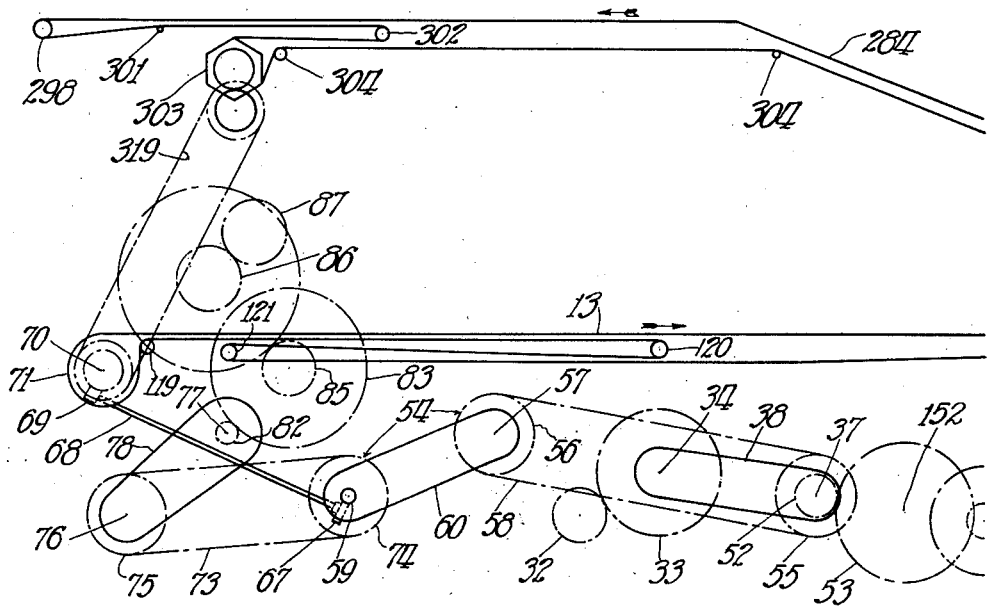
Fig. 5 is a diagrammatic view illustrating the driving train and the main and scrap aprons at the receiving end of the machine.
Figure 6:
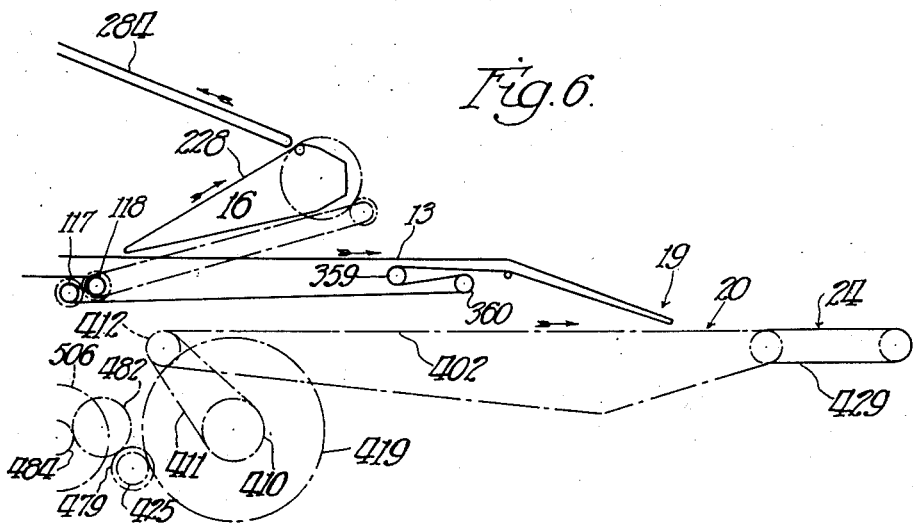
Fig. 6 is a corresponding diagrammatic view of the driving train and main and scrap aprons at the forward or delivery end of the machine.

In the present machine the dough is supplied either in bulk or in preliminarily sheeted condition to a table or platform 10, from which it is passed through sheeting means represented by the gauge rolls 11 and 12, which reduces it to the required thickness and dusts it on one or both sides, as desired, with flour or other non-adhesive material, and then delivers the sheet to conveying means represented by the dough apron 13 (Figs. 1, 3 and 4), the general course of which is illustrated diagrammatically in Figs. 5 and 6. For convenience in description, I shall refer to the material acted on by the machine as "dough" or "dough sheet."

The conveyor 13 carries the dough sheet underneath a revolving brush which removes excess flour and foreign particles, and through such other preliminary treatment as may be necessary or desired, depending on the character of the material handled and the articles to be formed therefrom, and then brings it into position for manipulation by forming means, which dies, cuts, or embosses and cuts,—such dieing, cutting or cutting and embossing means (hereinafter referred to, for the sake of brevity, as the cutter) is herein represented by the cutter mechanism 14, (Fig. 9), which operates a dieing, cutting or cutting and embossing unit 15 (hereinafter referred to for brevity as the cutting unit or cutter). The cutter dies, cuts out or embosses and cuts out of the dough sheet, the desired articles. Depending on the character of the articles to be formed, the cutter either cuts substantially completely through the material or only partly through. For example, in forming a square or rectangular soda cracker (which is usually baked in sheet form), the cutter merely shapes and partly cuts the dough, whereas in making a circular wafer or cracker (or articles of any shape resulting in the formation of scrap dough), the cutter cuts substantially or entirely through the dough sheet.

In the present instance, the conveyor or dough apron 13 moves continuously at a uniform rate, and the cutter is arranged to travel with the sheet substantially at apron speed during the forming operation.

In order to simplify description I shall employ the term "biscuits" or "cakes" to designate the crackers, wafers, cakes, biscuits, lozenges or other articles formed by the machine.

A convenient distance beyond the cutter in the direction of travel means, represented by the scrap carrier 16 (Figs. 1, 4 and 48), is provided for removing the scrap (wherever sheet scrap is formed),—in this instance by lifting it from the dough apron and out of engagement with the cut biscuits. In the case of articles baked in sheet form or certain types of bar cakes, hereinafter more fully described, sheet scrap is not present and the scrap carrier does not function. In such cases the only scrap may be a strip of scrap along the margins of the dough sheet 14, which is removed laterally by devices 17 and conveyed to a suitable position by cross scrap carrier 18 (Figs. 44 and 53.)

In this instance the scrap carrier 16 delivers the scrap to another scrap carrier which travels 150 toward the rear of the machine and returns the scrap to the bulk dough.

Assuming for the purpose of general description, that the biscuits formed are in separated condition on the apron, the apron carries such separated biscuits to the delivery end or point 19, from which they are delivered to whatever receiving means are employed to transfer the biscuits to the oven. The biscuit receiving means in this instance is exemplified by a carrier 20 (Figs. 4 and 52), carrying cake receiving pans 21 in spaced relation.

Suitable means, represented by the panner reciprocating mechanism 22 (Figs. 13 and 52), are provided for manipulating the delivery end 19 of dough apron to function periodically instead of continuously, to deliver the cakes periodically in properly spaced relation and in proper number to the spaced pans which, in this instance are caused to travel forwardly by the carrier 20, and to interrupt delivery periodically to prevent the deposit of biscuits in the interval 23 between adjacent pans.

The filled pans are carried forward and delivered to a carrier 24, which is without any positive pan pushing means so that the travel of a pan on this carrier may momentarily be retarded if desired. From the carrier 24 the filled pans are delivered to the ovens or other agencies for treating the material.

For some types of articles such as soda crackers which are baked in sheet form, it is sometimes desired to "peel" sections of the died dough directly from the apron 13, eliminating the use of pans or other receiving means. In such cases, the main apron 13 is extended, preferably in a plane, beyond the end of the panner blade or normal delivery end (see Fig. 53). Means are provided for providing a surplus length of apron so that the same may be run around a roll 25 supported in an auxiliary frame 26. The horizontal extension 27 of the apron provides a convenient region for "peeling" the sections of died dough from the apron. In this mode of operation the sections of died crackers are removed by large paddles or "peels" which are dextrously slipped under a section of dough to remove it from the apron.

The major portion of the operating mechanism of the machine is sufficiently enclosed to exclude dust and dirt, between supporting means represented by side plates or frames which are advantageously formed for convenience in manufacture and assembly, into two sections 28 and 29 (Fig. 1). These plates are substantially duplicated at the opposite side of the machine and are imperforate except for desired openings to provide bearings and entrance to the interior, all of which are closed to exclude dust. Extending across the upper edges of the side plates are a series of top plates 30 which lie directly beneath the upper run of the apron 13. These plates are removable and are formed in as many sections as convenience requires, and substantially close the space between the upper edges of the side frames. End plates may also be advantageously provided for effecting a substantially complete enclosure of the interior of the machine. This enclosure advantageously excludes the dust and foreign particles which ordinarily would collect in great quantities in machines of this character, owing to the character of materials handled thereby,—making it difficult to keep the machine in proper working order.

To provide for lubrication of interior moving parts from the exterior, lubrication conduits, for example, small pipes or tubes, are carried from the side frames to the interior of the machine. Preferably all bearings, which can be advantageously so provided, consistently with good machine practice, are provided with ball or roller bearings of any approved design, which receive grease lubrication from the conduits and need be lubricated only at very long intervals. These lubrication conduits preferably terminate with a spring ball or other closure, to exclude dust and which open under the pressure of lubricant to admit the lubricant. Any one of the number of well-known lubricating systems of this character may be employed, the lubricating system being preferably arranged and designed to require lubrication of the machine only at long intervals and from accessibly located points on the exterior of the machine. This avoids daily lubrication of numerous inaccessibly located parts of the machine with the attendant consequence that, in the haste of daily lubrication, the mechanic neglects to lubricate numerous parts which were inconveniently located.

Power is supplied to the machine by suitable means, represented by the electric motor 31, (Fig. 2) located at the back side of the machine, which delivers power through reduction gears 32 and 33,—the latter secured to shaft 34 which extends across the machine and is supported in bearings 35 located in the front and back side plates 28. In this instance, shaft 34 is the driving shaft of a variable speed transmission, which is exemplified by a transmission of the Reeves type.

Such a transmission is characterized by relatively adjustable pairs of cone discs 36 (one pair, on shaft 34, forming a driving, and the other pair, on shaft 37, a driven pulley or wheel, each pair being splined to its respective shaft), the effective diameter of which may be varied by varying the spacing of the cone discs along the shaft (Figs. 3 and 9). A belt or equivalent element 38 runs over the cone surfaces, formed by the opposing cone discs, and transmits power from the driving to the driven cones discs. By varying the distance betwen adjacent discs simultaneously,—to enlarge and reduce correspondingly the effective diameters of these driving discs,—the speed of transmission from the driving to the driven shaft may be varied. A variable transmission unit of this type is described in Williams Patent No. 1,648,174, and further description of the details of the transmission is neither necessary nor desirable for the purpose of the present case.

The variable speed transmission just described may be termed, for convenience, the main transmission because, from its driven shaft 37, the various operating instrumentalities of the machine derive their power. The speed of shaft 37 may be varied relative to the speed of the driving shaft 34 by an appropriate adjustment of hand wheel 39 at the front of the machine (Fig. 1) which affects the speed variation by simultaneously varying spacing between the respective pairs of cones 36 in the manner described above. (For details of this construction refer to said Williams patent). Such speed variation varies the speed of the machine as a whole. Certain other speed adjusting devices are provided for varying relatively the speed of various instrumentalities, but these are located farther along in the power train. The main variable speed transmission varies the speed of all instrumentalities in the same degree.

For stopping and starting the machine without resorting to the objectionable practice of stopping and starting the driving motor 31, a suitable clutch is provided in the main transmission. In this instance the clutch is located on shaft 37 (see Figs. 9 and 9a). The illustrative clutch comprises a fly-wheel 40 keyed to shaft 37 and a cone friction disc 41 held normally in engagement with the friction surface of the fly-wheel 40 by spring pressure. The friction disc 41 is slidably connected with a sleeve 42, surrounding a portion of the shaft 37, and may be disengaged from driving connection with the flywheel 40 by movement along the sleeve 42 against the pressure of the springs 43. To effect such disengagement a clutch yoke 44, pivoted at 45 to the frame of the machine, is provided to engage an annular flange 45' of the cone disc to move the latter longitudinally along the shaft out of engagement of the fly-wheel 40. The clutch yoke is operated from the front of the machine by rod 46 connected at 47 intermediate the ends of the clutch yoke and provided at its other end (which extends out at the front side of the machine), with an operating lever 48 pivoted thereto. The operating lever is provided adjacent its pivot connection with a cam surface 49, eccentric to the pivot point 50, which bears against the end of a stationary sleeve 51, through which the rod 46 passes. (Fig. 9). By swinging the operating handle 48 around its pivot from one vertical position to another, the clutch disc 41 may be moved into or out of engagement with the fly-wheel 40 by the longitudinal movement of the rod 46 effected by the eccentric cam surface 49. In this instance, (see Fig. 9), when the operating handle 48 extends upwardly the clutch is out of engagement and when it extends downwardly the clutch is engaged.

Secured to the sleeve 42 is a pinion gear 52 which meshes with a gear 53 for driving the cutter and other mechanisms located in the forward part of the machine.

For securing speed variation of the dough sheet relative to the cutter and other instrumentalities, a variable speed device is advantageously located between the main drive and the mechanism for advancing the dough sheet. In this instance, the variable speed device is represented by variable speed transmission 54, (Figs. 2, 3, and 5), of a type similar to the main transmission. This transmission may be conveniently referred to in this instance as the variable speed apron drive. In this instance this transmission derives its power from the main transmission through a driving sprocket 55 secured to sleeve 42 on the main transmission, and a driven sprocket 56 located on the driving shaft 57 of the apron transmission, over which the driving chain 58 runs. The shaft 59 of this transmission is driven in the usual way by a flexible driving element 60 running over the cooperating pairs of cone discs 61 and 62. Speed variation may be effected by a relative adjustment of these cone discs, as described in connection with the main transmission, by an appropriate adjustment of the hand wheel 63, located at the front of the machine. (Fig. 1.)

Suitable tension is maintained in driving chain 58 by an adjustable idler pulley 64. The shaft is supported in a slot 65 in the rear frame of the machine and maintained in position by a nut 66, which can be released to adjust the idler.

In this instance, the dough apron is driven from shaft 59 through a worm drive 67 located at the back of the machine (Figs. 2 and 5), which transmits power through the shaft 68 and worm 69, to the driving shaft 70 of the dough apron, upon which is mounted the dough apron driving drum 71 (Figs. 3 and 5).

Suitable means are advantageously provided for varying the speed of the gauge rolls independently of the apron speed. Among other advantages such a speed adjustment permits the operation of the gauge rolls in accordance with the characteristics of the particular dough employed. For example, a sponge dough has characteristics which cause it to react to the gauge rolls quite differently than a "short" dough. For example, a "short" dough stretches easily whereas a sponge dough contracts after it passes the gauge rolls.

In this instance, the speed variation of the gauge rolls is effected by interposing a variable speed transmission between the apron drive and the gauge rolls. Such an arrangement is advantageous because it excludes any relative disturbance by speed variations of other instrumentalities, and makes the speed of the gauge rolls properly a function of the speed of the main apron, except for such relative variation as may be effected by the gauge roll speed transmission.

In the present arrangement a variable speed transmission 72, similar to the apron and main transmission, is employed and driven from the shaft 59 of the apron transmission by chain 73 running over sprockets 74 and 75 on the shafts 59 and 76 respectively. (Figs. 3 and 5.) The driven shaft 77 of the gauge roll transmission is rotated by the flexible driving element 78, which runs over the cooperating pairs of cone discs 79 and 80. Relative adjustment of these discs, for the purpose of speed variation of the shaft 77, is effected by adjustment of the hand wheel 81 at the front of the machine.

From the shaft 77 the gauge rolls 11 and 12 are driven by a train of gears, in this instance, constructed and arranged to effect suitable speed reduction. (Figs. 2, 5 and 19). The pinion 82 on shaft 77 meshes with the large gear 83 which drives the large gear 84 located on the shaft of the gauge roll 11 through a pinion 85 which meshes with the latter gear. The gauge roll 12 is driven from the shaft of gauge roll 11 through gears 87 and 86, located respectively on the gauge roll shafts, and having long teeth to permit an adjustment of the spacing between the gauge rolls without drawing the gears out of mesh.

The main, apron and gauge roll variable speed transmissions are advantageously constructed and arranged to be lubricated, for example, as disclosed in said Williams patent.

The gauge rolls are supported respectively in bearing blocks 88 and 89 slidably carried in guideways 90 in the gauge roll supporting frame 91, and pressed apart by springs 92. (Figs. 3, 17 and 19.)

The spacing between the gauge rolls may be adjusted by relative adjustment of the gauge roll bearings. Such adjustment is effected, in this instance, by rotation of screws 93, engaging the bearing blocks 89 at each end of the upper gauge roll, whereby the gauge roll bearings may be brought closer together against the springs 92 or may be permitted to separate by release of the screws 93. (Figs. 2, 3, and 17.) These screws are synchronously rotated by a shaft 94 (the front end of which carries a hand-wheel 95) provided with worm gears 96 meshing with gears 97, secured to the screw shafts 98.

Each of the gauge rolls is provided with dust boxes 99 within which rotate agitators 100 and 101 for dusting the gauge roll surfaces with flour or other suitable powdered material. The dust box agitators are driven from their respective gauge rolls by gears 102 and 103 meshing with gears 104 and 105 on the respective gauge roll shafts. The gears 102 and 103 on the agitator shafts are secured in place thereto by set screws 106. Either of the dust boxes and their agitators may be rendered ineffective or idle by releasing the corresponding set screw 106 and sliding the agitator gear along the agitator shaft out of mesh with its driving gear to the position indicated, for example, at 107 in Fig. 18. Such an arrangement is advantageous where it is desired to leave the upper or lower surfaces of the dough sheet as free as possible from flour. For example, where it is desired to cause the dough sheet to adhere slightly to the dough apron, the dust box of the lower gauge roll is rendered idle so that substantially no additional dust is applied to the lower surface of the dough sheet by the gauge roll. Various other adjustments may be made to suit the characteristics of a given dough.

The revolving brush 108 which brushes the top surface of the dough sheet, is driven from the shaft on which gear 83 is mounted by a sprocket chain 109 and made to rotate in a direction opposed to the travel of the dough sheet by an interposed gear 110.

These gears as well as the gears for driving the gauge rolls are adequately guarded by cover plates 111 and 112.

The driving friction between the apron driving roll 71 and the apron 13 is advantageously increased by a pair of pressure rolls 113, extending across the machine and pressed against the apron on the driving roll by springs 114 which press against roll bearing blocks 115, slidably mounted in guide-ways 116 in the machine side frames. (Figs. 3 and 16.) These pressure rolls also serve to iron out indentations or other inequalities in the apron thereby causing it to present a smooth surface for the dough sheet.

The upper run of the apron extends from the upper surface of the roll over the plates 30 to the front end of the machine, where it passes around the front edge of the panner blade. The return flight of the apron passes around certain automatic take-up rolls on the panner blade structure, the function of which will be described in connection with the description of the panner blade mechanism. The return flight then passes around a pair of rolls 117 and 118 (Figs. 4 and 6), which represent the driving means for certain scrap carriers hereinafter described. These rolls are so positioned that the driving apron contacts with as much of their surface as possible and passes around the rolls so as to drive them in opposite directions. The rolls are geared together at their ends, and the combined driving friction of the apron on the rolls is adequate to drive the desired mechanism.

The return flight of the apron then passes beneath the bed of the cutter mechanism and finally around a roller 119 positioned to give maximum contact of the apron with the driving roll 71.

To provide for substantially varying the length of the main apron, and also to adjust for stretching of the apron, suitable means, represented by the apron take-up rolls 120 and 121, are associated with the apron and made relatively adjustable to take in and let out slack. In this instance, a loop 122, having sufficient apron length therein to provide for all contingencies, is held in taut condition by rolls 120 and 121, the former being adjustable and the latter stationary.

The roll 120 is mounted to rotate on ball bearings about the shaft 123, the ends 124 of which are provided with flat faces 125 and mounted at the ends of L shaped slots 126 in slidable blocks 127. (Figs. 23 to 25.) The slots 126 when brought into register with slots 126' in the upper edges of the side frames allow the complete removal of roller 120, thus enabling it to be readily threaded into the loop 122 of the apron when the latter is placed on the machine. The blocks 127 slide within guide-ways 128 in the upper portions of the side frames of the machine and are held in adjusted position by flexible chains 129 respectively running around sprockets 130, 131, 132 and 133, and having their ends 134, 135, secured to the respective blocks 127.

The sprockets 130 and 132 are mounted on stub shafts 136 on the opposite sides of the machine, which shafts are advantageously mounted in slots 137 in the side frames of the machine by screws 138. By appropriate adjustment of the screws the proper tension in the chains 129 can be secured.

Suitable means are advantageously provided for adjusting, independently, the respective ends of the movable roll 120, in order to provide an independent adjustment in tension of the respective sides of the main apron, thereby providing adjustment for inequality in the length or stretching of the respective sides of the main apron.

In the present construction such adjustment is effected by independently rotating the sprockets 131 and 133,—means therefor being represented by shaft 139, to which the sprocket 131 is secured, and the sleeve 140 concentric with the shaft 139, but movable with respect thereto, and to which the sprocket 133 is secured. One end of shaft 139 projects through the side frame at the front side of the machine, and has pinned thereto an operating hand-wheel 141, which may be rotated to rotate sprocket 131 and adjust the rear side of the main apron. Loose upon shaft 139 is a smaller hand-wheel 142, which may be moved longitudinally of the shaft but is restricted in endwise movement by the screw collar 143. Hand-wheel 142 is provided with a pinion 144 which meshes with a pinion 145 mounted on a shaft 146 carried by the larger hand-wheel 141. The opposite end of shaft 146 carries a pinion 147 which meshes with a gear 148 pinned or otherwise secured to sleeve 140. When the hand-wheel 142 is pushed inwardly, as indicated in Fig. 25, it is held locked against rotation relative to a hand-wheel 141 by a locking dog 149, which extends between a pair of teeth of the pinion 144. When the hand-wheel 142 is pulled out so that the teeth of pinion 144 clear the locking dog 149, it can be rotated independently of hand-wheel 141, thereby rotating through gears 144, 145, 147, and 148, sprocket 133—thereby effecting a desired adjustment of the tension in the front side of the apron. When the hand-wheel 142 is pushed in so as to be locked by locking dog 144, then sprockets 131 and 133 may be rotated together by grasping either hand-wheel 141 or 142.

Hand-wheel 141 is held in adjusted position by pawl 150 pivoted to the side frame of the machine and engaging a ratchet 151 on the hand-wheel. The pawl and ratchet resist the tendency of the apron to rotate either adjusting hand-wheels in a direction to let out slack.

In the present arrangement the shaft 152, on which the gear 53 is mounted, is driven directly by the main variable speed transmission. The cutter operates in synchronism with rotation of shaft 152, in the present instance, and makes one cut for each rotation of the shaft 152. Variation in the apron speed, relative to cutter frequency, is desirable, among other reasons, to adjust the operation of the machine for varied sized cakes and also to vary the dimension and hence the strength of scrap between adjacent rows of cakes. For a cake of large diameter, obviously the apron must travel a greater distance between successive operations of the cutter than with a smaller cake. Also where a greater spacing between adjacent rows of cakes is necessary, the apron must travel at a greater relative speed.

Suitable means, represented by speed indicating device 153, are advantageously provided for conveniently making the aforesaid adjustment of the apron speed. (Figs 1, 21 and 22.) In the present instance, such speed indicating device is operated by one of the bars 154 on the apron variable speed transmission. Without describing the operation of the adjustment of the variable speed transmission in detail (such description being found in said Williams patent), it is noted that a pair of bars 154 at each side of the machine are pivoted at 155 to the respective pairs of cone discs 61. A screw shaft 156 operated by hand-wheel 63 and having reversely pitched screw threads, effects the speed adjustment by separating or bringing together the ends of the pairs of bars 154, to which it is connected by the pivoted nut 157.

To the end of one of the bars 154 is secured a pin 158, which engages a cam surface 159 secured to the shaft 160, which carries the speed indicating point 161. The inward or outward movement of the pin 158 responsive to speed adjustments of the apron transmission acts on the inclined cam surface 159 to rotate the shaft 60 and move the pointer 161 in one direction or another. The speed indicating device is calibrated by proper construction of the cam surface 159 or by suitable calibration of the scale 162, to indicate the distance of travel of the apron for each cycle of cutter operation. Hence, if it be desired to make a biscuit or other article in which the spacing between the front edge of one article and the front edge of the article formed by the succeeding cutter operation is, say, 5 inches (which distance includes the longitudinal dimension of the article or articles plus the width of the scrap between the articles), the apron speed is adjusted by appropriate rotation of the hand-wheel 63 until the pointer 161 comes to numeral 5 on scale 162. Thus, it is possible to effect the aforesaid adjustment of the machine for a given article, without resorting to the cut and try method which invariably spoils a considerable quantity of dough until the proper adjustment is reached. The above described manner of effecting proper speed adjusting of the apron effects a sufficiently close speed adjustment that any necessary final adjustment of apron speed may be effected without interfering with the normal operation of the machine or spoiling any of the cut product.

After the material has been suitably sheeted and deposited in sheet form on the apron it is brought in to operative relation with devices for dieing, cutting, or cutting and embossing the material, depending upon the character of the articles to be made. For this purpose the dough sheet and the device for dieing, cutting, or cutting and embossing (herein referred to for convenience, merely as a cutter), are so manipulated that during the operation of the cutter on the dough there is no substantial relative movement between the dough and the cutter. After each operation of the cutter this condition of no relative movement is interrupted or disturbed to secure relative advancement of the dough sheet, so that the next operation of the cutter will be on a different portion of the dough sheet, preferably immediately following the portion previously operated upon.

In the present embodiment of the invention, the aforesaid relations between the cutter and dough are brought about by oscillating the cutter and arranging the cycle of operations thereof so that during a portion of such cycle the cutter travels substantially in unison with the dough sheet, during which travel the cutter is operated to act upon the dough. During the balance of the cycle of oscillation of the cutter it is brought into position to act upon a fresh surface of dough. In the present machine, the dough sheet travels continuously and at substantially uniform speed at the cutter. Herein the cutter is represented by the cutting unit 15 which is removably secured by bolts or other devices 163 to the cutter bar 164. (Fig. 9.) The cutter 15 carries a series of devices projecting from its lower edge for acting on the dough, either to die, cut, or cut and emboss it. When a different shape or design of biscuit is desired to be made, it is merely necessary to remove one cutter and replace it by another appropriate cutter. When making certain types of crackers, a plain knife which acts to cut or indent the dough transversely is substituted for the type of cutter herein illustrated. In the present machine the cutter bar is supported for vertical reciprocation within guide-ways 165 in the side frames 166 of the cutter mechanism, by compression springs 167. (Figs. 9, 29 and 30.) Each spring 167 is supported at its lower end upon the base 168 of the cutting mechanism and carries within it a square cutter bar guide rod 169, the lower end of which extends through the bushing 170, the opening 171 in which is somewhat elongated transversely of the machine. (Figs. 30 and 32.) The opening 171 in the bushing prevents any play or movement of the guide rod in a direction logitudinally of the machine and relative to the cutter frame but does permit a slight tilting of the guide rod in a transverse direction thereby enabling a transverse tilting of the cutter bar 164 to adjust the depth to which the cutter unit 15, cuts into or indents the dough.

The cutter bar is reciprocated vertically by the connecting rods 172, actuated, in this instance, by eccentrics 173 at each end of the shaft 152, which eccentrics are connected with said connecting rods by eccentric straps 174 and interposed ball bearings.

The mechanism for adjusting the cutter bar 164 to regulate the depth of cut, etc., is represented, in this instance, by sleeves or bushings 175 having eccentric bores 176, fitting over the respective bearing ends 177 of the cutter bar 164. The outer surfaces 178 of the bushings 175 are cylindrical but eccentric to the inner bores and form the bearings for the straps 179 pivoted at 180 to the upper ends of the connecting rods 172. The bushings and straps 179 are retained in place on the cutter bar by the plates 181 fastened by screws to the cutter bar. A rotation of the bushing 175 about the cutter bar raises or lowers the cutter bar relative to the cutter frame and to the dough sheet.

Suitable means for effecting this adjustment are represented by the gears 182, in this instance integral with the bushings 175 and arranged with their peripheries concentric with the bore 176 of the bushings. The gears 182 are rotated respectively by pinions 183 and 184, the former being secured to shaft 185 and the latter being formed integral with a sleeve 186 free on one end of the shaft. A hand-wheel 187 secured to the sleeve rotates pinion 184 and a crank 188 secured to shaft 185 rotates pinion 183. The crank handle 189 is slidably mounted on the crank and provided with a pin 190 at its opposite end, which may enter one of a series of recesses 191 in the adjacent surface of the hand-wheel 187. The pin is normally pressed into a recess by a spring 192. Thus, when the pin 190 is engaged in a recess, both pinions 183 and 184 may be rotated together to effect similar adjustments of the ends of the cutter bar. Adjustment of either end of the cutter bar may be effected independently of the adjustment of the other by withdrawing the pin 190 from engagement with the hand-wheel 187, to leave the crank and hand-wheel 187 free for relative rotation.

A suitable locking means is provided for locking the cutter bar in adjusted position, such means being typified by a split collar 193, on the adjusting shaft supporting bracket at the front of the machine, through which the shaft 185 extends and which engages one end of the sleeve 186. (Figs. 29 and 31.) The free ends of the split collar are drawn together to clamp the sleeve 186 against rotation by the spring 194, carried on the rod 195 extending from one of the free edges of the split collar. The grip or clamping action of the split collar 193 may be released for permitting an adjustment of the cutter bar by screwing in the screw handle 196 until its lower end 197 engages the opposite side of the split collar and forces the free ends of the collar apart, thus releasing sleeve 186. The locking device just described prevents the rotation of shaft 185 through the pin 190, which, in engaged position, holds it immovable with respect to sleeve 186.

Thus either end of the cutter bar may be conveniently adjusted independently of the other from the front side of the machine without the necessity of reaching across the machine while it is in operation.

To effect periodical synchronism with the dough sheet during the cutting operation, the cutter base and its frame carrying the cutter bar and cutter are oscillated back and forth in step with the cutting operation. In the present instance, such oscillation of the cutter is permitted by supporting the cutter base 168 on opposite pairs of parallel rocking links 198 and 199 clamped to the rock shaft 200 supported in bearings in the machine side frames near their base. (Figs. 2, 3 and 9.) The upper ends of the rocking links are pivoted at 201 to the cutter base 168. The links are of sufficient length to minimize vertical movement of the cutter frame during oscillation, such oscillation being substantially in a straight line and thereby minimizing cutter inertia.

The cutter frame base thus mounted carries the cutter bed 202 over which the apron 13 runs, and which supports the dough sheet and apron during the cutting operation. The cutter bed is positioned by dowel pins 203, extending into the base 168 which permit the ready removal of the cutter bed merely by lifting it until the dowel pins clear their holes. For cushioning to some extent the blow of the cutter unit against the striking castings 204 at the margins of the apron, a cushion represented by rubber pad 205 is interposed between the cutter bed and the cutter frame base.

The above described construction of the cutter mechanism and the manner of mounting it for oscillation permits the use of fewer and lighter oscillating parts so arranged as to minimize inertia to oscillation, thereby permitting relatively high speed operation without undue vibration or wear on the machine.

The cutter and cutter bed are oscillated by connecting rod 206 driven by crank pin 207 carried on crank plate 208 mounted at the front end of the main shaft 152. Motion of the connecting rod 206 is translated to the connecting rods 209 pivoted at 210 on opposite sides of the machine to the cutter frame base, through rocking arms 211 and 215 to which the connecting rods are pivoted respectively at 212 and 213.

Since all movements of the cutter bar are derived from shaft 152, the cutter is oscillated back and forth in step with the vertical reciprocations of the cutter. The eccentrics 173 and the crank pin 207 are so located that the actual cutting operation takes place during the forward travel of the cutter frame. During this interval the cutter is adjusted to travel in substantial unison with the apron during contact with the dough. In the present arrangement it is advantageous to have the cutter leave the dough after the cutting operation at the interval of substantially exact unison between cutter and dough apron speeds.

In the present instance, the aforesaid adjustment between cutter and apron speeds is effected by adjusting the longitudinal speed of the cutter until it approximates the speed of travel of the apron at the time of the cutting operation. This result is produced in the illustrative machine by varying the amplitude of oscillation of the cutter frame without, however, disturbing the frequency or period of oscillation, thereby necessarily varying the cutter speed.

The amplitude of oscillation of the cutter frame is varied, in this instance, by varying the radius of throw of the pivots 212 and 213 and the rocking arms 211. (Figs. 1, 26 and 28.) The rocking arm 211 is connected through the hollow shaft 214 with the opposite rocking arm 215 at the back of the machine. Pivot pins 212 and 213 are adjustably mounted in guide-ways 216 in the rocking arms by screws 217 rotatably mounted in the rocking arms and passing through nuts 218 in the pivot pins. Radial adjustment of the pivot pins is effected by pairs of bevel gears 219 and 220, mounted respectively on the screws and shaft 221. Shaft 221 may be rotated to effect simultaneous adjustment of the pivot pins by the hand-wheel 222 located conveniently at the front of the machine. The hand-wheel is maintained in position by the spring pressed pin 223 carried on the handle 224 and pressed by spring 225 into any one of the number of recesses 226 in a fixed plate 227.

The adjusting mechanism just described is constructed and arranged to permit the positioning of the pivot pins 212 and 213 as nearly as possible to the center of oscillation of the rocking arms 211 and 215 by employing a hollow shaft 214 of considerable diameter. This permits the adjustment of the pins 212 and 213 quite closely to the center of oscillation and also permits the location of the shaft 221 within the shaft 214 which is desirable in the present construction to simplify the adjusting mechanism.

The proper adjustment of the cutter speed in unison with apron speed at the time the cutter leaves the dough, may be conveniently determined by watching the character of the cut or other impression which the cutter makes in the dough. Any improper adjustment of the cutter speed is very easily apparent by the condition of the cut dough. It requires but slight experience to adjust the cutter to synchronous speed by a study of the character of the cut or other impression in the dough.

After the dough sheet has been appropriately cut or impressed by the cutter, the next operation in the present arrangement is to remove the scrap dough so as to present the formed articles in the condition in which they are panned or otherwise transferred to the ovens.

In some types of crackers, such as soda crackers which are rectangular in shape and baked in juxtaposition and frequently connected together, the body of the dough sheet is free from scrap, the only scrap being certain narrow marginal trimmings at the edges of the dough sheet. These may be easily removed in any suitable way. The typical mechanism for accomplishing the side scrap removal will be described hereinafter in connection with other mechanism with which it is associated.

For cakes of circular or other shape in connection with which a sheet of scrap is formed, suitable means are provided for removing the scrap from the dough apron without disturbing the cut biscuits on the dough apron. Such means are typified in the present machine by the scrap carrier 16, which comprises an apron 228 traveling at one point in proximity with the traveling dough sheet without, however, interfering with the dough on the sheet. (Figs. 1, 48 to 51.) Such approximate association is effected by running the apron 228 around a bar or "point" 229, which is made as thin as possible, consistent with strength and without being so thin as to cause unnecessary wear of the apron in passing around the bar. The bar 229 is adjustably secured to the carrier frame members 230 and supported in the desired position with reference to the apron 13 by a pair of cams 231 secured adjacent the ends of a shaft 232 which supports the lower ends of the frame members 230. The cams 231 are mounted eccentrically upon the shaft 232 and may be rotated by the lever 233 to raise and lower the carrier "point" to the desired position, where it may be held by a pawl 234, which engages one of the series of notches 235 in one of the cams 231.

As a preliminary adjustment of the carrier "point" 229, it may be lowered into substantial contact with the apron 13 to divert the scrap sheet upon the apron 228. In effecting this, obviously the entire dough sheet, including the cut biscuits will likewise travel up the scrap carrier. However, as soon as such travel has been started, the point 229 may then be raised to proper distance above the apron to permit the cut cakes to pass underneath it. The raising of the point will cause the scrap sheet to strip from the cut cakes, leaving the latter in position on the apron. In the event of a breakage of the scrap sheet, this operation may be repeated to restore scrap separation without stopping the machine.

The idle roll 236 pivotally supported by arms 237 on the frame members 230, serves to increase the friction between the apron 228 and the scrap sheet, thereby maintaining a uniform tension in the scrap sheet and its uniform travel up the scrap carrier and preventing the scrap sheet from sagging downwardly and interfering with the cut biscuits on the main apron.

To assist in the proper stripping of the scrap sheet from the cut biscuits to prevent the travel of any cut biscuits along with the scrap sheet, suitable means are provided for lightly bearing, if desired, on the cakes on the apron, during the time when the scrap sheet is being stripped therefrom. Such means is represented in this instance, by a series of relatively small brushes or tufts of bristles 238, pivotally supported by the scrap carrier frame to bear upon the cakes. Each of the brushes is pivoted independently of the other on a shaft 239, extending across the apron and supported by adjustable extension arms 240 carried on the frame members 230. Any number of these brushes may be rendered functionless by raising the same out of contact with the dough sheet, leaving only those brushes in contact with the dough which are necessary to secure proper scrap separation. When a different dough, biscuit size or spacing is employed, another setting of the brushes may be necessary to confine the brush pressure to biscuit surface. In the present instance, the means for making a desired brush selection comprises a rod 241 carried in collars 242 pinned or otherwise secured to shaft 239. Brushes are rendered inoperative by swinging the same around the shaft 239 until the brush holders engage the rod 241.

The extension arms 240 are made longitudinally adjustable by a cap screw 240ᵃ and washer passing through an open slot 240ᵇ in the extension arms. Thus the distance between the line of brushes and the edge 229 of the scrap separator may be varied in accordance with biscuit size.

Another rod 243 carried by the collars 242 and extending underneath the brush holders when in operative condition, may be utilized, if desired, to engage all of the brushes and lift the same from the dough, or it may be positioned to hold all active brushes a given minimum distance from the main apron. Such adjustment may be utilized, for example, when it is desired that the brushes shall engage the cakes or dough sheet only when there is any tendency for the cakes to be lifted from the apron. With such adjustment as long as the cakes remain on the apron, they can pass beneath the brushes without any contact or only a very slight contact therewith. Such adjustment is advantageous for delicate, soft dough, such as chocolate dough. To manipulate the rod 243 a handle 244, secured to shaft 239, is provided, a rotation of the latter raising or lowering the rod 243 through the collars 242 which are pinned to the shaft.

In raising the scrap from the main apron, the scrap apron is arranged to deflect the scrap during separation through a relatively slight angle, with reference to the main apron at the point of separation, thereby subjecting the scrap sheet to a minimum stress during separation and substantially preventing or minimizing the breaking of the scrap sheet at the point of separation. Breaking of the scrap sheet is particularly likely to occur in weak or heavy dough, such as "short" doughs, especially if there is an attempt to deflect the scrap through too great an angle upon separation from the main apron and the cut biscuits. Breaking of the scrap sheet during separation is particularly objectionable because the scrap then becomes mingled with or cripples the biscuits, requiring all such biscuits to be returned to the bulk dough, thereby increasing the percentage of dough which must be re-worked, and obviously impairing production and the quality of the product.

After the scrap sheet has been separated from the main apron and the biscuits, it is immaterial whether it breaks or not, inasmuch as it can easily be handled without danger of interfering with the separated cakes.

To assist in the separation of the scrap sheets of some types of dough, it is desirable, where possible, to place tension in the scrap sheet during separation to stretch it slightly so that it will more readily lift from the main apron and from engagement with the biscuits. In this instance such manipulation of the scrap sheet is effected by increasing the speed of the scrap apron 228 relative to the main apron speed. In view of the fact, however, that all doughs cannot be treated alike in this respect, it is desirable to provide means for varying the speed of the scrap carrier, so that the relative speed of the scrap apron may be varied.

Mechanism for effecting the speed adjustment of the scrap apron 228 is represented herein by an expansible apron driving drum 245, around which the apron 228 runs. The expansible driving drum comprises a hollow shaft 246 having thereon slotted end spiders 247 and intermediate spiders 248, which carry in their slots apron engaging bars 249, the engaging edges of which are suitably roughened, as by teeth 250, for increasing the driving grip or friction on the apron. The end spiders 247 are slidable on shaft 246 and carry nuts 251 on the interior of the shaft, which are connected with the spider hub by screw pins 252 which extend through slots 253 in the shaft. The bottoms of the slots in the end spiders are inclined in a direction longitudinally of the shaft, as indicated at 254, and engage correspondingly inclined surfaces 255 on the bars 249, which are slidably held in the slots by pins 256 in the spiders, which pass through slots 257 in the bars. The bars 257 may be adjusted radially in or out to vary the effective diameter of the driving drum 245 by corresponding endwise adjustment of the spiders 247 on the shaft 246. Such adjustment is effected, in this instance, by the shaft 258 having oppositely pitched screw threads 259 thereon which engage respectively the nuts 251. Rotation of the shaft 258 by the handwheel 260, slidably splined at 261 to the shaft, simultaneously separates or draws together the spider heads, thereby respectively decreasing or increasing the effective diameter of the drum. The handwheel 260 is held in adjusted position by screwing the locking wheel 262 onto the shaft until the hub of the handwheel 260 is tightly bound against the end 263 of shaft 246.

The shaft 246 is rotatably supported in ball bearings in the brackets 264 resting on the upper edges of the side frames of the machine, and is driven by gear 265 which is loosely mounted on the hub 266 of a ratchet wheel 267 keyed or otherwise secured to the shaft 246. A pawl 268 (which may be lifted to render the scrap separator idle) serves to effect a driving connection between the apron drum 245 and the gear 265, but only for rotation in one direction, such direction of rotation being that to cause the upper surface of the scrap apron to convey the scrap away from the main apron. The driving drum and scrap carrier may be moved freely in the opposite direction independently of gear 265. Such freedom of movement is desirable, among other purposes, to effect certain adjustments of the scrap apron, hereinafter described, and for momentarily moving the scrap apron independently of its driving means, or at a greater speed than which it is driven.

The gear 265 is driven from any appropriate source of power, preferably at a speed which is a function of the speed of the main apron. In this instance, the gear 265 is driven by gear 269 supported on bracket 270 through a sprocket 271 on the gear and chain 272. The chain is driven by a sprocket 273 located at the rear end of the shaft of roll 118 (Fig. 4) about which the return flight of the main apron runs. Rolls 117 and 118 are geared together by gears 274 and 275, so that the friction of the apron on both rolls will be available as driving power to drive the sprocket 273 and such other devices as may be connected therewith.

In order to adjust the scrap apron to variations in the diameter of its driving drum, suitable means are provided for adjusting the effective length of the scrap carrier to supply or take up apron responsively to variations in adjusted drum diameters. In this instance, such compensation is provided by retreating or advancing point 229 to supply or take up apron. For this purpose the point 229 is adjustably supported with reference to the axis of the driving drum by pivoting the frame members 230 at 276 to links 277, which, themselves, are pivoted at 278 to the brackets 264. Thus by swinging the frame members 230 by the links 277 the point 229 may be retreated or advanced to allow necessary apron for driving drum adjustments. In this instance, the adjustment of point 229 is automatic, such result being effected for example, by torsion spring 279, one end of which engages a set collar 280 on shaft 281, to which the links 277 are keyed or otherwise secured, and the other end 282 of which engages a fixed point on the machine, such as the bracket 264. Thus the tension of the spring tends yieldingly to extend the point 229 until all slack is removed from the apron. In increasing the diameter of the drum 245 to increase the speed of the apron 228, the spring 279 yields sufficiently to supply the required amount of apron.

In order to adjust for relative variation in length of the opposite sides of the apron 228 due to stretching or otherwise, the ends of the bar 229 may be shifted independently of each other by the screws 283 on the frame members 230 adjacent opposite ends of the bar 229.

Obviously, the scrap apron 228 may be constructed and arranged to convey the scrap at any desired point. In the present arrangement, the scrap is delivered from the apron 228 to another scrap apron 284, which conveys it above the machine to the rear thereof and delivers it to the bulk dough. The receiving end of the scrap apron 284 runs over a roll 285 supported in adjustable position adjacent the apron 228 by screws 286 which rest on the surface 287 of the bracket 264. Thus as the scrap reaches a point adjacent the roller 285 it is carried on to the scrap apron 284. Suitable means, such as a revolving brush 288, are provided for delivering the scrap to the receiving end of the scrap apron 284, particularly in instances where the scrap sheet becomes broken. The brush 288, in such cases, automatically re-establishes the delivery of the scrap from one carrier to another without interruption of or interference with the proper operation of the machine. The brush 228 is supported in suitable bearings in the brackets 264 and carries at the end of its shaft a sprocket 289, which is rotated by the chain 290 from the sprocket 291 on the hub of gear 265.

Located beyond the point of removal of the scrap and conveniently driven by gears 293 and 294 from gear 269, is a device 292 for sprinkling material such as salt upon the biscuits (Fig. 48). The location of this device at the point mentioned, advantageously avoids the repeated addition to the bulk dough, through the returned scrap, of salt or whatever material is sprinkled on the biscuits or crackers. This maintains the bulk dough entirely free from contamination by added materials, such materials being supplied only to the dough comprising the crackers or biscuits ready to be removed to the ovens and not returned as scrap.

The scrap apron 284 is supported, in this instance, in a frame 295 hinged at 296 to the overhead frame 297. The upper or active flight of the scrap apron extends over suitable rolls at various points in the supporting frames and around a terminal roll 298, on a horizontally slidable frame 299 supported in suitable guides 300 in the stationary frame. The return flight of the scrap apron passes over an idle supporting roll 301 and around a roll 302, carried in the slidable frame 299 adjacent its inner end. From thence the apron passes around the driving drum 303 and back over supporting rolls 304 to the receiving end of the scrap carrier.

The delivery end of the scrap carrier may be extended or adjusted to drop the scrap dough at any desired point. Such adjustment is effected by sliding the slidable frame 299 backward or forward,—the roll 302, which is movable with the frame 299, serving automatically to take up and let out sufficient apron to effect this adjustment. In this instance, the means for effecting such adjustment are represented by sprocket chain 305, the ends of which are connected to a block 306 on the slidable frame and which runs around sprockets 307 and 308 carried on the stationary frame 309, in which the movable frame slides. A hand-wheel 310 on the shaft carrying the sprockets 308 serves conveniently to control the adjusting means.

If desired, for some constructions, the scrap carrier 16 may be dispensed with and the scrap carrier 18 extended to a point adjacent with the main apron 13, as indicated in my Patent No. 1,292,311.

The scrap apron driving drum 303 comprises a plurality of apron engaging bars 311 (six in this instance), rotatably mounted at their ends in spiders 312, carried on driving shaft 313. For preventing slipping of the apron over the bars, the latter are preferably provided with teeth 314 or other suitable means for increasing the friction without cutting or tearing the apron.

Power is supplied to shaft 313 from the sprocket through intermeshing gears 313ᵃ and 313ᵇ, one keyed with sprocket 315 to shaft 316 and the other loose on shaft 313. A driving connection with shaft 313 is effected by clutch 317 slidably splined thereto and provided with a projecting clutch face or lug constructed and arranged, when the clutch is moving inwardly on shaft 313, to engage a clutch face or lug on the hub of the gear on shaft 313. The driving connection with the apron driving drum may be released by manually pulling the clutch 317 outwardly on the shaft 313 until the engaging clutch faces are clear of each other. A suitable plate at the end of the shaft limits the outward movement of the clutch 317, and a collar 318 serves to hold the gear on shaft 313 in place. The clutch connection is advantageously provided to render the scrap carrier apron idle when it is not in use, for example, when the crackers or cakes are peeled directly from the main apron.

The sprocket 315 is driven by a chain 319 from sprocket 320 (Figs. 2, 3 and 19), the latter sprocket being mounted at the rear end of the shaft 70 of the main apron driving drum. Thus the rate of speed of the scrap apron is made a function of the speed of the main apron. Any variation in the speed of the main apron proportionately varies the speed of the scrap carrier, thereby enabling it to convey away scrap at a rate proportionate with the speed of travel of the dough on the main apron.

The sprockets 315 and 320 and the chain 319 are covered with a guard 321 to prevent injury to workmen.

To adjust the speed of travel of the scrap carrier to suit peculiarities of doughs, as explained in connection with scrap carrier 16, suitable means are provided for driving the scrap apron at a faster or slower rate than the main apron. Such speed adjustment is also advantageous when the scrap carrier 16 is dispensed with and the scrap carrier 18 is used as suggested in my Patent 1,292,311. Such means is represented herein by an eccentric mounting of the bars 311 in the spiders, whereby the rotation of the bars in the spiders serves to increase or decrease the diameter of the driving drum. In the present arrangement the natural stretch in the apron is utilized to supply or take up apron to accommodate variations in the diameter of the driving drum.

As shown in Fig. 14, the ends 322 of the bars 311 are eccentric to the bars. One end of each of the bars is provided with a pinion 323 pinned thereto and which meshes with a master gear 324 free on shaft 313, by means of which the bars may be simultaneously rotated. The hub 325 of the gear 324 passes through the bearing 326 in the supporting frame 327 and carries adjacent its outer end a gear 328 having a series of teeth thereon meshing with pinion 329. In the present instance, the teeth on 328 only extend around a portion of the periphery of the gear, a portion of the periphery of the gear being functionless and not requiring any teeth. The pinion 329 is carried in a bearing bracket 330 pinned to shaft 313 and is provided adjacent its opposite end with a gear 331 pinned to the pinion shaft, which gear meshes with pinion teeth 332 on sleeve 333. Sleeve 333 is mounted freely and slidably on shaft 313 and carries a handwheel 334 pinned thereto.

When the sleeve 333 is pushed inwardly the pinion teeth 332 engage a locking dog 335 carried on the bearing bracket 330. In this position the hand-wheel 334 is locked against relative rotation with shaft 313 and any adjustment of the bars 311 to vary the diameter of the driving drum is prevented. The diameter of the driving drum may be adjusted by rotating the hand-wheel 334, after it has been pulled out until pinion 322 clears the locking dog 335. A collar 336 is bolted to shaft 313 to prevent the complete withdrawal of the handwheel from the shaft.

A housing 337 encloses the adjusting gears adjacent the end of the shaft 313 to prevent possible injury to the workmen and to exclude dust.

In the present arrangement, the marginal scrap, if any, is removed independently of other scrap removing means. With certain types of biscuits, the only scrap produced is marginal scrap comprising strips of dough which, because of their small body, may become excessively dried out by return through the relatively long path of the main scrap carrier. Furthermore, because of the greater liability of breakage or lack of continuity of strip scrap (and the consequent interruption of its delivery to the main scrap carrier), it is desirable to remove such marginal scrap by means whose functions are not dependent upon continuity of the strip scrap.

In the present arrangement the side scrap removing means 18 comprises a cross scrap apron 338 which travels transversely of the machine below the main apron and extends at its ends slightly beyond the side of the machine. To divert the side scrap to the cross scrap apron, cup shaped discs 17, called "dough boys" are provided. The discs 17 preferably are provided with blunt teeth on their periphery and are mounted on an inclined axis so that the inside edge of the discs engage the dough sheet and at that point travel in the direction of the dough sheet. The discs which are rotated by the engagement of their teeth with the dough or main apron, divert or turn the scrap laterally where it falls upon the cross scrap apron. The dough boys may readily be removed when their function is not desired. The cross scrap apron delivers the scrap to one side of the machine and permits it to fall in a conveniently located receptacle from which it may be removed from time to time and returned to the bulk scrap.

The apron 338 travels around rolls 339 and 340 mounted in ball bearings beyond the sides of the machine side plates. The bearing supports are made removable as indicated at 341 and 342 to permit the insertion of an endless apron 338.

The cross scrap apron is driven from the shaft of roll 118 by bevel gears 343 and 344, the latter being pinned to the shaft of roll 340 and the former being driven by shaft of roll 118.

Inasmuch as the scrap apron is not required to function for all types of biscuits made on the machine, means are advantageously provided for interrupting the drive of the cross scrap apron at desired times. Such means are represented, in this instance, by a hand-wheel 345 and screw 346, which serve to draw the bevel gear 343 into mesh with gear 344. The former gear is connected with the screw 346 by means of a pin 347, extending transversely of the screw 346 and passing through slots 348 in the tubular extension 349 of the shaft of roll 118 into appropriate recesses in the gear 343. The pin also furnishes the driving connection between the tubular extension 349 and the gear. A spring 350 engaging at one end of a collar 351 on the tube 349 and at the other end the gear 343 serves to force the gear 343 out of mesh when released by screwing of hand-wheel 345. The slots 348 are designed to terminate at a point to act as stops in engagement with pin 347, to prevent the drawing of the gear 343 too tightly into mesh with gear 344.

As stated briefly earlier herein, the illustrative machine is constructed and arranged to pan biscuits, (i.e., deliver cakes) upon a series of spaced pans or other receiving means without depositing any biscuits in the spaces between the pans. In the present arrangement such a result is effected by interrupting the delivery of biscuits over the panner point, periodically, until the space between the pans has passed beyond this point; and in the present machine, such interruption of biscuit delivery is effected without interrupting other functions of the machine.

In the present instance, the interruption is effected by periodically advancing the delivery point 19, at substantially apron speed, thus preventing any biscuits from passing around the delivery point and dropping from the panner blade. To pan or deliver biscuits, the panner blade, here represented by the plate 352, around the end of which the apron 13 runs thereby forming the delivery point 19, is retracted a given distance, during which time the relative travel of the apron 13 over the point results in the depositing of a predetermined number of rows of biscuits, depending upon the particular adjustment of the machine. Such adjustment may result in panning a single row or a greater number of rows of biscuits. After the delivery of the desired number of rows of biscuits, the panner blade is made to travel forward substantially at apron speed, thereby preventing any biscuits from passing over the panner point.

The panner blade 352 is mounted, for the periodic oscillation above described, upon a slidable frame 353 to which it is pivoted at its upper end by the rod 354. (Figs. 1, 4, 8 and 52). The opposite side members 355 of the frame 353 are carried at their forward ends on a horizontally reciprocating member represented by the panner blade oscillating mechanism 356, and at their rear ends in guideways 357 in the side frames of the machine. The apron 13 passes around the panner or delivery point 19 and backward along the underside of the panner blade over a rod 358 carried by the side members of the panner frame and thence around a movable roll 359 and a stationary roll 360, the former being carried in the movable panner blade frame and the latter by the side frames of the machine. The bar 358 is flattened on one side to provide a sharp edge or corner 361 for scraping the face of the dough apron, if such scraping seems desirable. Otherwise the bar 358 may be rotated to present its curved surface to the apron.

The movable roll 359 is carried in the panner blade frame on ball bearings on shaft 362 which extends between the side frame members, which shaft carries at its end ball bearings 363 supporting the rear ends of the frame members 355 and rolling in the guideways 357.

The stationary roll 360 is provided with ball bearings for reducing friction and is removably mounted on the ends of stub shafts 364 which are screwed into the machine side frames. By unscrewing the stub shafts 364, the roll 360 may be readily removed to permit the insertion of a seamless apron as hereinafter explained.

As the panner frame reciprocates or oscillates back and forth, the relative movement between rolls 359 and 360 serves automatically to take in and let out apron in accordance with the movements of the panner blade and further serves to maintain the apron taut around the panner blade point during the retracting or panning travel of the panner blade.

A brush 365 is adjustably mounted in slotted brush holders 366 adjacent the delivery point of the panner blade to engage the front row of biscuits during the forward or idle travel of the panner blade. Frequently it is desired to adjust the machine so that the front row of biscuits on the panner blade projects slightly beyond the end of the panner blade and when so adjusted the brush 365 prevents such biscuits from dropping off.

A pivoted plate 367 is provided near the point of the panner blade to protect the apron from engagement with the pans and pan carrier lugs and chains, to reduce wear on the apron. The plate 367 is pivoted or otherwise secured to brackets 368 screwed to the ends of the bar 369, which is riveted or otherwise secured to the underside of the panner blade.

In order to prevent alternate stretching and slackening of the upper surface of the dough apron by the reciprocations of the panner blade, the travel of the apron and the forward travel of the panner blade are so adjusted that during such panner blade travel the apron travels forward at a speed very slightly faster than the panner blade. This results in a slight creeping of the apron around the point 19 of the panner blade, without, however, being sufficient to cause any biscuits to drop from the panner blade during this travel.

Such a slight creeping of the apron is sufficient to maintain a substantially uniform and continuous tension or stretch in the apron even at the moment when the panner blade starts its rearward movement. The continuous tension on the apron prevents periodic "short cuts" which result from periodic release of apron tension and the consequent shrinking of the upper flight of the apron and a momentary slackening in speed.

The result of such a momentarily slackened apron speed is to bring successive cuts or operations of the cutter too closely together, leaving too short an interval of scrap between succeeding rows of biscuits. Such a short scrap dimension frequently results in the breaking of the scrap sheet, particularly at the receiving point of the scrap carrier and a consequent interruption or a crippling of a quantity of biscuits until normal conditions are restored.

The above mentioned adjustment to secure the creeping of the apron over the end of the panner blade may be secured in the present embodiment, either by adjusting the speed of forward travel of the panner blade or by adjusting the speed of the apron. For some purposes the former means of adjustment is more advantageous because it does not interfere with the other adjustments of the machine.

In the present arrangement, variation in panner blade speed to adjust the same relative to apron speed, is secured by varying the amplitude of oscillation or reciprocation thereof without changing the frequency or period of the cycle of oscillations of the panner blade. In the present instance, reciprocation or oscillation of the panner blade is secured by oscillating the same on rocker arms 370 pivoted on a cross shaft 371 near the base of the machine. At the upper end of the rocker arms 370 is another cross shaft 372, which is straddled by the yokes 373 of the panner frame adjusting brackets 374. Each bracket 374 is provided with a horizontal guideway 375 within which the guide blocks 376 of the panner frame members 355 are adjustably held.

In the present arrangement the length of the rocking arms 370 is large relative to the amplitude of travel of the panner blade, thereby minimizing, so far as is necessary, the deviation of the front ends of the panner frame from travel in a horizontal straight line,—the arc of swing of the upper end of the rocker arms being for all practical purposes substantially a straight line.

The arms 370 are rocked back and forth by auxiliary rocking arms 377 (Fig. 13) which swing about the axis of shaft 378 and which carry, pivotally mounted thereon, sliding blocks 379 which slide in guideways 380 in the rocking arms 370,—the relation of the rocking arms necessitating a sliding connection between the arms 377 and the arms 370.

The shaft 378 is hollow and is mounted in bearings 381 in the bearing brackets 382. (Fig. 52). The arms 377 are rocked through a fixed angle or arc by reciprocating connecting rod 383 (Fig. 4) which is pivotally connected at 384 to the rocking arm 385, (Fig. 13).

Variation in amplitude of oscillation of the rocking arms 370 and the consequent variation in amplitude of reciprocation of the panner blade is effected, in this instance, by varying the effective radius of the rocking arms 377. For this purpose the pivot pins 386 on which the sliding blocks 379 are mounted are themselves slidably mounted in guides 387 in the arms 377. The pin guide blocks 388 carry therein nuts 389 through which screws 390 pass. These screws are mounted at their opposite ends in suitable bearings in the arms 377 to lie longitudinally of the guideways 387. By suitable rotation of the screws 390, the pivot pins 386 may be moved longitudinally of their arms 377, thereby varying the length of their arc of oscillation and the consequent amplitude of oscillation of the arms 370. To effect a convenient adjustment of this character, the screws 390 are provided at their upper ends with bevel gears 391 meshing with bevel gears 392 on the shaft 393 which is mounted in suitable bearings on the interior of the hollow shaft 378. The shaft 393 is connected through sprockets 394, chain 395 and sprocket 396 with an operating shaft 397 which projects through the front frame of the machine and carries an adjusting hand-wheel 398 having a crank handle 399. An appropriate rotation of the hand-wheel 398 will lengthen or shorten the effective radius of the arms 377, thereby correspondingly shortening or lengthening the amplitude of travel with the panner blade, and, since the frequency of oscillation of the panner blade is not thereby varied, the speed of travel of the panner blade is correspondingly increased or diminished as it travels from one end of its oscillation to the other. Such adjustment may be readily made during the operation of the machine at a time when the relative forward travel of the panner blade and the apron may be readily observed.

Inasmuch as the adjusting shaft 393 in the present embodiment oscillates with the shaft 378, it is desirable to prevent transmission of such oscillation to the hand-wheel 398 in order to avoid any change of the adjustment of the panner blade amplitude by an accidental engagement of a workman or some exterior object with the hand-wheel 398 or its handle 399. The possibility of such an accidental maladjustment is prevented by providing a lost motion connection between the sprocket 396 and its shaft 397. (Figs. 7 and 52). Such lost motion connection is secured by slots 400 in the hub of sprocket 396 into which the pin 401, which forms the driving connection between the sprocket and shaft 397, extends. Thus the oscillation of shaft 383 is transmitted only as far as sprocket 396 and not to shaft 397, and is not transmitted to the handwheel 398.

From the panner blade the cakes are deposited on suitable means by which they may be transported to the ovens or other instrumentalities for further treatment. In the present arrangement the cakes are deposited upon pans and by the pans are transported to the ovens.

The pans 21 are successively presented to biscuit receiving position by a carrier herein represented by carrier chain 402 having thereon suitably spaced sets of driving or pushing lugs 403 for causing the positive travel of the pan. The pan carrier chains travel around driving sprockets 404 on shaft 405 and around a forward set of idle sprockets 406 on shaft 407 slidably carried in guides 408 in the side frames of the machine.

The sprockets 404 are preferably slidably keyed to shaft 405 to permit appropriate lateral spacing of the pan chains and driving lugs. Set screws 409 serve to retain the sprockets in adjusted position. Equivalent or similar adjusting means are provided for the forward set of sprockets 406.

The shaft 405 is driven from a split sprocket 410 through the chain 411 and sprocket 412. The latter sprocket is freely mounted in shaft 405 and the sleeve 413 thereof passes through the ball bearing 414 of the shaft and terminates in a driving flange 415 which is pinned by wooden or other breakable safety pin 416 to a flange collar 417 keyed or otherwise secured to shaft 405. The safety pin 417 is designed to break in the event of excessive strain on the chain driving mechanism brought about by any cause, such as the catching of a pan between the driving lugs and some fixed part of the machine structure. The breaking of the pin serves to release or disconnect the driving connection, thus protecting the various elements of the pan carrying mechanism and the driving train.

The split driving sprocket 410 is driven by shaft 418 and is designed to advance the pan carrier a pan length (plus the space between adjacent pans) for every revolution of the shaft 418.

Suitable means are associated with shaft 418 for reciprocating the panner blade connecting rod or bar 383 to oscillate the panner blade through a complete cycle for every rotation of shaft 418. Such means is represented herein by path cam 419 suitably keyed to shaft 418 and having therein a heart shaped cam path 420 in which the connecting rod cam roller 421 travels. The inner end of connecting rod 383 is mounted for reciprocation on a ball bearing 422 on shaft 418 and for this purpose is provided with a longitudinal guideway 423 within which the ball bearing travels. The rear end of the guideway 423 is closed by block 424 removably mounted to the end of the connecting rod and providing a convenient means for assembling the connecting rod over the bearing 422.

The path cam 419 is provided on its outer periphery with gear teeth which mesh with a pinion 425 carried on shaft 426. Shaft 426 derives its power from the main shaft 152. In the present instance, certain speed adjusting mechanism represented at 427 is interposed in the driving train for varying the speed of rotation of the shaft 418 and the consequent speed of travel of the pan carrier and the frequency of oscillation of the panner blade. Such adjusting mechanism serves to vary the speed of travel of the pans or other cake receiving means relative to the frequency of the cutter, thereby varying the number of rows of cakes or the distribution of the cakes on the pans.

The sprocket 410 which drives the pan chains is designed to drive the carrier at such at rate that during one revolution of the shaft 418 the chain moves the distance between the pan driving lugs, in other words the chain causes the succeeding pan to travel a distance equal to the pan length plus the interval between adjacent pans, thereby placing a given pan, at the end of one revolution of the shaft, in the position occupied by the preceding pan at the beginning of the revolution. Thus during one revolution of the shaft 418 the panner blade completes a cycle of oscillation and returns to the same point with reference to the following pan which it occupied at the beginning of the revolution with reference to the preceding pan. Whenever pans of a different length are employed which require a change in the carrier chain by spacing, or whenever said spacing is altered for whatever reason, suitable adjustment to accommodate such change may be effected by removing the sprocket 410 and replacing it by another of a diameter calculated to advance the pan carrier through the distance between adjacent pan driving lugs during one revolution of shaft 418. Such exchange of sprockets 410 may be conveniently effected by constructing the sprocket in halves and bolting the halves together through the sprocket hubs by means of bolts 428. Suitable change in the number of links between driving lugs in chain 402 is, of course, made whenever a different sprocket 410 is employed.

Whenever adjustment of the chain lug spacing results in a variation in the total length of the carrier 402, such variation may be compensated for by sliding the shaft 407 either forward or back in the guideways 408. (Figs. 1 and 4.) The chains 429, which typify in this instance, the auxiliary carrier 24, are blank chains and can be lengthened or shortened by the addition or removal of links to adjust their length to compensate for the adjusted position of shaft 407. Proper tension may be placed in both chains 402 and chain 429 by adjusting the shaft 430 longitudinally of the carrier to give chain 429 the required tension, which tension is transmitted through the unconfined shaft 407 (which also carries the sprockets about which the chains 429 run) to chains 402. Tensioning means are exemplified herein by the adjusting screws 431, threaded through lugs 432 on the side frames, which engage the squared ends 433 of the shaft 430 slidably supported in the slots 434 in the side frames. Shaft 407 and sprockets carried thereon may be removed from the side frames for the purpose of chain replacement or chain adjustment by suitably slackening chain 429 until the ends of the shaft 407 can be brought into the slots 435 in which the shaft may be manipulated to remove it.

The return flights of chain 402 run around idlers or guides 436 (Figs. 4 and 13), which prevent the return flights from catching on moving or other parts of the mechanism.

Assuming for present purposes that the amplitude of the oscillation of the panner blade and the speed of the pan carrier have been adjusted to place upon each pan a given number of rows of biscuits, the panning operation is somewhat as follows:

At the beginning of a panning operation the edge of the panner blade is adjacent the leading or front edge of a pan, with the leading edge of the pan projecting only far enough ahead of the edge of the panner blade to space the first row of cakes a proper distance from the edge of the pan. At the beginning of this supposed cycle, the pan is being carried forward at a speed to receive cakes from the panner blade with the desired space between them. I have found in the present embodiment of the invention, that with a given space between rows of biscuits on the main apron, the resultant spacing between rows on the pan, is substantially proportional to the pan speed. This relation is not substantially changed by the fact that the panner blade retreats during panning. The panning operation continues until the panner blade reaches a point adjacent the rear edge of the pan, such point being determined by the distance which it is desired to space the last row of biscuits from the edge of the pan. Then biscuit deposit is interrupted by advance of the panner blade at substantially apron speed.

In the interval during the forward travel of the panner blade, the space between the pans is carried beyond the edge of the panner blade and the leading edge of the succeeding pan is positioned to receive the first row of biscuits upon the succeeding retreat of the panner blade. It frequently occurs that the carrier speed during the panning operation is not a proper speed to effect the relation last described. Such a condition occurs for various adjustments of the machine, for example, because the pans have a certain spacing or because some biscuits require a different spacing on the pan (greater or less) than their spacing on the apron. For example, under the latter condition, biscuits formed in juxtaposition on the apron may require a substantially higher relative pan spread to space them apart properly on the pans. Under the former conditon the pan speed during the advance of the panner blade may not be adequate to secure the proper pan relationship for the succeeding panning operation, and under the latter condition, because of the increased pan speed, the pan speed may be too great to secure the proper pan relationship, and it may be necessary in such cases to lessen the pan speed during the advance of the panner blade to prevent the pan from being carried beyond the proper point for panning.

In the present arrangement, means for effecting the adjustments in pan speeds referred to above, are typified by a differential gear mechanism 437 (Figs. 7, 12, 45 and 47), which may alternately and periodically add to and subtract from the normal uniform speed of the pan carrier, certain increments and decrements of speed or travel, to secure the proper coordination between pan travel and the panning operation.

For this purpose the differential 437 is interposed in the driving train between shaft 418 and the carrier driving sprocket 410, as follows:

The shaft 418 carries adjacent one end, which projects from the exterior of the front side frame, gears 438 and 439, the former being keyed or otherwise secured to the shaft and the latter being free thereon. Mounted in suitable ball bearings in the differential housing 440 is a pair of intermeshing pinions 441 and 442 (Figs. 45 and 47), each constructed and arranged to mesh respectively with only one of the gears 438 and 439. For example, in the present arrangement, the pinion 441 meshes with gear 438 and pinion 442 meshes with gear 439 and their opposite ends 443 and 444 are left blank or reduced in diameter so as not to mesh with the other gears. Thus, assuming the differential housing to be held stationary, a uniform counter-clockwise rotation of shaft 418, as indicated in Fig. 12, results in a correspondingly uniform clockwise rotation of gear 439, which rotation is transmitted through its sleeve 445, freely rotatable on shaft 418, to the sprocket sleeve or hub 446 into which it is screwed or otherwise suitably secured and upon which the driving sprocket 410 is mounted. To reduce friction and to require only infrequent lubrication (for example by a grease gun), the gear 439 and its sleeve 445 are mounted in ball bearings 447, 448 and 449 in the differential housing and the machine frame respectively. The sprocket hub 446 is also provided with a ball bearing 450 because of its relative rotation on shaft 418. The end of shaft 418 is mounted in a ball bearing 451 in the differential housing.

The rotation of sprocket 410 and hence the movement of the pan carrier and pan can be changed or accelerated or decelerated by a rotation of the differential housing 440 in which pinions 441 and 442 are mounted. In the present arrangement, for example, a uniform clockwise rotation of the differential housing produces a corresponding increase in speed of the pan carrier, the movement of the differential housing being transmitted through the pinions 441 and 442 to the gear 439 which it rotates in a clockwise rotation. Because the pinion 441 meshes with gear 438, which is positively driven and therefore not affected by any rotation of the differential housing, the rotation of the latter is added to the normal rotation of gear 439. In this instance the added rotation is double the rate of rotation of the differential housing, assuming that gears 438 and 439 and the pinions 441 and 442 to be of the same diameter respectively, or otherwise proportioned as to have together a unitary speed ratio.

Thus, assuming a uniform drive of the pan carrier by the shaft 418, any rotation of the differential casing in a clockwise direction adds travel to the carrier chain and causes a given point on the carrier chain to travel farther, by an amount proportional to the rate and duration of the rotation of the differential casing, than it would have traveled had the differential casing remained stationary.

A corresponding rotation of the differential casing in a counter clockwise direction similarly subtracts, instead of adds, travel from the carrier chain. Therefore, if during a given interval the differential casing is oscillated forward and back through the same angle, the resultant travel of a given point on the carrier chain will be no greater during this interval than it would have been had no movement of the differential housing taken place. The effect of such an oscillation clockwise and counter clockwise of the differential housing is to cause the carrier chain to travel faster than its normal travel by a certain amount, during the clockwise rotation of the differential casing, and to travel slower than normal speed by the same amount, during the counter clockwise rotation of the differential housing.

Notwithstanding the interposition of the differential, the drive of the pan carrier from shaft 418 is positive at all times even during the oscillation of the differential. Whenever the condition of the differential movement is uniform, that is when it is stationary or rotating at a uniform rate, the corresponding travel of the pan carrier is likewise uniform. During the periods when the movement of the differential is varying, that is when its rotation is either accelerating or retarding, the speed of the pan carrier will correspondingly accelerate or retard.

In the present arrangement, it is advantageous to alter the pan speed, if such alteration or variation be necessary, at or substantially at the moments when the panner blade reverses direction of travel. For this purpose a rocking arm 452 is provided at the front side of the machine which is designed to rock or oscillate synchronously with the panner blade and which by its connection, through the connecting yoke 453, to the differential casing 440, oscillates the differential casing with corresponding synchronism.

The synchronous oscillation of the rocking arm 452 is effected, in the present instance, by the shaft 454 (to which the rocking arm is keyed or otherwise suitably secured), which carries intermediate its ends (inside the machine), a depending rocking arm 455 adjustably secured thereto by set screws 455', said arm being oscillated back and forth by the panner blade swinging arm 383, through the connecting link 456. With this arrangement the shaft 454 is rocked in a counter clockwise direction during the forward travel of the panner blade and in a clockwise direction during the retreating travel of the panner blade, the reversal in direction of rotation taking place simultaneously with the reversal in movement of the panner blade.

The adjustable connection of rocking arm 455 with shaft 454 permits an adjustment of the angularity of link 453 relative to the rocking arm 452 and the differential by means of which may be secured, variation in the degree of acceleration and deceleration of the pan carrier from one speed to another.

For varying the amount of change in the normal travel of the pan carrier by the differential, the rocking arm 452 is constructed and arranged to permit the connecting link 453 to be positioned various distances from the center of oscillation, that is from the center of shaft 454.

In the present instance, such adjusting means is represented by the hand-wheel 457 which rotates, through the worm 458, the gear 459 mounted in the link 453 adjacent its end. A pinion 460 meshing with rack 461 is connected through its sleeve 462 with worm gear 459. The rack 461 is arranged longitudinally of the rocking arm 452, which, in this instance, is constructed to extend in opposite directions from the shaft 454. The arm 452 is provided with a guideway 463 in which a block 464, carrying the pivot shaft 465, slides. The pivot shaft carries the link 453 and gears 459 and 460. The hand-wheel and worm 458 are supported in suitable bearings 466 carried by block 464. Rotation of hand-wheel 457 causes the end of the link 453 to travel along the rocking arm 452, thereby either increasing or decreasing the effective radius of oscillation of the arm 452.

In the present instance, the arm 452 is curved as indicated in Fig. 45, on a radius corresponding substantially to the length of link 453, thereby permitting the adjustment of link on the rocking arm 452 without transmitting any substantial movement to the differential housing during the adjustment.

An increase in the effective radius of the rocker arm 452 causes an increase in the angle of oscillation of the differential and a corresponding increase in the travel, alternately adding to and subtracting from the normal pan speed. At zero rocking arm radius, the differential housing remains stationary and the pan speed is therefore uniform for the entire cycle.

In the present arrangement, an adjustment of the link 453 to the opposite side of the center of oscillation of rocking arm 452, changes the phase of the alternate pan speed increases and decreases with respect to the oscillation of the panner blade. Thus when the link 453 is above the center of shaft 454 (as illustrated in Fig. 45) the shaft oscillation brings about increased pan speed as the panner blade moves backward and decreased pan speed as the panner blade moves forward. The location of the arm 453 on the opposite side of shaft 454 brings about the reversal of these conditions. The former adjustment may be required when a substantial increase in biscuit spacing on the pan is desired. This is true, for example, for cakes which are in juxtaposition on the apron but require substantial spacing on the pan so as not to bake together.

For making an initial adjustment of the location of the pans with reference to the panner blade, means are provided for relatively moving the carrier chain with reference to the panner blade drive. Such adjustment permits, for example, the positioning of the proper point of the pan adjacent the edge of the panner blade when the latter starts to deposit cakes on the pan. Such adjustment enables the batch of cakes, comprising a number of rows of cakes, to be properly centered on the pan.

In the present arrangement, such an adjustment is effected by a suitable rotation of the differential casing independently of its oscillation by the panner blade swinging arm 383. For illustration, the arm 453 is pivotally connected to a frame 467 (Figs. 12 and 45) which is pivotally mounted on the differential housing coaxial with shaft 418, the bearings for such mountings being formed by hubs on the differential housing (Fig. 12). Also carried in suitable bearings in frame 467 is a worm 468 which meshes with a series of worm gear teeth 469 formed in or secured to the periphery of the differential housing. The worm 468 may be rotated by the hand-wheel 470 mounted in bearings on the frame 467 through meshing bevel gears 471 and 472. This construction provides for an indefinite adjustment of the differential and the pan carrier.

Appropriate rotation of the hand-wheel 470 rotates the differential casing either in a clockwise or counter clockwise direction independently of any movement of the link 453 and correspondingly advances or retreats the pan chain and the pans thereon. Inasmuch as the pan lugs and pans are so spaced on the chain that for every complete cycle of oscillation of the panner blade a given pan lug or pan is advanced to the position occupied by the preceding lug or pan at the beginning of the oscillation, an adjustment of a single pan or pan lug with reference to the panner blade, by means of the adjacent hand-wheel 470, suffices for all other similar and similarly spaced pans.

To adjust batches of biscuits, prior to delivery, relative to the movements of the panner blade so as to be properly deposited thereby, suitable means are provided for effecting a relative shifting of the batches and the panner blade.

In the present instance, such adjustment is effected by moving the panner blade relative to the apron independently of the oscillations of the panner blade or the travel of the apron. Such adjusting means is exemplified herein by a slidable connection between the panner blade and the panner blade swinging arms 370 and the panner frame adjusting brackets 374. The guide blocks 376 of the panner frame, which are slidably mounted in the guideways 375 of the adjusting brackets, are adjusted relative to the latter by the screws 473 which pass through screw lugs 474 fastened to the adjusting brackets and which are rotatably connected with the panner frame guide blocks 376. Simultaneous rotation of the opposite screws 473 is effected by the shaft 475, mounted in the guide blocks 376, carrying bevel gears 476 which mesh with the bevel gears 477 on the shafts of the adjusting screws 473. A hand-wheel 478 serves to operate the adjusting mechanism.

Thus, the panner blade point may be adjusted backward or forward relative to the apron 13 so as to bring a given row of biscuits (usually the first row at the commencement of the panning operation) to a desired relation with reference to the panner point. For example, the panner point may be adjusted so that the first row of biscuits of a given pan batch may be adjusted to the position indicated in Fig. 8, wherein the cakes are allowed to project beyond the edge of the panner blade. Any other adjustment may be effected, either while the machine is stationary or while it is in operation. In the present embodiment, this adjustment with reference to one batch of biscuits will be maintained for all corresponding batches.

The driving instrumentalities for the panner blade, herein exemplified by the path cam 420, are designed to minimize the amplitude of oscillation of the panner blade, within limits adequate for securing a proper and periodic change of pan speed. In the present arrangement, one of the factors which is somewhat determinative of the amplitude of the panner blade oscillation, is the minimum time within which a proper change of pan speed may be effected without excessive acceleration of the pan carrier. Excessive pan accelerations such as occur when the pan speed is suddenly increased frequently cause the panned biscuits to be disturbed or shifted or even jarred from the pan. This is particularly true with the types of biscuits or crackers which slide readily on the pan.

Thus it is desirable to interrupt the panning operation for a period of time adequate to secure the gradual change in pan speed, thereby avoiding any shifting of the biscuits on pans. With the exception of above mentioned limitations, the amplitude of panner oscillation or the frequency of oscillation may be adjusted to suit the particular requirements.

In this embodiment, the total period for a complete cycle of panner blade operation, is generally considerably more than double the time interval adequate for the proper change in pan speed during the advance of the panner blade. In order to minimize the necessary amplitude of panner blade travel, the driving mechanism is constructed and arranged to cause the panner blade to retreat during the panning operation at a considerably slower rate of speed than it travels during it forward or advancing movement. Thus the major portion of the period of a complete panning operation, is consumed in the rearward travel of the panner blade, thereby limiting the amplitude of the panner blade travel.

In the present instance, the path cam 420 is designed (as shown in Fig. 4) so that the panner frame swinging arm 383 travels forward during substantially one-fifth of a revolution of the path cam and travels rearwardly during the remaining four-fifths of that revolution. Such an arrangement, wherein the amplitude of the panner blade oscillation is minimized, reduces the size of the mechanism necessary to effect such oscillation, and in the present instance, materially reduces the size of the path cam within limits which make it practicable to employ the arrangement herein shown.

It will be apparent from the foregoing description of the pan carrier drive and the panner blade drive, that there is no opportunity for the movement of either the panner blade or pan carrier to get out of step. The relative movements of the panner blade and pan carrier originate in the path cam and there is no opportunity, because all parts are positively driven, for the mechanisms to get out of step. Any element of such mechanisms may be removed and replaced without liability of disturbing the synchronism of the panner blade and pan carrier movements.

By varying the speed of the pan carrier relative to the frequency of operation of the cutter, the number of rows of cakes on a given pan may be varied. For example if the pan speed is such that the pan is advanced through a complete pan length during eight operations of the cutter, then eight rows of biscuits will be deposited on the pan, a row in this instance meaning the biscuits cut out by a single operation of the cutter. For many kinds of biscuits the cutter is constructed to cut a double row at each operation, either in straight or staggered relation,—ordinarily a biscuit row is staggered to reduce scrap because the majority of individually cut biscuits are generally circular, elliptical or irregular in outline.

In the present embodiment, for permitting suitable variation of the number of rows of biscuits on a pan, the shaft 426 is provided with a series 479 of gears having different numbers of teeth. The number of teeth in each gear is calculated to cause one complete rotation of the cam gear 419 for a definite number of operations of the cutter,—in the present instance, five complete oscillations for the smallest gear 480 and increasing one oscillation per gear successively to the largest gear. As stated above, since one operation of the cutter may produce a single or double row of biscuits, or even, for small biscuits, a greater number of rows, the actual number of rows of cakes on a pan depends on the number of rows of biscuits cut by a single operation of the cutter. For example, if the gear 480 were employed to drive shaft 426, then the pan would be advanced to receive the production of five operations of the cutter,—which might be five or ten rows of cakes, depending upon the number of rows of cakes produced by the cutter at a single operation. The above explanation assumes, as is the case in the present embodiment, that one revolution of cam gear 419 advances the pan carrier a full pan length (including the space between pans) and moves the panner blade through one complete cycle.

Selective mechanism for driving through any one of the series of gears 479 is typified herein by tumbler gears one of which is slidably splined on driving shaft 481. (Figs. 7, 10, 37 and 38). The tumbler gear 482 is supported on ball bearings in tumbler frame 483 and meshes with the sliding gear 484 splined on shaft 481. The tumbler frame 483 is mounted in ball bearings 485, around the hub of gear 484. The tumbler frame and tumbler gears are constructed and arranged to permit tumbler gear 482 to be moved longitudinally of shaft 481 to mesh with any of the gear series 479.

A stepped supporting bracket 486, supported between the side frames and provided with steps 487, is provided for holding the tumbler frame and tumbler gear 482 in proper driving position with respect to the gear series 479, the tumbler frame being provided with a supporting stop 488 (Figs. 37 and 38) for engaging one of the series of steps 487 on the bracket. Such an arrangement maintains the proper clearance between the gears. The step spacing on the bracket is designed in accordance with the varying gear sizes of the series 479.

An elongated pinion 489 whose shaft projects beyond the front side of the frame, and a curved rack 490 on the tumbler frame 483 represent means for raising or lowering the tumbler frame and gear into or out of mesh with any gear in series 479. When the tumbler frame is moved longitudinally of the shaft 481 during adjustment, the tumbler frame rack slides along the teeth of the pinion 489, thus maintaining the tumbler frame in raised position. When the selected gear is reached, the pinion 489 is rotated in the reverse direction to lower the tumbler gear 482 into mesh therewith. Figs. 37 and 38 illustrate the cooperation of the tumbler frame with different sized gears in series 479. Pinion 489 is provided with a crank handle 491 on a crank disc 492 at the front of the machine by means of which it may be operated.

The high pitched screw 493 and the nut 494 thereon represent means for adjusting the tumbler gears longitudinally of the shaft 481 to the selected position, after the tumbler frame has been raised clear of the gear series 479 preliminarily to such adjustment. The nut 494 is pivotally connected at 495 to the tumbler frame and is provided with telescoping connecting means represented by the rod 496 and tube 497 to compensate for variation in the distance between the pivot point 495 and the screw 493 for varying angular positions of the tumbler frame, examples of which are illustrated in Figs. 37 and 38. The screw 493 is rotated by crank handle 498 on the screw shaft which projects from the front side of frame.

In the illustrative embodiment, the gear series provide for a variation of ten cutter operations, the eleventh or largest gear of the series being merely double gear 480, that is, if gear 480 operates the pan carrier to pan the product of ten cutter operations then the eleventh or largest gear will pan the product of twenty operations.

In the event a pan is not economically filled with the product of a whole number of operations of the cutter, means are provided for filling the available pan space with a fraction of a group of biscuits produced by a succeeding cutter operation and for panning the balance of the biscuits of that group on the succeeding pan. This is accomplished in the present arrangement by providing means for adjusting the pan speed relative to the apron speed whereby the apron will deliver to a pan, in addition to the product of a whole number of cutter operations, a part only of the product of a succeeding cutter operation. For example, the pan row mechanism, (that is the mechanism for adjusting the number of rows of a pan), in the present embodiment, may be adjusted, to pan one-half of a staggered row of cakes, as illustrated for example in Fig. 40. A full staggered row is represented, in Fig. 40, by the series of cakes connected by the staggered dotted line 499 which comprises two half rows 500 and 501 offset with respect to each other. The pan row mechanism may be adjusted to deposit the half row 500 adjacent the rear edge of one pan and the other half row 501 adjacent the leading edge of the succeeding pan. Where the cutter cuts a double row of biscuits during one operation, for example the double staggered rows connected by the pair of zigzag dotted lines in Fig. 39, the pan row mechanism may be adjusted to deposit the first row of the double row on one pan and the second row of that row on the following pan, thereby panning an odd number of full rows produced by a double row cutter.

The mechanism referred to above is represented herein by the cooperating pairs of gears 503, 504 and 505, 506 secured respectively on the main shaft 152 and shaft 481. Shaft 481 is constructed to be longitudinally slidable, whereby either gear 504 or 506 may be operatively connected with an appropriate gear on shaft 152, or, by an intermediate adjustment of the shaft 481, both gears may be drawn out of mesh,—for the latter purpose gears 503 and 505 being adequately spaced. The pair of gears 503 and 504 are designed to double rotation of shaft 481 effected by the other gears 505 and 506.

Thus, when gear 505 is operative, the range of pan row variation is from ten to twenty cutter operations, referred to above; but when gear 503 is operative shaft 426 is rotated at double the former speed and the resultant range of pan row variation is from 5, 5½, 6, 6½ and so on, to 10 cutter operations. In other words each gear of the series 479 may be employed to drive the pan carrier to pan a given number or one-half that number of cutter operations. For example, the tenth gear in series 479 will pan 19 rows (assuming the cutter cuts a single staggered row), when driven through gear 505, but will pan only 9½ rows when driven through gear 503.

Shaft 481 is provided with an adjusting hand-wheel 507 for moving it longitudinally and a ball bearing collar 508, by means of which the shaft may be held in adjusted position, housing 509 pivoted to the frame at 510 is provided. On the interior of the pivoted housing 510 is a series of spaced grooves 511 of a size to receive the collar 508, each groove having marginal ribs 512 or stop surfaces for retaining the collar in the particular groove. The grooves 511 are spaced with respect to the various positions of gears 504 and 506 whereby either of the gears may be held in driving position or both in an intermediate neutral position. To effect such an adjustment, the pivoted housing is raised by its handle 513 to clear the collar 508 and then the shaft 581 is moved longitudinally to proper position by means of the handwheel 507.

For easily adjusting the pan row mechanism to pan a desired number of rows of biscuits, the tumbler adjusting screw has associated therewith indicating means, represented herein by the numbered dial 514 having a series of holes or recesses 515 therein and having gear teeth on its periphery. In the spaces between the holes 515 are numbers indicating, with reference to the gear series 479, the number of cutter operations (or rows) per pan. The outer circular row contains numbers double those of the inner circular row. The gear teeth 516 on the dial mesh with a pinion 517 on the shaft of adjusting screw 493. The dial 514 is designed so that when it is rotated by the crank handle 498 to an angular distance represented by the distance between adjacent holes 515, the tumbler gears are moved by distance of one gear in series 479.

A safety means is provided to render less likely any attempt to adjust the tumbler gears when the tumbler frame is lowered in operative position. Such means is represented by the plate 492 carrying the tumbler gear elevating crank handle 491 which overlaps slightly the dial 514 and is provided with a notch 518 which registers with the region on the dial 514 bearing the pan row numbers referred to. The dial 514 is so designed that the position of the tumbler frame relative to the gear series 479 is indicated by the set of pan row numbers registering with the notch 518. It will be observed that two numbers, one double the other, always register with notch 518, inasmuch as the number of pan rows also depends upon which of gears 503 and 505 is the driving gear.

When the proper numbers come into registry with notch 518, the crank handle 498 which carries a spring pin (Fig. 41) at the opposite end thereof is brought into registry with the adjacent hole 515 and the pin is inserted therein, thus locking the tumbler gears in proper relation with the desired gear on series 479.

Notch 518 is located on plate 492 so that it does not register with the margin of the dial 514 until the plate has been rotated to raise the tumbler gears clear of the gear series 479 and the supporting bracket 486, at which time the tumbler gears are free to be moved longitudinally. Thus it is impossible to make an intelligent adjustment of the tumbler gears to the desired position until the plate 492 has been rotated to raise the tumbler gears and bring the notch 518 in registry with the numbered rows on dial 514. As soon as the tumbler gears have been removed to adjusted position, the plate 492 is rotated in a counter clockwise direction, thus lowering the tumbler gear into mesh.

In order to retain the tumbler gear 482 in mesh with a selected gear in series 479, the elevating handle 491 is provided with a ratchet plate 519 (Figs. 10 and 41) with which the spring pin 520 on the adjusting handle 491 engages. The notches 521 in the ratchet plate are constructed to resist any tendency of the tumbler frame to raise out of mesh during transmission of drive. Since the tumbler gear 482 may not always drop into full mesh with the selected gear in series 479, the bottoms of the notches 521 in the ratchet plate are inclined, thereby permitting the lowering of the tubular frame and the resulting counterclockwise rotation of adjusting handle 491, without the necessity of withdrawing the pin 520. Thus if the tumbler gear 492 should not fall entirely in mesh, the adjusting handle 491 is rotated as far as it will go and then released. When the machine commences operation, the tumbler gear will fall into mesh and the pin 520 will seat in a suitable notch 521. In the present arrangement the pin 520 is pressed forwardly by a suitable spring within the handle 491.

In order to eliminate confusion with respect to the double series of numbers on dial 514, an adjustable window or slot 522 is provided over the margin of the dial 514 underneath the notch 518 when the latter is in position for adjustment. The slot 522 is only the height of one of the numbers on the dial 514 and is not large enough to render both numbers in a group entirely visible. Suitable means are provided for positioning the slot 522 to register either with the inner or outer series of numbers on the dial 514 depending upon the adjustment of shaft 481. Such adjusting means is represented herein by the pivoted housing 509 in which the respective grooves 511 are stepped (see Fig. 11) so that the housing occupies different angular positions on its pivot depending upon the particular groove 511 in which the collar 513 is seated. The various angular positions of the housing 509 are utilized to adjust the window 522. In this instance the window 522 is mounted on an arm, pivoted at 523, which carries a cam lug 524 riding in a cam slot 525 in a bracket on the housing 509. The cam slot 525 is designed to hold the window 522 in register with the outer series of numbers on dial 514 when shaft 481 is adjusted to be driven by gear 505, and to register with the inner series of numbers when the shaft is adjusted to be driven by gear 503. An intermediate position of the window 522, wherein it registers with a region intermediate the rows of numbers thereby exposing only a portion of each of the rows (see Fig. 36), indicates that the collar 508 is in the intermediate groove 511,—a position in which neither gear is in mesh and the pan carrier and panner blade operating mechanism are idle. The neutral adjustment of shaft 481 is desirable when the machine is operated in converted condition for peeling, during which neither the pan carrier nor the panner blade operations are utilized.

To protect certain mechanisms against damage through jamming or catching of the mechanisms beyond the driving pinion 425, the latter is connected with shaft 426 through a safety pin 526 which passes through registering openings in flanges 527 and 528, the former being keyed to shaft 426, and the latter being on the pinion sleeve 529 which is free on shaft 426 except for its connection therewith by the safety pin. The safety pin is of wood or other material of sufficient strength only to transmit normal driving stresses, excessive stresses causing rupture of the pin.

In the present embodiment, pans are supplied to the pan carrier from one side of the machine, in this case the back side, at a point to the rear of the panner blade. Inasmuch as it is not desired to advance a pan until the latter is properly positioned on the carrier chains, against a set of pushing lugs, the pan is held out of operative position with respect to the carrier chain by bracket 530 pivoted at 531, to a stationary but longitudinally adjustable bracket 532, to swing longitudinally of the pan carrier. (Figs. 53 to 55) Upon inserting a pan into the machine, the attendant merely passes the pan laterally through an elongated opening in the side frame with the leading edge of the pan resting on the bracket flange 533, the other end being in engagement with the chain but held against advance by the bracket 530. A flange on the stationary bracket 532 parallel to flange 533, serves as a guide for the pan edge.

The bracket 530 is held in normal or full line position (see Fig. 54) by the spring 534 against the stationary bracket 532 which acts as a stop, in which position it supports the leading margin of the pan. The swinging bracket is operated to drop a pan in proper position for advance, by a trigger 535 depending from the bracket flange and positioned to be engaged by a pan pushing lug. As the carrier chain advances a chain lug engages the trigger and swings the bracket forward until the bracket flange is clear of the pan margin whereupon the pan drops onto the chain and the bracket is returned to normal position after the chain lug clears the trigger 535 (see Fig. 54).

With this arrangement it is not necessary for an attendant to hold a pan in readiness to release it when it registers with the proper position on the carrier chain. As soon as a pan is positioned in the pan dropper, the attendant is free to take another pan to be inserted in the pan dropper when the first pan is dropped.

The stationary bracket 532 carrying the swinging bracket 530, may be adjusted longitudinally of the frame to accommodate it to receive a different length of pan. Such adjustment is made readily by unbolting the bracket 532 and moving it to the desired position and then screwing the bolts into one set of a series of conveniently located threaded bolt holes.

For operating the machine simply as a peeling machine wherein batches of crackers or the like are removed from the apron by "peels", the main apron is elongated by releasing the slack in the apron take-up mechanism (Fig. 23), and extended in a horizontal position to substantially the front edge of the machine where it is supported by an auxiliary roll 25 in the auxiliary frame 26. For such operation the panner blade around which the apron normally runs is left idle and if desired may be removed so as to be less in the way. The frame 26 is suitably bolted at 536 near the front end of the machine and supported at its rear end by engagement, at 537, with the side frames of the machine. Thus, an adequate space is provided on the horizontal extension 27 of the apron where the "peels" may be slipped under sections of dough to transport them to the ovens.

In such operation of the machine, as elsewhere stated, there is usually only marginal scrap, in which case the scrap carrier 16 is rendered inoperative by raising it through the cams 231 a substantial distance above the main apron. The dough boys 17 are applied to divert the marginal scrap to the scrap carrier 18. Obviously, however, ordinary cut biscuits may be removed by peels in the same manner if desired, in such case the scrap carrier 16 being brought into operation. Ordinarily, however, separated biscuits are not removed on peels because of the difficulty of maintaining them in proper spaced relation on the peels and delivering them to the ovens in properly spaced relation.

In making certain types of crackers, such as soda crackers which are formed by dieing the dough without cutting through it entirely, it is desirable to cut through the dough sheet transversely at intervals to form the died dough into sections of convenient size either for peeling or depositing on a pan.

In the present instance, such periodic cutting of the dough sheet is effected by slightly raising the apron and dough sheet at intervals so that when the cutter descends it will cut entirely through the sheet. This is effected by sliding a sheet of metal of suitable thickness underneath the apron below the cutter whenever it is desired to have the cutter entirely sever the dough sheet.

Such a device is represented herein by the plate 538 (Figs. 33 and 35), which rests on the machine below the apron in a position just beyond the region where the cutter descends. The plate is inserted beneath the cutter by pivoted arms 539 whenever it is desired to sever the dough sheet. The arms 539 operate the plate through rod 540 to which the plate is connected, and, to permit the removal of the plate from the machine whenever it is not in use, the arms are slotted at 541. The arms 539 are secured to a sleeve pinned to rock shaft 542, the latter being rocked by the lever arm 543. To the latter is connected a spring 544 which serves to position the plate 538 under the cutter whenever the lever arm is released. The lever arm is controlled, in this instance, by a lever 545 connected thereto by the link 546. The lever 545 is pivoted on a stub shaft 547 carried in the bracket 548, and is actuated by cam 549 having a series of ratchet teeth 550 by means of which the cam may be rotated one notch for every operation of the cutter. Bearing against the periphery of the cam is a cam follower 551 pivoted about the stub shaft 547. The cam follower 551 carries a projecting threaded lug 552, in which the wing screw 553 is threaded. The wing screw also passes through a hole in a lug 554 projecting from the lever 545 and in alignment with the threaded opening in lug 552. A spring 555 yieldingly separates lugs 552 and 554. The wing screw and spring 555 serve yieldingly and adjustably to connect the cam follower 551 to the lever 545. By suitable rotation of the wing screw 553 the lever 545 may be advanced or retreated to adjust the position of the arms 539 and plate 538 with respect to the cam surface and the cutter bar.

Suitable mechanism is provided for periodically rotating the cam 549 around its pivot shaft 556 in accordance with the movements of the cutter. Such mechanism is represented by the rod 557 which is connected at some suitable point on the reciprocating cutter bar or the mechanism for reciprocating it, whereby the rod 557 is reciprocated with the cutter. The rod 557 oscillates a rocking arm 558, which swings about the pivot shaft 556. The arm 558 carries slidably mounted thereon block 559 which has projecting therefrom a pawl 560 pressed outwardly by the spring 561 into engagement with the ratchet teeth 550. The block 559 to which the bar 557 is preferably connected carries a spring pin 562 arranged to enter any one of a series of recesses 563 in the arm 558. Thus the block 559 may be adjustably positioned at various places along the arm 558.

When the periodic reciprocations of the rod 557 bring the flat spot 564 upon cam 549 under the cam follower 551, it permits the latter to move inwardly, thus releasing the plate 538 to be pulled under the cutter by spring 544. The flat portion 564 of the cam is designed to permit the plate 539 to remain under the cutter only for one oscillation of the cutter, further rotation of the cam again forcing out the cam follower 551 and resulting in the withdrawal of plate 538. Thus the plate 538 is positioned under the cutter once for the number of cutter operations required to bring a flat spot in the cam under the cam follower. By varying the number of ratchet teeth 550 in cam 549, the number of oscillations of the cutter for every operation of plate 538 may be varied. Thus the number of rows of died out crackers in each transversely cut section of dough may be varied.

In the present machine, a number of cams 549 are provided, each cam having a different number of ratchet teeth 550. Since the ratchet teeth preferably should be spaced a definite circumferential distance apart, the variation in the number of teeth in a cam results in positioning the row of ratchet teeth either farther out or closer to the center of the cam, depending on the number of teeth. In order to bring the pawl 560 in registry with the row of ratchet teeth, the block 559 may be adjusted along the arm 558 by raising spring pin 562 and then releasing it when the adjustment has been completed.

When the automatic cut-off device is not employed, the rod 557 is preferably removed by detaching it from the cutter bar and unhooking it from its position around the stud 565 on the block 559, the rod 557 having a hook-shaped end for this purpose.

The illustrative machine is constructed and arranged so that it may be equipped with a main apron which is seamless,—that is having no transverse seam formed by joining together the ends of the apron web to form an endless apron. Such a transverse seam is objectionable because it almost invariably is thicker than the main apron, thus resulting in raising the dough sheet at the seam and frequently causing too deep a cut into the dough. Such a deep cut frequently breaks the scrap sheet as it is lifted from the apron or if there be no scrap sheet, results in severing the died dough sheet at the wrong point. Furthermore, the increased thickness of the apron at the seam subjects the apron to severe treatment by the cutter which frequently cuts into the apron at this point, thus materially reducing the life of the apron.

To permit the machine to be equipped with a seamless apron, certain parts which are within the apron loop during the operation of the machine are made conveniently removable without necessitating any disassembly of the machine.

Such parts and the manner of removing them will briefly be stated:

Beginning with the front end of the machine, the panner blade may be removed by releasing the eye bolts 566 and removing, at least the rear one from its slotted lug 567, and then withdrawing the cotter pin 568 in bar 354 to permit the panner bar 354 to be moved forward until the rear end of the bar 354 clears the hole in the panner side frame 355. Thereafter the blade is removed in a reverse direction until the front end of the bar 354 clears the hole in the front panner side frame 355.

It will be understood that on replacing the panner blade, it is necessary to remove temporarily the supporting bracket 368 which holds the guard plate 367 and the brush 365 in order to permit the apron to pass inside the brush 365 and inside the plate 367. This is effected simply by unbolting the brackets 368 from their support, the cross bar 369.

The stationary roll 360 may be removed as described above by backing off the stub shafts 364 which are screwed into the side frames.

All of the top plates 30 which rest on the top of the side frames underneath the top flight of the apron, and which are merely sheet-iron plates screwed down to the upper flange of the side frames, are removed.

The roll 117 forming one of the pair of rolls for driving the scrap carriers is removed by unbolting the bearing plates 569 and 570, Fig. 43, which carry the ball bearings for the roll shaft, removing the front bearing plate from the roll shaft and then drawing the entire roll through the opening 571 in the rear side frame, which opening is made large enough to clear the roll.

The cross scrap apron 438 is temporarily removed by releasing the bracket for the rear roll 339 by unscrewing the nut 341. This bracket may be removed by stretching the apron slightly and withdrawing the roll 339, thus permitting the apron to be pulled across to the front of the machine.

The cutter bed 202 is removed merely by raising it until the dowell pins 203 clear their sockets.

The stationary apron take-up roll 121 (Figs. 3 and 20) is removed by devices similar to those for roll 360, merely by unscrewing stub shafts 572 which are screwed into the machine side frames and project into roll ball bearings 573. It is necessary only to back off the stub shafts 572 a distance sufficient to clear the ends of the roll 121.

The main driving drum is removed by unbolting the front bearing plate 574 (Fig. 19) and unscrewing the nut 575 on the end of the roll shaft. The roll shaft is merely splined to the worm screw sleeve 576 and can readily be withdrawn out of the front of the machine, the bearing plate 574 providing a sufficiently large opening in the front side frame to permit this. Preferably the spring pressure on rolls 113 (Fig. 3) is removed for this purpose.

Other rolls and devices about which the apron runs do not lie within the loop of the apron but either below or above it. Such devices need not be removed. For example, the movable roll 120 of the apron take-up device, although it is removable for other purposes, need not be removed because it contacts only with the outer surface of the apron. In other words, only devices which face or contact with the inner surface of the apron need be removed. Devices which face or contact only with the outer surface of the apron need not be removed.

After the seamless apron has been placed in the machine, all of the devices heretofore removed are reinserted and the apron take-up device adjusted to take the slack out of the apron.

As stated earlier in the specification, the machine is constructed and arranged to require lubrication only at long intervals. Substantially all of the bearings which can be made so, consistently with good machine design, are ball bearings or their equivalent which are lubricated preferably by grease injected from some suitable force feed lubrication system. However, in order to avoid unnecessary complication of the drawings, some bearings have not been shown as being supplied with ball bearings, but it is understood that substantially all bearings which may be so equipped consistently with good practice, are equipped with ball or roller bearings of an approved design.

Where possible lubrication conduits are led to the front of the machine or other accessibly located places (and capped with closures of any suitable type) by means of which lubricant may be directed to the particular bearing. Some bearings, such as rock shaft bearings 381 (Figs. 7 and 13) require oil lubrication and when possible are provided with lubrication conduits, such as conduits 577, which extend to a conveniently accessible point.

Ball bearings of the character which may be lubricated with grease, as described above, need, under ordinary operation of the machine, to be replenished with lubricant only once each year.

Bearings which cannot be lubricated in this manner and which, because of the character of the bearing, require daily lubrication are few in number and where possible are provided with lubrication conduits extending to some accessibly located point where lubricant may readily be supplied.

Obviously the invention is not confined to the details of construction and mode of operation of the illustrative machine, since the same may be variously modified. Moreover it is not indispensable that all features of the invention be used conjointly, since they may be advantageously used in various different combinations and subcombinations.

Having described one embodiment of my invention, I claim:

1. In a biscuit machine, the combination comprising a continuous seamless dough apron, driving mechanism therefor, and means for supporting said apron in extended position, means for forming biscuits on said apron said supporting and driving means being constructed and arranged to be removable to permit the insertion of the seamless apron in said machine.

2. In a biscuit machine, the combination comprising a continuous, seamless dough apron, driving means therefor, means for supporting said apron in extended position, means for forming biscuits on said apron, means located within the loop of said apron for alternately extending and retreating the upper surface of said apron to deliver batches of formed biscuits, and side frames in which said driving and apron supporting means are mounted said driving, supporting and extending means being constructed and arranged to be readily removable from said frames to permit the insertion of the seamless apron.

3. A biscuit machine comprising in combination, biscuit forming mechanism including driving means, a dough apron driven by said driving means, means for varying the speed of said dough apron relative to the speed of the forming mechanism, gauge rolls driven from said apron speed varying means and means for varying the speed of said gauge rolls relative to the speed of said apron.

4. In a biscuit machine, the combination comprising biscuit forming means for forming a group of biscuits at a single operation; delivery means; a carrier including biscuit receiving means to receive biscuits from the delivery means; means for causing a receiving means to take a plurality of said groups of biscuits plus some biscuits of another group; and means for depositing the balance of said other group on another receiving means.

5. In a biscuit machine, the combination comprising biscuit forming means for forming a group of biscuits at a single operation; carrying means; and means for causing the carrying means to receive a selected number of biscuits from said group, and to move said selected biscuits out of their normal positions in relation to the other biscuits of the group, and then to receive the remaining biscuits of the group.

6. In a biscuit machine, the combination comprising biscuit forming means for forming a group of biscuits at a single operation, each group comprising a plurality of biscuit rows; carrying means for receiving biscuits on successive pans; and means for depositing upon the pans all the biscuits produced by the biscuit forming means, while depositing upon one pan a number of biscuits different from a multiple of the number of rows in one of said groups.

7. In a biscuit machine, the combination comprising biscuit forming means for forming a group of biscuits at a single operation, each group comprising a plurality of rows of biscuits; a pan; and mechanism for depositing upon said pan a number of said rows different from a multiple of the number of rows in the group.

8. In a machine of the character described, a speed adjusting drum for a scrap carrier comprising in combination a hollow drum shaft having opposed spiders slidable thereon, a plurality of bars supported by said spiders to be radially adjustable,—said bars and spiders having inclined cam surfaces whereby said bars may be adjusted radially by varying the distance between said spiders; and means operating within said shaft for adjusting said spiders longitudinally of the shaft to effect such radial adjustment of the bars.

9. In a machine of the character described, a scrap carrier speed adjusting drum comprising in combination a hollow shaft having spiders slidably mounted thereon and having nuts controlled by an oppositely pitched screw shaft located inside said hollow shaft,—whereby said spiders may be simultaneously adjusted along said shaft; and carrier engaging bars mounted on said spiders to be radially adjustable and having inclined cam surfaces engaging said spiders, whereby they may be adjusted radially by longitudinal adjustment of said spiders on said shaft.

10. In a machine of the character described, a scrap separator comprising in combination an endless apron, an expansible driving drum about which said apron runs, a frame for maintaining said apron in extended position, and means for resiliently mounting said frame whereby said apron is automatically maintained in taut condition and slack is supplied or taken in to accommodate variations in drum diameter.

11. In a machine of the character described, a scrap separator comprising in combination an endless apron, an expansible driving drum about which said apron runs for driving said apron at variable speeds, a frame for maintaining said apron in extended position, and means including a spring for extending said frame against said apron to maintain the latter yieldingly in taut condition.

12. In a machine of the character described, a scrap separator comprising in combination an endless apron, a driving drum about which said apron runs, a frame for maintaining said apron in extended position, a pivoted link supporting one end of said frame, and a torsion spring associated with said link to extend said frame against said apron to maintain the latter yieldingly in taut condition.

13. In a machine of the character described, a scrap separator comprising in combination an endless scrap apron, an expansible driving drum about which said apron runs, a frame for maintaining said apron in extended position and about which said apron runs, a pivoted link for supporting one end of said frame and a torsion spring associated with said link to extend said frame against said apron and to permit the frame to yield responsively to apron tension.

14. In a machine of the character described, a carrier driving drum comprising in combination a driving drum shaft, a plurality of eccentrically mounted carrier engaging members, and means for adjusting said members to vary the effective drum diameter.

15. In a machine of the character described, a carrier driving drum comprising in combination a driving drum shaft having a plurality of eccentrically mounted carrier engaging rods, and means for rotating said rods about their eccentric mountings to vary the effective drum diameter.

16. In a machine of the character described, an adjustable carrier driving drum comprising in combination a drum shaft, a plurality of carrier engaging rods rotatably supported in bearings about said shaft,—said rods being constructed and arranged to be eccentric of their bearings; pinions on said rods adjacent said bearings, and a master gear meshing with said pinions for rotating the latter, whereby said rods may be rotated to adjust the effective diameter of said driving drum.

17. In a machine of the character described, an expansible apron driving drum comprising in combination a drum driving shaft having a plurality of apron engaging bars mounted in bearings about said shaft,—said rods being constructed and arranged to be eccentric of their bearings; pinions on the bearing ends of said rods meshing with a gear freely rotatable on said shaft, and an adjusting handwheel freely rotatable on said shaft for rotating said gear to adjust said bars.

18. In a machine of the character described, an expansible apron driving drum comprising in combination a drum driving shaft having a plurality of apron engaging bars mounted in bearings about said shaft,—said rods being constructed and arranged to be eccentric of their bearings; means including a gear for simultaneously rotating said bars; and an adjustable handwheel on said shaft and having intermeshing pinions associated therewith for rotating said gear.

19. In a machine of the character described an expansible apron driving drum comprising in combination a drum driving shaft having a plurality of apron engaging bars mounted in bearings about said shaft,—said rods being constructed and arranged to be eccentric of their bearings; pinions on said rods meshing with a gear freely rotatable on said shaft; an adjustable handwheel on said shaft and having a pinion thereon meshing with said gear through connecting gears mounted in a bearing fixed on said shaft, whereby a rotation of said handwheel serves to rotate said bars simultaneously to adjust the effective diameter of said drum; and means for locking said handwheel against rotation relative to said shaft to maintain the adjustment of said drum diameter.

20. In a machine of the character described, an expansible apron driving drum comprising in combination a drum shaft having a gear freely rotatable thereon; an adjusting handwheel on said shaft and slidable longitudinally thereof, a pinion on said handwheel meshing with a pinion mounted in a bearing fixed on said shaft for rotating said gear, and a locking dog on said fixed bearing arranged to engage the pinion on said handwheel to prevent relative rotation between said handwheel and shaft.

21. In a machine of the character described, an expansible apron driving drum comprising in combination a drum shaft having a gear freely rotatable thereon; an adjusting handwheel free on said shaft and slidable longitudinally thereof, a pinion on said handwheel meshing with a pinion mounted in a bearing fixed on said shaft for rotating said gear; a locking dog on said fixed bearing arranged to engage the pinion on said handwheel to prevent relative rotation between said handwheel and shaft,—said handwheel being free to rotate when pulled longitudinally of said shaft to clear said dog.

22. In a machine of the character described, the combination comprising a relatively long canvas apron, an expansible drum about which said apron runs for driving said apron; and means for adjusting the diameter of said drum to vary the speed of said apron,—said apron being constructed and arranged to stretch sufficient to compensate for variations in drum diameter.

23. In a machine of the character described, the combination comprising a delivery carrier, a receiving carrier for receiving articles from said delivery carrier, a driving shaft for driving said receiving carrier, a differential for adjusting the speed of said receiving carrier,—said differential comprising a pair of spur gears, one fixed on said shaft and one freely rotatable thereof; and a pair of intermeshing pinions meshed with said gears for transmitting drive from said shaft to said receiving carrier.

24. In a machine of the character described, the combination comprising a receiving carrier; a driving shaft therefor, and means for effecting speed adjustments of said carrier independently of said shaft, comprising a pair of spur gears, one fixed on said shaft and the other free thereon and a pair of intermeshing pinions meshing with said gears to transmit movement from said shaft to said receiving carrier and whereby the carrier speed may be adjusted independently of said shaft.

25. In a machine of the character described, a carrier speed adjusting differential comprising in combination, a driving shaft having a pair of spur gears mounted thereon, one of said gears being fixed to said shaft; a differential housing surrounding said gears and carrying a pair of intermeshing pinions, one of said pinions being constructed and arranged to mesh with one of said gears and the other pinion with the other gear; and means for adjusting the differential housing to effect a speed adjustment of said carrier independently of said driving shaft.

26. In a machine of the character described, the combination comprising a delivery carrier having an alternately advancing and retreating delivery point for periodically depositing batches of articles; a receiving carrier for receiving said periodically deposited batches; a driving shaft for driving said receiving carrier; a cam operating synchronously with said shaft for reciprocating said delivery point; and a differential interposed between said shaft and said receiving carrier, whereby periodical adjustments of receiving carrier speed may be made in accordance with the periodic deposit of batches from said delivery carrier.

27. In a machine of the character described, the combination comprising a delivery carrier having an alternately advancing and retreating delivery point for periodically depositing batches of articles, a receiving carrier for receiving said periodically deposited batches, a driving shaft for driving said receiving carrier, and having a cam mounted thereon for operating said delivery point, a differential interposed between said shaft and said receiving carrier transmitting drive thereto, and means operated by said cam for oscillating said differential to effect periodic variations in speed of said receiving carrier.

28. In a biscuit machine, the combination comprising biscuit forming means for forming a group of biscuits at a single operation; delivery means; a receiving carrier for receiving biscuits from said delivery means; means for operating the carrier means to receive a predetermined number of said groups of biscuits; and means for causing the carrier means to receive said predetermined number of groups plus or minus some of the biscuits comprised in a group.

29. In a biscuit machine, the combination comprising biscuit forming means for forming a group of biscuits at a single operation; delivery means; and carrying means comprising means for mechanically selecting some of the biscuits of a group to be received separately from the remaining biscuits of the group.

30. In a biscuit machine, the combination comprising means for forming a group of biscuits at a single operation, biscuit delivery means; a carrier having biscuit receiving surfaces to receive groups of biscuits from said delivery means; and means for relatively adjusting said carrier and said delivery means to fill available space on said receiving surfaces, by depositing a portion of a given group of biscuits on one receiving surface and the balance of that group on a following receiving surface.

31. In a machine of the character described, the combination comprising a receiving carrier, driving means therefor, a differential interposed between said driving means and said carrier for periodically producing a speed variation of said carrier, and means for making an unlimited manual adjustment of said differential to effect speed adjustment of said receiving carrier.

32. In a machine of the character described, the combination comprising a receiving carrier, driving means therefor, a differential interposed between said driving means and said carrier for transmitting drive thereto, and means for rotating said differential an unlimited amount in either direction to effect speed adjustments of said carrier relative to said driving means.

33. A machine of the character described, comprising in combination a delivery carrier having an alternately advancing and retreating delivery point for periodically depositing batches of articles, a receiving carrier for receiving said deposited batches, a differential associated with said receiving carrier and constructed and arranged to be oscillated to effect periodic speed adjustments of said receiving carrier, a reciprocating arm for operating said delivery point, and a link connected therewith for oscillating said differential to effect said speed adjustments.

34. A machine of the character described, comprising in combination a delivery carrier having an alternately advancing and retreating delivery point for periodically depositing batches of articles, a receiving carrier for receiving said deposited batches, a differential associated with said receiving carrier and constructed and arranged to be oscillated to effect periodic speed adjustments of said receiving carrier, a cam for alternately advancing and retreating said delivery point, and a rocking arm oscillated by said cam for oscillating said differential to effect said periodic speed adjustments.

35. In a machine of the character described, the combination comprising a receiving carrier, an oscillating differential associated with said carrier, and constructed and arranged to vary the speed of said carrier, a rocking arm for oscillating said differential to effect such speed variations, and means for varying the effective radius of said rocking arm to vary the degree of speed variations.

36. In a machine of the character described, the combinations comprising a carrier, driving means therefor including an oscillating differential for adjusting the travel of said carrier in accordance with the oscillations of the differential, a rocking arm for oscillating said differential, and means connecting said rocking arm with said differential, to permit said differential to be actuated to effect unlimited adjustments of said carrier independently of said rocking arm and without mechanically disconnecting said driving means from said carrier.

37. In a machine of the character described, the combination comprising a carrier, driving means therefor including an oscillating differential for periodically adjusting the travel of said carrier in accordance with the oscillations of the differential, a rocking arm for oscillating said differential, and means for adjusting the connection of said differential with said rocking arm to change the phase of the adjustments of said carrier travel with respect to said rocking arm.

38. In a machine of the character described, the combination comprising a carrier, driving means therefor including an oscillating differential to cause said carrier to travel at alternating different speeds, a rocking arm for rocking said differential and means for changing the connection of said differential with said rocking arm to change the phase of the speed alternations of said carrier.

39. In a machine of the character described, the combination comprising a carrier, driving means therefor including an oscillating differential for periodically adjusting the travel of said carrier, and means including a gear on said differential for manually rotating said differential to effect manual adjustment in the travel of said carrier.

40. In a machine of the character described, the combination comprising a carrier, driving means therefor including an oscillating differential for periodically adjusting the travel of said carrier, means for oscillating said differential to produce such periodic speed adjustments, and means including a gear on said differential for rotating said differential independently of said oscillating means to produce independent adjustments of said carrier.

41. In a machine of the character described, the combination comprising a carrier, driving means therefor including an oscillating differential for cyclically adjusting the speed of said carrier, a pivoted rocking arm extending in opposite directions beyond its pivot point for rocking said differential, and means for connecting said differential at selected points along said rocking arm to change both the degree and phase of said speed adjustments.

42. In a machine of the character described, the combination comprising a carrier, driving means therefor including an oscillating differential for periodically adjusting the speed of said carrier, a rocking arm for rocking said differential to produce said speed adjustments, means for connecting said differential along selected points of said rocking arm, said rocking arm being constructed and arranged to permit adjustments in said connection without shifting said differential.

43. In a machine of the character described, the combination comprising a carrier, driving means therefor including an oscillating differential for periodically adjusting the speed of said carrier, a curved rocking arm for rocking said differential, a link connecting said arm with said differential, and means for adjusting the connection of said arm of said link with said arm during the operation of said machine.

44. In a machine of the character described, the combination comprising a carrier, driving means therefor including an oscillating differential for periodically adjusting the speed of said carrier, an oscillating arm for operating said differential, a link for connecting said differential with said arm, and means including a rack on said arm whereby the connection of said link therewith may be adjusted.

45. In a machine of the character described, the combination comprising a carrier, driving means therefor including an oscillating differential for periodically adjusting the speed of said carrier, an oscillating arm for operating said differential, a link for connecting said differential with said arm, said link having a pinion meshing with a rack on said arm whereby said link may be adjusted along said arm to vary the degree of oscillation of said differential.

46. In a machine of the character described, the combination comprising a delivery carrier constructed and arranged periodically to deposit batches of articles, a receiving carrier having receiving means for receiving the deposited batches, driving mechanism for said carrier including a differential for cyclically adjusting said carrier to register said receiving means with the deposited batches, and means for adjusting said differential to vary the phase of the speed adjustments of said receiving carrier with respect to the periodically depositing delivery carrier.

47. In a machine of the character described, the combination comprising a delivery carrier constructed and arranged periodically to deposit batches of articles, a receiving carrier having receiving means for receiving the deposited batches, driving mechanism for said carrier including a differential for cyclically adjusting said carrier to register said receiving means with the deposited batches, and means for adjusting said differential to change both the degree and phase of speed adjustments of said receiving carrier with respect to the depositing operation of said delivery carrier.

48. In a machine of the character described, the combination comprising a delivery carrier constructed and arranged cyclically to deposit batches of articles, a receiving carrier having receiving means for receiving the deposited batches, driving mechanism for said carrier including means for periodically increasing and decreasing the speed of said driving mechanism to drive said carrier at alternately different speeds, and mechanism for changing the cooperation of said means and said driving mechanism to change the phase of the speed alternations of said driving mechanism.

49. In a machine of the character described, the combination comprising a carrier having a reciprocating delivery point for periodically depositing batches of articles, a carrier having receiving means for receiving said deposited batches, driving means including a shaft for driving said receiving carrier, said shaft having a cam thereon for reciprocating said delivery point, means including an oscillating differential on said shaft for periodically adjusting said carrier speed to register the receiving means with the deposited batches, and a rocking link oscillated from said cam for oscillating said differential.

50. In a machine of the character described, the combination comprising a reciprocating panner blade, a rocker arm for reciprocating said panner blade having an elongated slot therein for receiving a lug from said panner blade, a screw carried by said rocking arm and engaging said lug, and means for rotating said screw to adjust said panner blade with respect to said rocker arm.

51. In a machine of the character described, the combination comprising a carrier, driving means for driving said carrier at alternating different speeds including an oscillating differential, a rocking arm for rocking said differential connected thereto by a link, and means for adjusting the angularity of said rocking arm with respect to said link and differential, thereby to adjust the acceleration and deceleration in speed of said carrier between said alternating different speeds.

52. In a machine of the character described, the combination comprising a carrier, driving means therefor including an oscillating differential for driving said carrier at alternating different speeds, a rocking shaft having a rocking arm for rocking said differential, a link for connecting said rocking arm with said differential, oscillating means for rocking said shaft, and means for adjusting said rocking arm with respect to oscillating means to change the angularity of said rocking arm with respect to said link, thereby permitting an adjustment in the acceleration and deceleration of said carrier between alternating different speeds.

53. In a machine of the character described, the combination comprising a carrier; driving means including an oscillating device for causing said carrier to travel at alternating different speeds; and means including a path cam and its follower for positively rocking said oscillating device back and forth.

54. In a machine of the character described, the combination comprising a carrier, driving means therefor including an oscillating device for causing said carrier to travel at alternating different speeds, and means for positively oscillating said oscillating device back and forth including a path cam and its follower, a rocking arm connected to said oscillating device, and a link connecting said follower and arm.

55. In a machine of the character described, the combination comprising a delivery carrier constructed and arranged to deposit periodically batches of articles, a receiving carrier having receiving means for receiving said deposited batches, mechanism for driving said receiving carrier including oscillating means for driving said carrier at different speeds to register said receiving means with the deposited batches, a means including a path cam and its follower for positively oscillating said oscillating means in both directions to maintain said speed variations of said receiving carrier in step with the periodic deposits of said delivery carrier.

56. In a machine of the character described, the combination comprising a delivery carrier for delivering rows of articles, a receiving carrier having receiving means for receiving the delivered rows of articles, and selective devices for driving said receiving carrier relative to said delivery carrier at a rate to vary the number of rows of articles deposited thereon, and means for doubling the speed of said receiving carrier relative to said delivery carrier so that each receiving means on said carrier will receive only half a given adjusted number of rows.

57. In a machine of the character described, the combination comprising a delivery carrier for delivering rows of articles, a receiving carrier having receiving means for receiving said rows, and means including a series of gears selectively effective to drive said receiving carrier at a speed to vary the number of rows of articles on each receiving means, and means for doubling the speed of said receiving carrier obtained by any one of said gears, whereby each receiving means will receive only half the adjusted number of rows of articles permitted by the selected gear.

58. In a biscuit machine, the combination comprising a delivery carrier, biscuit forming means for forming staggered rows of biscuits on said carrier, a carrier having receiving means for receiving rows of biscuits from said delivery carrier, means for adjusting the speed of said receiving carrier to vary the number of staggered rows on each receiving means, and means for adjusting the speed of the receiving carrier whereby half of a staggered row will be deposited on one receiving means and the other half will be deposited on the succeeding receiving means.

59. In a biscuit machine, the combination comprising a delivery carrier, biscuit forming means for forming staggered rows of biscuits on said carrier, a receiving carrier having means for receiving rows from said delivery carrier, means for varying the relative speed of receiving carrier to vary the number of whole rows of biscuits placed on said receiving means, and means for doubling the adjusted speed of said receiving carrier relative to said delivery carrier, so that each receiving means will receive only half of the number of staggered rows for which said carrier speed was adjusted by said speed varying means.

60. In a biscuit machine, the combination comprising forming means for forming a plurality of double rows or staggered rows of biscuits, a delivery carrier for delivering rows of biscuits, a receiving carrier having receiving means for receiving rows of biscuits, means including a series of gears for adjusting the speed of said receiving carrier relative to said delivery carrier to receive a predetermined number of rows, and means for changing said receiving carrier speed whereby only a fractional part of the predetermined number of rows is deposited on each receiving means.

61. In a biscuit machine, in combination with means for forming a plurality of double or single staggered rows of biscuits, a delivery carrier for delivering rows of biscuits, a receiving carrier having receiving means for receiving rows of biscuits, means including a series of gears for adjusting the speed of said receiving carrier relative to said delivery carrier to receive a predetermined number of rows, and means for doubling the speed of said series of gears, whereby the number of rows on each receiving means will include either half of a double row or one-half of a staggered row of biscuits.

62. In a biscuit machine, the combination with a receiving carrier having means for receiving rows of biscuits, of a series of gears, means for enclosing said gears to exclude dust, each gear calculated to drive said carrier at a speed to receive a predetermined number of rows of biscuits, a shaft having a tumbler gear slidable relative thereto and arranged to be adjusted to mesh with any of said gear series, and mechanism controlled from the exterior of said enclosure for mechanically moving said tumbler gear along said shaft so that it may be placed in mesh with any selected gear.

63. In a biscuit machine, the combination with a receiving carrier having means for receiving successive rows of biscuits, of a series of gears, means for enclosing said gears to exclude dust, each gear calculated to drive said carrier at a speed to receive a predetermined number of rows of biscuits, a shaft having a gear splined thereto meshing with a tumbler gear pivotally supported with respect to said shaft and arranged to be placed in mesh with any of said gear series, and mechanism controlled from the exterior of said enclosure for mechanically moving said tumbler gear along said gear series to mesh with any selected gear.

64. In a biscuit machine, the combination with a receiving carrier having means for receiving rows of biscuits, of a series of co-axial gears, each gear calculated to drive said carrier at a speed to receive a predetermined number of rows of biscuits, a shaft having a gear splined thereto meshing with a tumbler gear pivotally supported with respect to said shaft and arranged to be placed in mesh with any of said gear series, and means including a screw shaft for shifting said tumbler gear longitudinally of said gear series.

65. In a biscuit machine, the combination with a receiving carrier having means for receiving rows of biscuits, of a series of gears, each gear calculated to drive said carrier at a speed to receive a predetermined number of rows of biscuits, a shiftable tumbler gear constructed and arranged to mesh with any of said gear series and a screw for shifting said tumbler gear along said gear series and having a dial associated therewith to indicate the position of said tumbler gear with respect to said gear series.

66. In a biscuit machine, the combination with a receiving carrier having means for receiving rows of biscuits, of a series of gears, each gear calculated to drive said carrier at a speed to receive a predetermined number of rows of biscuits, a shiftable tumbler gear constructed and arranged to mesh with any of said gear series, means for raising and holding said tumbler gear out of mesh with any of said gear series to permit said tumbler to be shifted, and means for indicating the position of said tumbler with respect to said gear series.

67. In a biscuit machine, the combination with a receiving carrier having means for receiving rows of biscuits, of a series of gears, each gear calculated to drive said carrier at a speed to receive a predetermined number of rows of biscuits, a shiftable tumbler gear constructed and arranged to mesh with any of said gear series, and means for raising and holding said tumbler gear out of mesh with any of said gear series to permit said tumbler to be shifted, an indicator for indicating the position of said tumbler with respect to said gear series, and means for rendering said indicator inoperative until said tumbler has been raised clear of said gear series.

68. In a biscuit machine, the combination with a receiving carrier having means for receiving rows of biscuits, of a series of gears, each gear calculated to drive said carrier at a speed to receive a predetermined number of rows of biscuits, a shiftable tumbler gear constructed and arranged to mesh with any of said gear series, and means including a pinion for raising said tumbler clear of said gear series and holding the same to permit adjustment relative to said gear series.

69. In a biscuit machine, the combination with a receiving carrier having means for receiving rows of biscuits, of a series of gears, a shiftable slidable tumbler gear constructed and arranged to mesh with any of said gear series, and means for moving said tumbler clear of said gear series to permit shifting thereof, an indicating dial for indicating the position of said tumbler with respect to said gear series, said moving means being constructed and arranged to render said dial inoperative until said tumbler has been raised clear of said gear series.

70. In a biscuit machine, the combination with a receiving carrier having means for receiving rows of biscuits, of a series of gears, each gear calculated to drive said carrier at a speed to receive a predetermined number of rows of biscuits, an adjustable slidable tumbler gear constructed and arranged to mesh with any of said gear series, a dial having a series of numbers thereon for indicating the relative speed of said receiving carrier, said tumbler elevating means having a device with a slot therein adjacent said indicating dial, to cooperate with said dial and indicate the relative carrier speed.

71. In a biscuit machine, the combination comprising a delivery carrier for delivering rows of biscuits, a receiving carrier having receiving means for receiving rows of biscuits, means including a series of gears to drive said receiving carrier at different speeds to vary the number of rows of biscuits on said receiving means, means for producing a two-to-one variation in the speed of said gear series, thereby producing a two-to-one variation in the number of rows of biscuits for a given adjustment of said gear series, a dial having two rows of numbers indicating the number of rows on each receiving surface, and a device for indicating relative to said rows of numbers the adjustment of said two-to-one variation means.

72. In a biscuit machine, the combination comprising a delivery carrier for delivering rows of biscuits, a receiving carrier having receiving means for receiving said rows of biscuits, means for permitting the variation of the relative receiving carrier speed to vary the number of rows of biscuits on each receiving means, driving means for said speed varying means, an indicating dial for indicating the carrier speed adjustment, a device for disconnecting said driving means to permit adjustment of the speed varying means, and a disc having a notch therein adapted to register with said indicating dial only when said driving means are disconnected to indicate the carrier speed adjustment, said disc being rotatable to carry said notch out of register with said dial when said driving means are connected, thereby rendering said indicating dial inoperative.

73. In a biscuit machine, the combination comprising a delivery carrier for delivering rows of biscuits, a receiving carrier having receiving means for receiving said rows of biscuits, means including a series of gears for adjusting said receiving carrier to vary the number of rows of biscuits on each receiving means, a driving gear arranged to be meshed with any of said gear series, indicating means comprising a dial and a plate having a registering notch for indicating the adjustment of said driving gear, means for raising said driving gear out of mesh with said gear series to permit adjustment thereof, said means being associated with said dial and notch whereby said notch only registers with said dial when said driving gear is out of mesh, thereby rendering said indicating device inoperative, unless said driving gear is out of mesh.

74. In a biscuit machine, the combination comprising a delivery carrier for delivering rows of biscuits, a receiving carrier having receiving means for receiving said rows of biscuits, means including a series of gears for adjusting said receiving carrier to vary the number of rows of biscuits on each receiving means, a pair of driving gears constructed and arranged to be selectively meshed to drive said gear series, said gears producing a two-to-one variation in the speed of said gear series, and means for indicating which of said driving gears is in operation.

75. In a biscuit machine, the combination comprising a delivery carrier for delivering rows of biscuits, a receiving carrier having receiving means for receiving said rows of biscuits, means including a series of gears for adjusting said receiving carrier to vary the number of rows of biscuits on each receiving means, a pair of driving gears constructed and arranged to be selectively meshed to drive said gear series at different speeds or to be adjusted to neutral position to render said gear series idle.

76. In a biscuit machine, the combination comprising a delivery carrier for delivering rows of biscuits, a receiving carrier having receiving means for receiving said rows of biscuits, means for adjusting the speed of said receiving carrier to vary the number of rows of biscuits on each receiving means, a pair of driving gears constructed and arranged to be selectively meshed to drive said gear series at different speeds or to be adjusted to neutral position to render said gear series idle.

77. In a biscuit machine, the combination comprising a delivery carrier for delivering rows of biscuits, a receiving carrier having receiving means for receiving said rows of biscuits, means for adjusting the speed of said receiving carrier to vary the number of rows of biscuits on each receiving means, and a plurality of driving gears adapted to be selectively meshed to vary the speed of said gear series to increase the range of the receiving carrier adjustment.

78. In a biscuit machine, the combination comprising a delivery carrier for delivering rows of biscuits, a receiving carrier having receiving means for receiving said rows of biscuits, means including a series of gears for adjusting the speed of said receiving carrier to vary the number of rows of biscuits on each receiving means, a plurality of driving gears adapted to be selectively meshed with said gear series to vary the speed of the latter, said driving gears being arranged to be adjusted to neutral position to render said receiving carrier idle and having indicating means for indicating the adjustment thereof.

79. In a biscuit machine, the combination comprising a delivery carrier for delivering rows of biscuits, a receiving carrier having receiving means for receiving said rows of biscuits, means including a series of gears for adjusting the speed of said receiving carrier to vary the number of rows of biscuits on each receiving means, an indicating device for indicating the speed adjustment of said gear series, a plurality of driving gears adapted to be selectively meshed with said gear series to vary the speed of the latter, said driving gears being arranged to be adjusted to neutral position to render said receiving carrier idle, and having indicating means for indicating the adjustment thereof, said indicating means cooperating with said indicating device to indicate the number of rows of biscuits to be placed on each receiving means and to indicate when said gears are in neutral position.

80. In a biscuit machine, a mechanism for varying the number of rows of biscuits for each pan, comprising in combination a series of gears for varying pan speed, a driving tumbler gear constructed and arranged to mesh with any of said gear series, means for raising said tumbler gear out of mesh to permit adjustment thereof, ratchet means for preventing said tumbler gear from coming out of mesh during the transmission of drive, said ratchet means being constructed and arranged to permit said tumbler gear to creep farther into mesh with the selected gear in the gear series.

81. In a biscuit machine, pan carrier driving mechanism comprising in combination a pair of gears mounted on a slidable shaft, and constructed and arranged to be selectively meshed to drive said pan carrier, or to be placed in neutral position to render said pan carrier idle, a positioning collar on said shaft, a pivoted device having a series of collar receiving grooves of varying depth for holding said collar in adjusted position, said grooves being constructed and arranged to cause said pivoted device to assume different collar adjustment positions to indicate the speed adjustment of said driving gears.

82. In a biscuit machine, pan carrier driving mechanism comprising in combination a pair of gears mounted on a slidable shaft, and constructed and arranged to be selectively meshed to drive said pan carrier, a positioning collar on said shaft, a pivoted device having means for holding said collar in various adjusted positions, and means cooperating with said pivoted device for indicating the adjustment of said gears.

83. In a biscuit machine, the combination comprising a pan carrier chain having pan driving lugs, a pivoted device for supporting one end of a pan adjacent said carrier to hold said pan against movement on said carrier, and means projecting from said pivoted device to be engaged by a preceding pan driving lug to cause said device to drop the pan into proper position on said carrier.

84. In a biscuit machine, the combination comprising biscuit forming means for forming biscuits from a sheet of dough, a carrier for carrying formed biscuits, scrap separating means for lifting the sheet of scrap from the carrier to separate it from the formed biscuits on said carrier, and means for restoring scrap separation in the event of breakage of the scrap.

85. In a biscuit machine, the combination comprising biscuit forming means for forming separated biscuits from sheet dough on a traveling carrier, a scrap carrier above said traveling carrier and having an end adjacent said traveling carrier upon which the sheet of scrap is fed, said scrap carrier being adapted to lift the scrap above the traveling carrier to separate the scrap from the biscuit on said traveling carrier, and means for restoring the feeding of scrap to said scrap carrier in the event of breakage of the scrap sheet and without stopping the formation of biscuits.

86. In a machine of the character described, the combination comprising an apron having a panner blade associated therewith for delivering articles carried on said apron, and a pivoted arm connected with and cooperating to support said panner blade, for advancing and retreating said panner blade.

87. In a machine of the character described, the combination comprising an apron having a panner blade associated therewith for delivering articles carried on said apron, a pivoted arm connected with and cooperating to support said panner blade, and a reciprocating arm connected with said pivoted arm for alternately advancing and retreating said panner blade.

88. In a machine of the character described, the combination comprising a panner blade mounted for advancing and retreating movement, a cam connected with said panner blade for alternately advancing and retreating said panner blade, said cam being constructed and arranged to retreat said panner blade at a speed different from its advancing speed.

89. In a machine of the character described, the combination comprising a panner blade mounted to oscillate back and forth, a cam connected with said panner blade for oscillating the same, said cam being constructed and arranged to consume a greater proportion of the cycle of operation of the panner blade during its movement in one direction, than is consumed in its movement in the other direction.

90. In a machine of the character described, the combination comprising a panner blade mounted to oscillate back and forth, a cam connected with said panner blade for oscillating the same, said cam being constructed and arranged to retreat said panner blade at a substantially slower speed than its speed in the opposite direction.

91. In a machine of the character described, the combination comprising an apron constructed and arranged to provide a delivery point, a swinging arm connected with and cooperating to support said delivery point whereby the latter may be alternately advanced and retreated, and means for adjusting the amplitude of swing of said arm.

92. In a machine of the character described, the combination comprising an apron constructed and arranged to provide a delivery point, a swinging arm connected with and cooperating to support said delivery point, whereby the latter may be alternately advanced and retreated, and means for varying the advancing speed of said delivery point.

93. In a machine of the character described, the combination comprising an apron having an advancing and retreating delivery point for periodically depositing batches of materials from said apron, a swinging arm connected with and cooperating to support said delivery point whereby the latter may be advanced and retreated, a reciprocating arm connected with said swinging arm and means for adjusting the connection of said reciprocating arm with said swinging arm, whereby the amplitude of swing of said arm may be varied.

94. In a machine of the character described, the combination comprising an apron having an advancing and retreating delivery point for periodically depositing batches of materials from said apron, a swinging arm connected with said delivery point, whereby the latter may be advanced and retreated, and means for varying the amplitude of swing of the delivery point relative to the apron speed.

95. In a machine of the character described, the combination comprising an apron having an advancing and retreating delivery point for periodically depositing batches of materials from said apron, a swinging arm pivoted to said delivery point whereby the latter may be advanced and retreated, a rocking arm connected with said swinging arm to oscillate the latter back and forth, and means for varying the length of said rocking arm whereby to vary the amplitude of swing of said swinging arm.

96. In a machine of the character described, the combination comprising an apron having an alternately advancing and retreating delivery point, a swinging arm connected therewith for alternately advancing and retreating said delivery point, a rock shaft having an adjustable rocking arm slidably connected with said swinging arm for swinging the latter, and a screw for adjusting the effective length of said rocking arm whereby to vary the amplitude of movement of said delivery point relative to the apron speed.

97. In a machine of the character described, the combination comprising an apron having a delivery point, a swinging arm connected therewith for alternately advancing and retreating said delivery point, a rock shaft having an adjustable rocking arm slidably connected with said swinging arm for swinging the latter, a screw for adjusting the effective length of said rocking arm whereby to vary the amplitude of movement of said delivery point relative to the apron speed, said screw being provided with an operating device whereby adjustments thereof may be made during the operation of said machine.

98. In a machine of the character described, the combination comprising an apron having an alternately advancing and retreating delivery point, a swinging arm connected therewith for alternately advancing and retreating said delivery point, a rock shaft having an adjustable rocking arm slidably connected with said swinging arm for swinging the latter, a screw provided with an operating shaft for varying length of said rocking arm to vary the amplitude of swing of said swinging arm, said shaft being provided with a lost motion connection with said screw whereby the rocking of said rocking arm is not transmitted to said shaft.

99. In a machine of the character described, the combination comprising an apron provided with an alternately advancing and retreating delivery point for periodically depositing articles from said apron, a pivoted arm for supporting said delivery point for alternate advancing and retreating movement, and means directly connected with said arm for increasing or decreasing the advancing speed of said delivery point.

100. In a machine of the character described, the combination comprising an apron provided with an alternately advancing and retreating delivery point for periodically depositing articles from said apron, a device for supporting said delivery point for alternate advancing and retreating movement, and means directly connected with said device for actuating said device and for varying the amplitude of travel of said delivery point during its advancing and retreating movement relative to the apron speed.

101. In a machine of the character described, the combination comprising a traveling apron having an alternately advancing and retreating delivery point, for periodically delivering batches of articles carried thereon, a device for supporting said delivery point for alternate advancing and retreating movement, an oscillating member connected with said device to actuate the latter so to move said delivery point, and means for adjusting the connection of said device with said member to vary the amplitude of travel of said delivery point.

102. In a machine of the character described, the combination comprising a traveling apron having an alternately advancing and retreating delivery point for periodically delivering batches of articles carried thereon, a device for supporting said delivery point for alternate advancing and retreating movement, a swinging arm directly connected with said device to actuate said device to give said movement to said delivery point, and means for adjusting said swinging arm to vary the advancing speed of said delivery point.

103. In a machine of the character described, the combination comprising a traveling apron having an alternately advancing and retreating delivery point for periodically delivering batches of articles carried thereon, a device for supporting said delivery point for alternate advancing and retreating movement, an oscillating member having a fixed amplitude of oscillation and located with said device for actuating said delivery point, and means for adjusting the connection with said device to adjust the advancing speed of said delivery point.

104. In a machine of the character described, the combination comprising a traveling apron having an alternately advancing and retreating delivery point for periodically delivering batches of articles carried thereon, a pivoted device for supporting said delivery point for alternate advancing and retreating movement, a reciprocating member having a fixed amplitude of reciprocation connected with said device for actuating said delivery point, and means for adjusting the connection of said member with said device to vary the distance of said connection from the pivot of said device to adjust the advancing speed of said delivery point.

105. In a machine of the character described, the combination comprising a continuously traveling apron, a device for forming plastic articles on said apron, an advancing and retreating panner blade about which said apron runs for delivering articles from said apron, and constructed and arranged to travel forward substantially at apron speed, means for causing said apron to creep around said panner blade during the forward travel thereof to maintain substantially uniform tension in the upper flight of the apron.

106. In a machine of the character described, the combination comprising continuously traveling apron, a device for forming plastic articles on said apron, an advancing and retreating panner blade about which said apron runs for delivering articles from said apron, and means for maintaining a substantially uniform tension in the upper flight of the apron during the oscillations of the panner blade.

107. In a machine of the character described, the combination comprising continuously traveling apron, a device for forming plastic articles on said apron, an advancing and retreating panner blade about which said apron runs for delivering articles from said apron, and means for preventing a momentarily slackening of tension in the upper flight of the apron upon the retreating movement of the panner blade.

108. In a machine of the character described, the combination comprising an apron constructed and arranged to provide an alternately advancing and retreating delivery point for periodically delivering batches of articles from said apron, a carrier having receiving means for receiving said periodically delivered batches from said apron, a cam gear for coordinately actuating said delivery point and carrier, the cam of said gear being operative to oscillate said delivery point, and said gear being operative to drive said carrier, said cam gear being constructed and arranged to present a receiving means to receive a batch from said delivery point for each retreating movement thereof.

109. In a machine of the character described, the combination comprising article forming means including means for delivering batches of formed articles, a carrier having receiving means each constructed and arranged to receive a batch of the formed articles, and means for driving said carrier at a rate to present a receiving means for each batch, said driving means being replaceable by other similar means for receiving means of different lengths so that the carrier drive may be adjusted in accordance with the length of the receiving means.

110. In a machine of the character described, the combination comprising means for forming articles from a sheet of plastic materials and delivering batches of the formed articles, a pan carrier having pans for receiving the batches of articles, and driving means for advancing said carrier at a rate to receive a batch of articles on each pan, said driving means being replaceable by other similar driving means designed for pans of different lengths so that the carrier drive may be adjusted in accordance with the lengths of pans used on said carrier.

111. In a machine of the character described, the combination comprising means for forming articles from a sheet of plastic materials and delivering batches of the formed articles, a pan carrier having pans for receiving the batches of articles, a driving means including a sprocket for advancing pan carrier through successive pan lengths during the deposit of successive batches of articles, said driving sprocket having attaching means which permit it to be readily removed and replaced by a similar sprocket designed to advance the carrier a distance to accommodate a different length of pan.

112. In a machine of the character described, the combination comprising a traveling apron for periodically depositing batches of articles carried thereon, a carrier having pans thereon for receiving successive batches of articles, driving means including a removable sprocket for advancing said pan carrier through one pan length for each period of deposit, said driving means being constructed and arranged to receive a sprocket of different diameter whereby to advance said pan carrier a different pan length for each period of deposit.

113. In a machine of the character described, the combination comprising a traveling apron constructed and arranged to be actuated periodically to deposit batches of articles carried thereon, a pan carrier having pans thereon for receiving successive batches of articles, a single driving element for effecting said periodic deposits and for advancing said pan carrier, said driving means being constructed and arranged whereby during the successive cycles of operations thereof the apron is successively actuated to deposit batches of articles and the pan carrier is successively operated to present successive pan lengths coordinately with the actuation of said apron to receive successive batches of articles on successive pans, and means including a removable element for determining the amount of travel of said pan carrier for each cycle of said driving means, said removable element being replaceable by other similar elements designed to advance said pan carrier different distances for each cycle, whereby pans of different lengths may be employed.

114. In a machine of the character described, the combination comprising a traveling apron having an alternately advancing and retreating panner blade about which the apron runs for periodically depositing batches of articles carried by said apron, a pan carrier having pans for receiving successive batches of articles from said apron, a driving means including a cam gear for actuating said panner blade and pan carrier and constructed and arranged whereby successive cycles of operations of said cam gear operate said panner blade through successive cycles and advance said pan carrier coordinately therewith to present a pan for each cycle of operation of the panner blade.

115. In a biscuit machine, the combination comprising a swinging panner blade for periodically depositing batches of biscuits, a reciprocating arm for swinging said panner blade, a pan carrier having pans for receiving successive batches of biscuits, an oscillating differential for periodically adjusting the pan speed, a link connecting said differential with said reciprocating arm whereby the latter oscillates the differential to adjust the pan speed in synchronism with the movements of the panner blade.

116. In a biscuit machine having a reciprocating panner blade and a traveling pan carrier to receive batches of biscuits from said panner blade, the combination comprising a cam for periodically reciprocating said panner blade, a differential for periodically adjusting the pan speed in accordance with the movements of said panner blade and a link connected with said differential and actuated by said cam for oscillating the differential to adjust the pan speeds in synchronism with the movements of the panner blade.

117. In a machine of the character described, the combination comprising a pan carrier chain having spaced pan driving lugs thereon, an adjustable sprocket shaft about which said carrier runs, and means for adjusting the position of said shaft to accommodate variations in said pan carrier length comprising a link chain running about said adjustable shaft and about a fixed shaft, the links of said chain being removable to vary its length so as to adjust the position of said adjustable shaft in accordance with the length of said pan carrier.

118. In a biscuit machine, the combination with biscuit delivery means and a carrier having biscuit receiving means, of selective operating means for relatively operating said delivery means, and carrier to vary the number of biscuit on a receiving means, and means for varying the relative operating speed of said selective means whereby to amplify the effect of said selective means.

119. In a biscuit machine, the combination with biscuit delivery means and a carrier having biscuit receiving means, of means including a series of gears for selectively varying the number of biscuit deposited on a receiving means, and means for varying the relative speed of said series, whereby further to increase the possible variation in the number of biscuit deposited on a receiving means.

120. In a biscuit machine, the combination with mechanism for varying the number of rows of biscuit deposited on a pan, of indicating means for indicating the adjustment of said mechanism, and means for rendering said indicating means inoperative when said mechanism is not arranged for adjustment.

121. In a biscuit machine, the combination with mechanism for varying the number of rows of biscuit deposited on a pan, of means for temporarily disconnecting said mechanism to permit adjustment thereof, means for indicating automatically the adjustment of said mechanism, and means for rendering said indicating means ineffective whenever said mechanism is not disconnected for adjustment.

122. In a biscuit machine, the combination comprising a continuous, seamless dough apron, driving means therefor, a supporting surface for the upper run of said apron, means for forming biscuits on said apron, said driving means and supporting surface which lie "within" the upper and return runs of said apron being constructed and arranged to be removable transversely of the apron, whereby the seamless apron may be inserted in said machine.

123. In a biscuit machine, the combination comprising biscuit forming means for forming a group of biscuits in a single cycle of operation, delivery means for delivering a batch of biscuits at each cycle of operation, means for relatively adjusting said delivery and biscuit forming means whereby said delivery means delivers in a given batch a fractional number of groups of biscuits.

124. In a biscuit machine, the combination comprising a continuously traveling carrier for carrying formed biscuits, a reciprocating delivery device associated with said carrier for periodically delivering batches of biscuits, an oscillating prime mover having a fixed amplitude of oscillation for operating said delivery device and means for adjusting the operative connection of said prime mover independently of said carrier whereby to vary the operation of said delivery device.

125. In a biscuit machine, the combination comprising a reciprocating delivery device for periodically delivering batches of biscuits, a receiving carrier for receiving said batches having speed adjusting means which periodically adjust the speed of said receiving carrier, and an oscillating prime mover for reciprocating said delivery devices and for operating said speed adjusting means.

126. A biscuit machine comprising in combination a means for forming and panning batches of biscuits, mechanism for actuating the forming and panning means, closed frames surrounding said mechanism for excluding flour and dust therefrom, said means and mechanism being mounted in ball-bearings having lubricant receiving spaces such as to require only infrequent lubrication, said bearings being arranged for the supply of lubricant thereto from the exterior of said enclosing frames, whereby said machine may operate for long periods without replenishing the lubricant.

127. In a biscuit machine the combination comprising a traveling dough apron, means for forming biscuits on said apron, a scrap apron adjacent said dough apron for removing the scrap dough from the dough apron, a driving drum over which said scrap apron runs, and means for varying the diameter of said drum to vary the speed of the scrap apron relative to the speed of the dough apron.

128. In a biscuit machine the combination comprising a traveling dough apron, means for forming biscuits on said apron, a scrap apron adjacent said dough apron for removing the scrap dough from the dough apron, an expansible driving drum over which said apron runs, yielding supporting means for supporting said scrap apron in extended position, said means being constructed and arranged to contract or expand to supply or take in the scrap apron to compensate for variations in driving drum diameter, whereby the speed of the scrap apron may be varied relative to that of the dough apron while maintaining the scrap apron in properly extended position.

129. In a machine of the character described, the combination with a main apron, of a scrap separator adjacent thereto for separating scrap from said main apron including a scrap apron having a terminal adjacent said main apron for receiving scrap therefrom and arranged to deflect scrap only through a small angle during its removal, a scrap returning carrier traveling in a direction opposite to the travel of said scrap apron arranged to receive the scrap directly from the scrap apron and to return the scrap to the source of supply, and a revolving brush adapted to engage the lower side of the scrap as it leaves the scrap apron in the event of breakage of the scrap to restore the delivery of scrap from the scrap apron to the returning carrier.

130. In a machine of the character described, the combination with a main apron, of a scrap separator having a terminal adjacent said main apron for receiving scrap therefrom and arranged to deflect scrap only through a small angle during its removal, a scrap returning carrier traveling in a direction opposite to the travel of said scrap separator for returning scrap to the source of supply and having a terminal adjacent the scrap separator arranged to receive the scrap directly therefrom, and a revolving brush adapted to engage the lower face of the scrap as it leaves the scrap separator for maintaining the delivery of scrap from said scrap separator to said oppositely traveling scrap returning carrier.

131. In a biscuit machine the combination comprising an endless pan carrier adjustable in length to permit a change in pan length and having lugs thereon to serve as pan spacing and driving means, a shaft about which said carrier runs and adjustable in position as determined by the length of the pan carrier, and a blank carrier running over said shaft and upon which said pans are fed by said pan carrier, said blank carrier being adjustable in length as determined by the adjusted position of said shaft and serving to hold said shaft in said adjusted position against the tension of said pan carrier.

132. In a biscuit machine, the combination comprising biscuit forming means, dough apron driving means operating at a speed responsive to that of said forming means, a dough apron driven from said apron driving means, mechanism for varying the speed of said apron relative to said forming means, gauge rolls driven from said apron speed varying mechanism at a speed responsive to the speed adjustment of said apron, means for varying the speed of said gauge rolls relative to the speed of said apron, and variable speed driving means for driving said biscuit forming means.

133. In a biscuit machine, the combination comprising forming means, a dough apron, dough sheeting rolls, driving mechanisms therefor, and a single means for varying the apron and roll speed together relative to the speed of the forming means.

134. In a machine of the character described, the combination comprising a traveling carrier, a scrap carrier for separating scrap from said traveling carrier and having one terminal of said scrap carrier supported adjacent said traveling carrier and arranged relative thereto to pick up the scrap therefrom and carry the same away, and means for bringing said scrap carrier and traveling carrier momentarily into contact to start scrap separation.

135. In a machine of the character described, the combination comprising a traveling carrier, a scrap carrier for removing scrap from said traveling carrier and having one terminal of said scrap carrier supported in contact with said traveling carrier and arranged relative thereto to pick up the scrap therefrom and carry the same away, and means for thereafter separating said carrier as soon as the scrap has commenced traveling up said scrap carrier.

136. In a machine of the character described, the combination comprising a traveling apron for carrying a sheet of plastic material thereon, means for forming articles from said plastic sheet, a scrap apron constructed and arranged to pass in juxtaposition to said other apron, and means for bringing said aprons into substantial contact to initiate the delivery of scrap to said scrap carrier, said scrap apron moving in the direction of travel of said plastic material so that the latter leaves the traveling apron and passes to the scrap apron and means for separating said aprons after the scrap has commenced to travel on said scrap apron.

137. In a machine of the character described, the combination comprising a delivery carrier constructed and arranged periodically to deposit batches of articles, a receiving carrier having receiving means for receiving said deposited batches, an oscillating differential for periodically varying the speed of said receiving carrier between deposit of successive batches, means for rotating said differential to an unlimited extent for adjusting said receiving carrier relative to said delivery carrier and means for driving said receiving carrier.

138. In a biscuit machine, the combination comprising a delivery apron constructed and arranged periodically to deposit batches of biscuits, a pan carrier having pans to receive the deposited batches, an oscillating differential for periodically varying the pan speed in the intervals between the deposit of successive batches, and means for rotating said differential to an unlimited extent in either direction to register a pan wth a batch delivered thereto.

139. In a biscuit machine, the combination comprising a pan carrier, means for supporting a pan in position to be moved by said carrier, a pan dropper for supporting the forward edge of a pan above the carrier and adapted to release the pan at a predetermined point on the carrier, and means for adjusting said dropper longitudinally of the machine to accommodate pans of different lengths.

140. In a machine of the character described, the combination comprising a traveling dough apron, a panner blade over which said apron runs mounted alternately to advance and retreat, a cam associated with said panner blade for operating the same, said cam being constructed and arranged to move said panner blade through a complete cycle of movement for each revolution of said cam, and means for varying the speed of movement of said panner blade relative to the apron speed.

141. In a machine of the character described, the combination comprising a delivery carrier actuated to deliver periodically batches of articles carried thereby, a traveling pan carrier actuated to present successive pans to receive successive batches of articles, means for actuating said delivery carrier periodically to deposit batches of articles, means for periodically adjusting the speed of said pan carrier to adjust successive pans to receive batches of articles, a single coordinative means having the same cycle as that of the adjusting means and the batch delivery for controlling the delivery carrier actuations and the pan carrier speed adjustments, and means for connecting said controlling means with said delivery carrier depositing means and said pan carrier adjusting means in a predetermined relationship to maintain operative coordination thereof.

142. In a machine of the character described, the combination comprising an oscillating device for causing the periodic deposit of batches of articles, a pan carrier for presenting successive pans to receive successive batches of articles, means for periodically adjusting the pan speed to coordinate with the periodic deposit of articles, a single coordinating means for controlling the cycles of said oscillating device and pan speed adjusting means, and means for connecting said controlling means with said oscillating device and pan speed in a single invariable relationship to maintain the coordination of the cycles of said oscillating device and periodic pan carrier speed adjustment.

143. In a biscuit machine, the combination comprising an alternately advancing and retreating panner blade for periodically depositing batches of biscuits, a pan carrier having pans thereon for receiving the successive batches of biscuits, a reciprocating device connected with said panner blade for advancing and retreating the same, a device for periodically adjusting the pan speed in accordance with the periodic movements of said panner blade, and means connecting said pan carrier speed adjusting device with said reciprocating device so as to be actuated by the latter.

144. In a biscuit machine, the combination comprising a swinging panner blade for periodically depositing batches of biscuits, a reciprocating arm for swinging said panner blade, a pan carrier having pans for receiving successive batches of biscuits, a device for periodically adjusting the pan speeds to present successive pans in position to receive successive batches of biscuits, and link means directly connecting said device with said reciprocating arm whereby the latter actuates said device for periodic pan speed adjustment in coordination with the movements of the panner blade.

145. In a biscuit machine, the combination with biscuit delivery means and a carrier having means for receiving biscuits; of a series of gears each constructed and arranged for operating said carrier relative to said delivery means whereby a predetermined number of biscuits will be received on a receiving means; means including a shiftable gear for operatively engaging one of said series whereby the receiving means will receive a predetermined number of biscuits; means for mechanically shifting said shiftable gear; an enclosure for said gears and said mechanical shifting means, to exclude dust; and indicating means associated with said mechanical means by which said shiftable gear may be adjusted from the exterior of said enclosure and without reference to said gear series in accordance with the number of biscuits desired on said receiving means.

146. In a machine of the character described, the combination comprising an apron constructed and arranged to provide an alternately advancing and retreating delivery point for periodically delivering batches of articles from said apron, a carrier having receiving means for receiving said periodically delivered batches from said apron, means for moving said carrier at alternate different speeds in the same cycle as the reciprocation of the delivery point, a cam for controlling and coordinating the reciprocations of said delivery point and the periodic speed changes of said carrier.

147. In a machine of the character described, the combination comprising an apron constructed and arranged to provide an alternately advancing and retreating delivery point for periodically delivering batches of articles from said apron, a carrier having receiving means for receiving said periodically delivered batches from said apron, means for moving said carrier at alternate different speeds in the same cycle as the reciprocation of the delivery point, a rotary cam which for each revolution controls the reciprocation of said delivery point through one cycle and the speed changes of said carrier through one cycle.

148. In a machine of the character described the combination comprising a panner blade mounted for advancing and retreating movement for periodically delivering batches of articles, a carrier for receiving said batches, and means for advancing said panner blade at a different speed from its retreating speed.

149. In a machine of the character described, the combination comprising a panner blade mounted for advancing and retreating movement for periodically delivering batches of articles, a pan carrier for receiving said batches, means for moving said pan carrier at alternate different speeds synchronously with said panner blade reciprocations, and means for controlling the panner blade reciprocation and said carrier speed changes, said means being constructed and arranged to advance said panner blade at a different speed than its retreating speed.

150. In a biscuit machine the combination comprising a pan carrier, an advancing and retreating panner blade adapted to deliver a batch of biscuits to a pan on its retreating movements, and means for retreating said panner blade at a relatively low speed and advancing it at a higher speed.

151. In a machine of the character described, the combination comprising a panner blade mounted for advancing and retreating movement for periodically delivering batches of articles, a pan carrier for receiving said batches, means for moving said pan carrier at alternate different speeds synchronously with said panner blade reciprocations, and a reciprocating arm for controlling and coordinating said panner blade movements and said carrier speed changes.

152. In a biscuit machine, the combination comprising biscuit forming means, means for driving the biscuit forming means including a variable speed transmission having driving and driven pulleys, an apron for feeding a dough sheet to the biscuit forming means, means for driving the apron including a variable speed transmission having driving and driven pulleys driven by the driven pulley of the first named transmission, gage rolls for forming the dough sheet, and driving means for the gage rolls including a variable speed transmission mechanism driven by the driven pulley of the second named transmission.

153. In a biscuit machine, the combination comprising biscuit forming means, driving means therefor, a dough apron, variable speed driving means for said apron driven by the driving means for the biscuit forming means, gage rolls, and variable speed driving means for said rolls driven by the apron variable speed driving means.

154. A machine of the character described, including a reciprocating panner blade, a conveyor of the endless belt variety having a supporting surface and passing over the end of said panner blade, means for advancing said conveyor, means for periodically decreasing the effective supporting area thereof and at a speed less than the speed of advancement, and a pan conveyor cooperatively disposed adjacent said first conveyor and adapted to receive the discharge therefrom.

155. A machine of the character described, including, in combination, a conveyor of the endless belt variety having a longitudinally extended supporting surface, means for advancing and retracting the forward end of said conveyor, said advancing movement being effected relatively rapidly in the direction in which said conveyor is moving, said retracting movement being relatively slow and in the other direction, and a pan conveyor cooperatively disposed adjacent said forward end.

156. The combination with a main frame, of a conveyor mounted in the main frame, a sub-frame movably mounted on the main frame, a conveyor carried by the subframe, mechanism for actuating on their respective frames the said conveyors, and mechanism including a cam for reciprocating the sub-frame on the main frame in directions paralleling the normal advance movement of the said second conveyor, each movement of said reciprocation being effected at a speed relatively different from the speed of the other movement thereof.

157. The combination with a pair of relatively movable frames of a conveyor mounted on each of said frames and fixed against bodily movement with respect thereto, one of said conveyors being adapted to receive articles from the other, mechanism for operating the conveyors on their respective frames, and mechanism for effecting a relative reciprocation of the frames in directions longitudinally of said conveyors, the movements of said reciprocation being effected at speeds relatively different one from the other.

158. The combination with a pair of relatively movable conveyors, one of which is adapted to receive articles from the other, of mechanism for actuating the conveyors, and mechanism for reciprocating one of the conveyors longitudinally and with respect to the other, said reciprocating mechanism including means for making that part of the reciprocation which is in the direction of the normal movement of the conveyor comparatively fast with respect to the return movement.

159. In a machine of the character described, the combination comprising a traveling apron for carrying a sheet of plastic material thereon, means for forming articles from said plastic sheet, a scrap apron constructed and arranged to pass in juxtaposition to said other apron, means for bringing said aprons into substantial contact to block the travel of the material on said traveling apron to cause said material to start to travel with said scrap apron, said means being operable to separate said aprons after the scrap separation has commenced and allow the articles to pass between the scrap apron and the traveling apron.

160. A machine of the character described, including a reciprocating panner blade, a conveyor of the endless belt variety having a supporting surface and passing over the end of said panner blade, means for advancing said conveyor, means for periodically decreasing the effective supporting area thereof and at a speed different from the speed of advancement, and a pan conveyor cooperatively disposed adjacent said first conveyor and adapted to receive the discharge therefrom.

THOMAS L. GREEN.